United States Patent
Freda et al.

(10) Patent No.: US 12,096,306 B2
(45) Date of Patent: Sep. 17, 2024

(54) REALIZING MOBILE RELAYS FOR DEVICE-TO-DEVICE (D2D) COMMUNICATIONS

(71) Applicant: InterDigital Patent Holdings, Inc., Wilmington, DE (US)

(72) Inventors: Martino Freda, Laval (CA); Diana Pani, Montreal (CA); Benoit Pelletier, Roxboro (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/110,630

(22) Filed: Feb. 16, 2023

(65) Prior Publication Data
US 2023/0199606 A1  Jun. 22, 2023

Related U.S. Application Data

(63) Continuation of application No. 17/129,226, filed on Dec. 21, 2020, now abandoned, which is a
(Continued)

(51) Int. Cl.
*H04W 36/36* (2009.01)
*H04B 7/155* (2006.01)
(Continued)

(52) U.S. Cl.
CPC ............ *H04W 36/36* (2013.01); *H04B 7/155* (2013.01); *H04B 7/15528* (2013.01);
(Continued)

(58) Field of Classification Search
CPC ... H04B 7/15528; H04B 7/155; H04W 76/14; H04W 36/03; H04W 88/04; H04W 76/23; H04W 36/36; H04W 72/12
See application file for complete search history.

(56) References Cited

U.S. PATENT DOCUMENTS

| | | | | |
|---|---|---|---|---|
| 8,867,985 B2 * | 10/2014 | Yang | ................... | H04W 40/22 455/13.1 |
| 8,886,113 B2 | 11/2014 | Palanki et al. | | |

(Continued)

FOREIGN PATENT DOCUMENTS

| | | |
|---|---|---|
| CN | 103249098 A | 8/2013 |
| CN | 103428642 A | 12/2013 |

(Continued)

OTHER PUBLICATIONS

Sony: "Considerations on ProSe Relays Selection", 3rd Generation Partnership Project (3GPP) Draft, SA WG2 Meeting #105, S2-143134, Sapporo, Japan; Oct. 13-17, 2014; 7 pages.
(Continued)

*Primary Examiner* — Chi Ho A Lee
*Assistant Examiner* — Andrew Lee
(74) *Attorney, Agent, or Firm* — Majid Albassam

(57) ABSTRACT

Systems, methods, and instrumentalities are disclosed for a WTRU to act as a mobile relay, the method comprising the WTRU connecting to the network, the WTRU receiving a message from the network indicating that the WTRU is to act as a mobile relay for one or more devices outside of the coverage of the network, the WTRU discovering one or more devices outside of the coverage of the network, and the WTRU receiving a message from the out-of-coverage device that indicates that the out-of-coverage device has selected the WTRU to act as a mobile relay.

13 Claims, 14 Drawing Sheets

Related U.S. Application Data continuation of application No. 16/414,549, filed on May 16, 2019, now Pat. No. 10,912,007, which is a continuation of application No. 15/565,088, filed as application No. PCT/US2016/026765 on Apr. 8, 2016, now abandoned.

(60) Provisional application No. 62/201,184, filed on Aug. 5, 2015, provisional application No. 62/161,145, filed on May 13, 2015, provisional application No. 62/144,667, filed on Apr. 8, 2015.

(51) Int. Cl.
*H04W 76/14* (2018.01)
*H04W 76/23* (2018.01)
*H04W 88/04* (2009.01)

(52) U.S. Cl.
CPC .......... *H04W 76/14* (2018.02); *H04W 76/23* (2018.02); *H04W 88/04* (2013.01)

(56) References Cited

U.S. PATENT DOCUMENTS

| | | |
|---|---|---|
| 9,078,189 B2 | 7/2015 | Jang et al. |
| 9,893,796 B2 | 2/2018 | Rakotoharison et al. |
| 10,219,291 B2 | 2/2019 | Pelletier et al. |
| 10,271,363 B2 | 4/2019 | Wu et al. |
| 2008/0225783 A1 | 9/2008 | Wang et al. |
| 2010/0167743 A1 | 7/2010 | Palanki et al. |
| 2010/0215011 A1 | 8/2010 | Shin et al. |
| 2011/0211447 A1 | 9/2011 | Wang et al. |
| 2011/0261747 A1 | 10/2011 | Wang et al. |
| 2011/0268006 A1 | 11/2011 | Koskela et al. |
| 2012/0108164 A1 | 5/2012 | Yuda et al. |
| 2014/0003262 A1 | 1/2014 | He et al. |
| 2014/0094183 A1 | 4/2014 | Gao et al. |
| 2014/0302774 A1 | 10/2014 | Burke et al. |
| 2014/0307611 A1 | 10/2014 | Tesanovic et al. |
| 2014/0315562 A1* | 10/2014 | Lim ..................... H04W 8/005 455/450 |
| 2015/0092656 A1 | 4/2015 | Lindh et al. |
| 2015/0180565 A1 | 6/2015 | Rakotoharison et al. |
| 2015/0264677 A1 | 9/2015 | He et al. |
| 2015/0319796 A1 | 11/2015 | Lu et al. |
| 2016/0088668 A1 | 3/2016 | Kim et al. |
| 2016/0165414 A1 | 6/2016 | Lee et al. |
| 2016/0202250 A1 | 7/2016 | Sharma et al. |
| 2016/0242144 A1 | 8/2016 | Adachi et al. |
| 2016/0277922 A1* | 9/2016 | Gunnarsson .......... H04W 76/23 |
| 2016/0295624 A1 | 10/2016 | Novlan et al. |
| 2017/0181206 A1 | 6/2017 | Lee et al. |
| 2017/0188320 A1 | 6/2017 | Xiong et al. |
| 2017/0280423 A1 | 9/2017 | Zhao et al. |
| 2017/0359766 A1* | 12/2017 | Agiwal ................. H04L 5/0048 |
| 2018/0035354 A1 | 2/2018 | Martin et al. |
| 2018/0049013 A1 | 2/2018 | Lee et al. |
| 2018/0054725 A1* | 2/2018 | Agiwal ................. H04W 88/08 |
| 2018/0084478 A1* | 3/2018 | Lee ....................... H04W 28/12 |
| 2018/0084481 A1* | 3/2018 | Wang ................... H04W 40/246 |
| 2018/0124654 A1 | 5/2018 | Kim et al. |
| 2019/0089451 A1 | 3/2019 | Seo et al. |
| 2019/0281526 A1 | 9/2019 | Freda et al. |
| 2020/0084707 A1 | 3/2020 | Kim et al. |

FOREIGN PATENT DOCUMENTS

| | | |
|---|---|---|
| CN | 103843444 A | 6/2014 |
| CN | 104105103 A | 10/2014 |
| CN | 104335654 A | 2/2015 |
| CN | 104349355 A | 2/2015 |
| CN | 104349421 A | 2/2015 |
| EP | 2833694 A2 | 2/2015 |
| JP | 2015505646 A | 2/2015 |
| WO | WO 2010082084 A1 | 7/2010 |
| WO | WO 2012102546 A2 | 8/2012 |
| WO | WO 2012159270 A1 | 11/2012 |
| WO | WO 2013114648 A1 | 8/2013 |
| WO | WO 2014109142 A1 | 7/2014 |
| WO | WO 2015024505 A1 | 2/2015 |
| WO | WO 2015046155 A1 | 4/2015 |
| WO | WO 2015047167 A1 | 4/2015 |
| WO | WO 2016073984 A2 | 5/2016 |

OTHER PUBLICATIONS

Qualcomm Inc., "Discussion on D2D Communications", 3GPP Tdoc R2-132447, 3GPP TSG-RAN WG2 Meeting #83, Barcelona, Spain, Aug. 19-23, 2013, 6 pages.

3GPP, "3rdGeneration Partnership Project;Technical Specification Group Services and System Aspects;System Improvements for Machine-Type Communications;(Release 10)", 3GPP TR 23.888 V1.0.0 (Jul. 2010), 80 pages.

3GPP, "3rd Generation Partnership Project; Technical Specification Group Radio Access Network;Opportunity Driven Multiple Access(3G TR 25.924 version 1.0.0)", 3G TR 25.924 V1.0.0 (Dec. 1999), Dec. 1999, 13 pages.

Xia, Weicheng, et al.,: "Relay Selection Strategy for Device to Device Communication", IET International Conference on Information and Communications Technologies (IETICT 2013); Apr. 27-29, 2013, 6 pages, Beijing, China, China. Retrieved from the Internet: https://ieeexplore.ieee.org/stamp/stamp.jsp?tp=&arnumber=6617508.

3rd Generation Partnership Project; Technical Specification Group Services and System Aspects; General Packet Radio Service (GPRS) Enhancements for Evolved Universal Terrestrial Radio Access Network (E-UTRAN) Access (Release 12), 3GPP TS 23.401 V12.8.0, Mar. 2015, 308 pages.

"3rd Generation Partnership Project; Technical Specification Group Services and System Aspects; Study on extended architecture support for Proximity-based services (Release 13)", 3GPP TR 23.713 V0.4.0, Feb. 2015, 67 pages.

Thomson, S., et al., "IPv6 Stateless Address Autoconfiguration", IETF Network WorkingGroup; RFC 4862, Sep. 2007, 30 pages.

Park, et al., "Rapid Commit Option for the Dynamic Host Configuration Protocol Version 4(DHCPv4)", Network Working Group, Request for Comments: 4039, Mar. 2005, 10 pages.

Samsung Electronics, "New feature for vehicular communication in 3GPP," 3GPP Tdoc S1-150195, 3GPP TSG-SA WG1 Meeting #69, Sanya, P.R. China, Feb. 2-6, 2015, 4 pages.

* cited by examiner

REALIZING MOBILE RELAYS FOR DEVICE-TO-DEVICE (D2D) COMMUNICATIONS

CROSS REFERENCE TO RELATED APPLICATIONS

This application is a continuation of U.S. patent application Ser. No. 17/129,226, filed Dec. 21, 2020, which is a continuation of U.S. patent application Ser. No. 16/414,549, filed May 16, 2019, and now issued as U.S. Pat. No. 10,912,007, which is a continuation of U.S. patent application Ser. No. 15/565,088, filed Oct. 6, 2017, which is a U.S. National Stage Application under 35 U.S.C. 371 of International Patent Application No. PCT/US2016/026765, filed Apr. 8, 2016, which is incorporated herein by reference in its entirety.

This application claims the benefit of U.S. Provisional Application No. 62/201,184 filed Aug. 5, 2015, U.S. Provisional Application No. 62/161,145 filed May 13, 2015, and U.S. Provisional Application No. 62/144,667 filed Apr. 8, 2015. The entire contents of these applications is incorporated herein by reference in its entirety.

BACKGROUND

Major standardization bodies for wireless communication protocols (for example, the institute of electrical and electronics engineers (IEEE), third generation partner project (3GPP), etc.) are currently studying support direct device-to-device (D2D) communications. For example, for 3GPP and long term evolution (LTE) based radio access systems, support for D2D communications may allow cost-efficient and high-capability communications using radio waveforms that are similar to LTE cellular transmissions. Utilization of LTE-like transmissions for both network-based and D2D communication may assist in harmonizing radio access technology across jurisdictions in order to lower the capital expenditure (CAPEX) and operational expenditure (OPEX) of radio-access technology available for the use.

For example, D2D communications may be utilized to support public safety (PS) type applications. Examples of PS applications may include applications that allow first responders to communicate with each other and other users in an area with or without network coverage. Some PS communications may require higher reliability transmissions than other types of services.

Additionally, PS applications may require support for radio communications in areas that are often not under radio coverage of an LTE network. For example, the goal may be to ensure support for D2D communications in areas with limited network coverage such as in tunnels, in deep basements, or following catastrophic system outages. Thus, D2D protocols may be defined to support D2D communications for in the absence of any operating network (or, for example, prior to the arrival of AdHoc deployed radio infrastructure).

D2D communications may also be designed to support commercial applications. For example, as the number of connected devices increases, it may be more efficient from the perspective of the mobile network to allow some communications for commercial and other user data to be exchanged as D2D communications rather than or in addition to routing the communications through the mobile network. D2D communications may also facilitate the communication of data that has stringent quality of service (QoS) requirements (e.g., low latency, high reliability, etc.). One example use case would be for commercial wearable devices (e.g., watches, glasses, etc.) that are configured to communicate wireless with other devices (e.g., phones, tablets, computers, mobile networks, etc.).

D2D communication protocols may be defined in a flexible manner in order to support one or more of PS and commercial applications.

SUMMARY

Systems, methods, and instrumentalities are disclosed for a WTRU to act as a mobile relay and/or to connect to a mobile relay, for example by performing D2D communications and procedures. For example, a WTRU that is to connect to a mobile relay (e.g., a remote WTRU) may receive transmissions from multiple mobile relays. The remote WTRU may determine channel quality based on the transmissions. The remote WTRU may determine whether channel quality for a mobile relay exceeds a configured threshold. The configured threshold may be based on a required channel quality corresponding to application layer data to be transmitted from the remote WTRU via the mobile relays. The remote WTRU may rank the mobile relays. The remote WTRU may select a highest ranked mobile relay that supports a service associated with the application layer data. The remote WTRU may send a request to connect with the highest ranked mobile relay. The remote WTRU may connect with the highest ranked mobile relay.

The remote WTRU may periodically measure channel quality. The remote WTRU may determine whether the channel quality for transmission from the mobile relay to which the remote WTRU is connected exceeds the configured threshold. If transmission from the mobile relay to which the remote WTRU is connected no longer exceeds the configured threshold, the remote WTRU may reselect another mobile relay. The channel quality for transmission from the reselected mobile relay may exceed the configured threshold. The channel quality for transmission from the reselected mobile relay may become the highest ranked. The remote WTRU may decide whether the re-selected mobile relay supports the service associated with the application layer data. The remote WTRU may disconnect with the previously selected mobile relay and connect with the reselected mobile relay.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate one or more message charts, which are meant to be exemplary. Other embodiments may be used. The order of the messages may be varied where appropriate. Messages may be omitted if not needed, and, additional messages may be added.

Figure 1A:
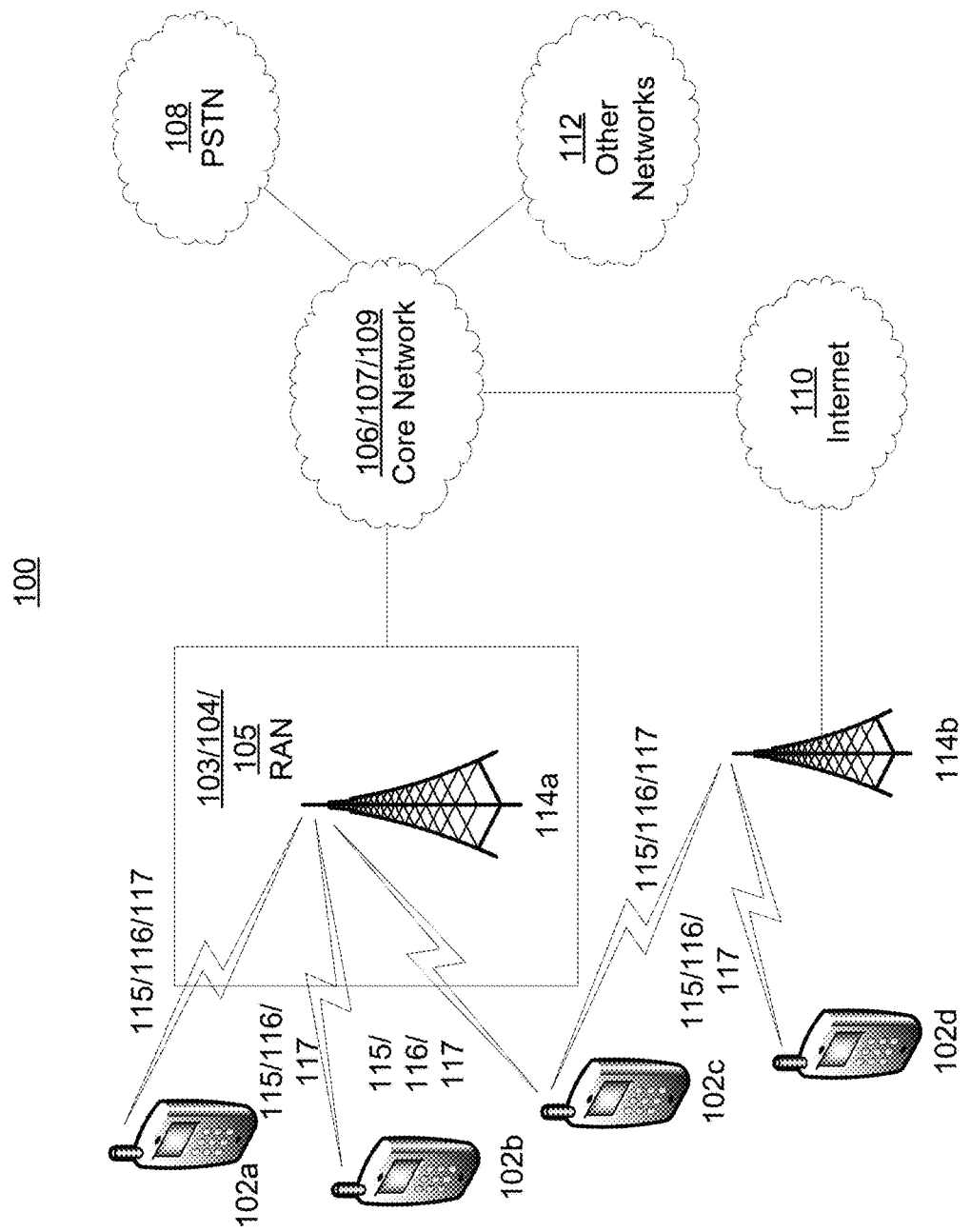
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and/or the like.

The communications systems 100 may also include a base station 114a and a base station 114b. Each of the base stations 114a, 114b may be any type of device configured to wirelessly interface with one or more of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and/or the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and/or the like. In one embodiment, the base station 114b and the WTRUs 102c, 102d may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
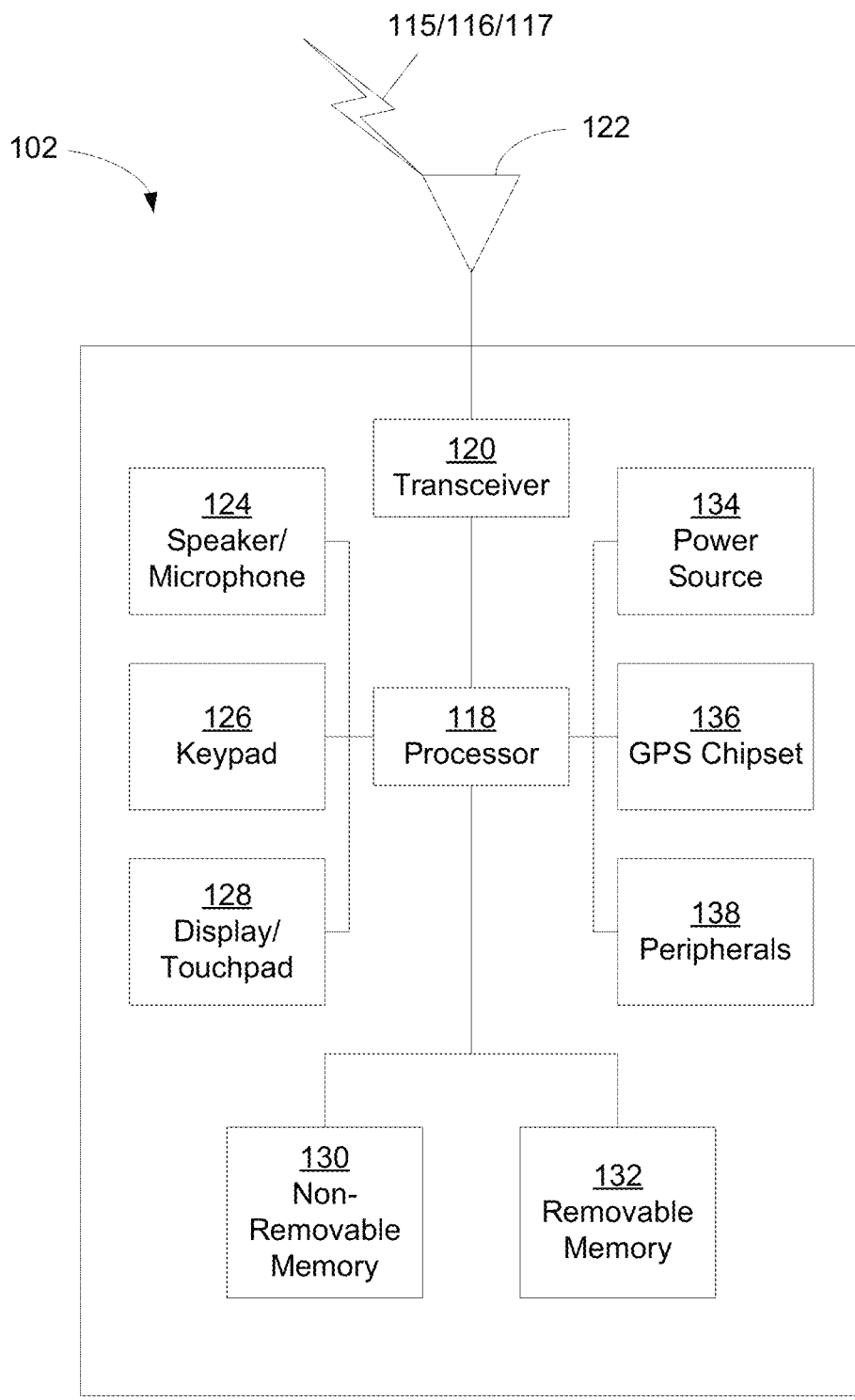
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and/or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 1C:
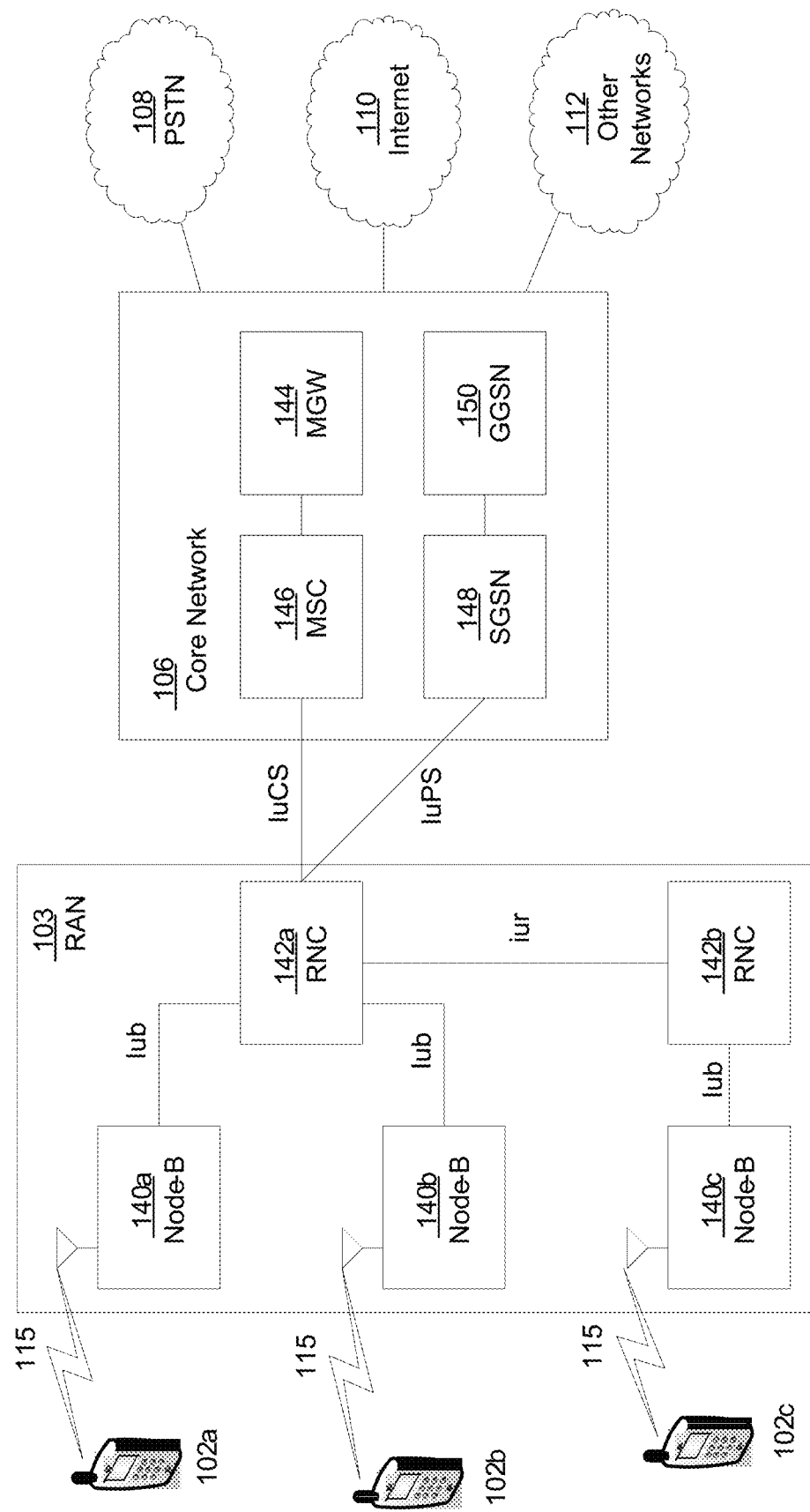
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and/or the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
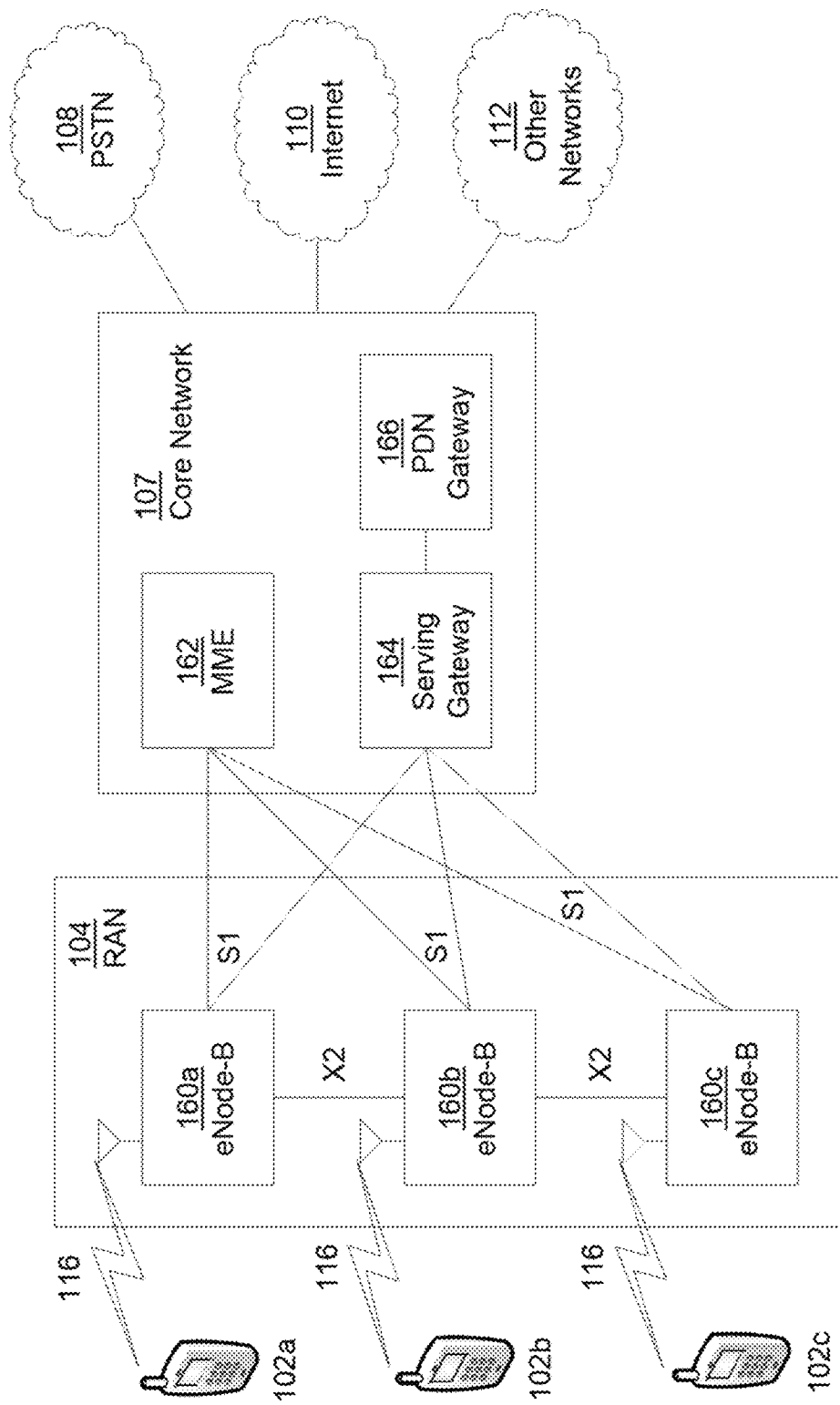
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and/or the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and/or the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
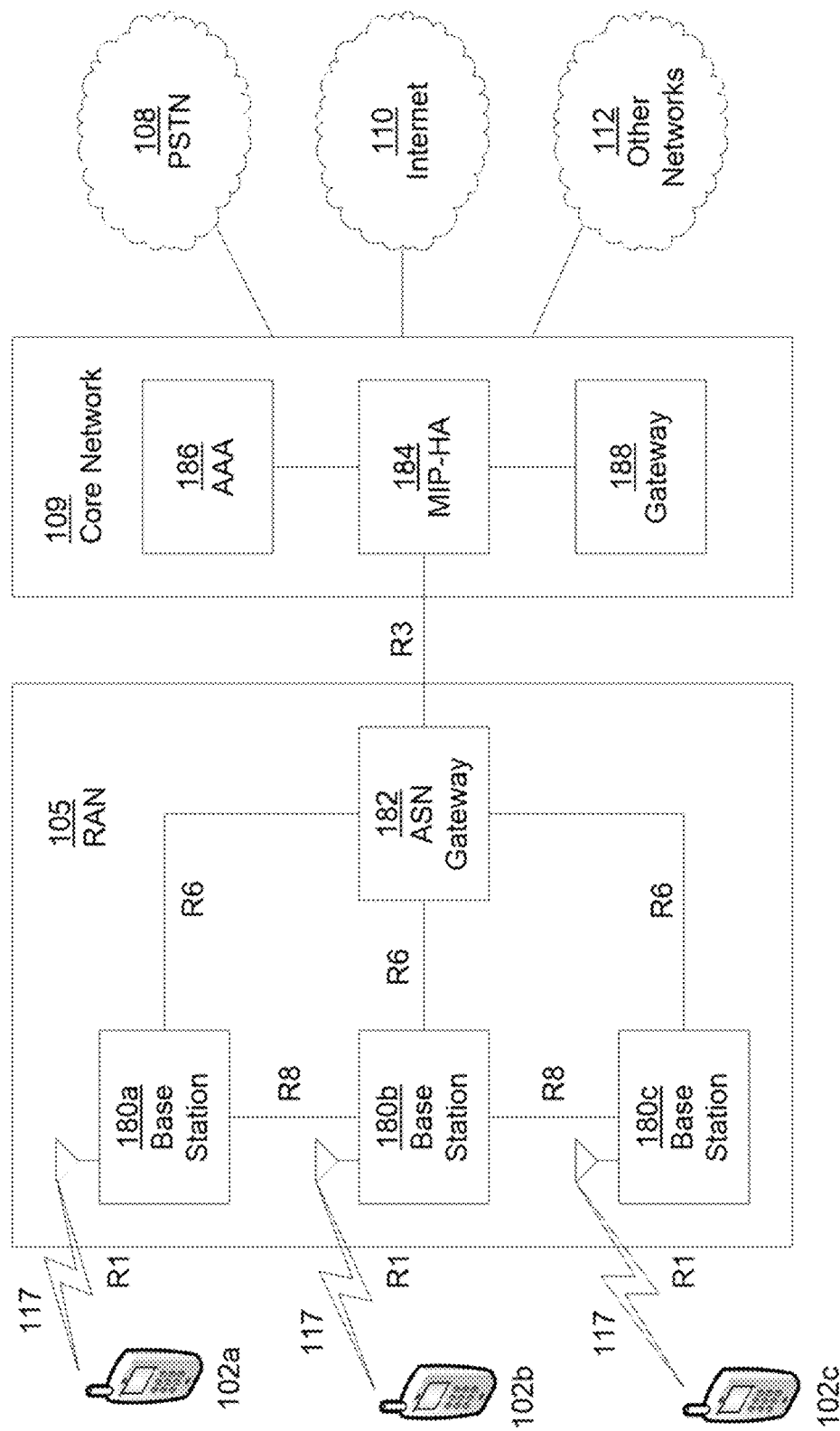
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and/or the like. The ASN gateway 182 may serve as a traffic aggregation point and may be responsible for paging, caching of subscriber profiles, routing to the core network 109, and/or the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Public safety (PS) types of applications (e.g., between first responders) may include direct push-to-talk speech services using one or multiple talk groups. PS types of applications may utilize capabilities an LTE broadband radio, for example, services such as video push or download.

Once deployed, D2D communications may be available for PS types of applications, and for commercial use cases. One example commercial use case may be the case of utility companies which require support for 2-way radio communications in areas not covered by network infrastructure. D2D services, such as D2D discovery procedures, may be defined to include suitable signaling mechanisms to allow for proximity-based services and/or traffic offload using LTE based radio access in commercial use cases.

Examples of commercial use cases may include wearables use cases, Internet of Things (IoT) use cases, and/or machine type communication (MTC) use cases. For example, a user may use a handheld device (e.g., a smartphone) as a mobile relay for traffic for one or more wearable devices (e.g., a watch, glasses, etc.). The wearable devices may be in relatively close proximity to the mobile relay device. The wearable devices may be configured to communicate with the network and/or other devices in an energy efficient manner. The wearable devices may communicate through the handheld device such as a WTRU. The handheld device/WTRU may act as a unidirectional mobile relay and/or a bidirectional mobile relay. For example, if the WTRU is acting as a unidirectional mobile relay, the wearable devices may receive downlink communication directly from the eNB and/or other mobile network nodes. The wearable devices may transmit uplink via the unidirectional mobile relay/WTRU. By communicating via the mobile relay in the uplink, power for transmissions may be saved since the mobile relay is likely closer in proximity to the wearable device than the mobile network node. Wearable devices may communicate with the network via the mobile relay at an edge of an eNB coverage. Wearable devices may comprise radios that may or may not be designed with the same sensitivity as the mobile relay's radio.

Signaling mechanisms may be used to allow multiple remote WTRUs to communicate via a mobile relay WTRU such that the mobile relay may efficiently communicate with multiple wearables. The mobile relay WTRU may manage multiple wearables. The wearables may be a smart watch along with other smart devices. For example, the smart devices may be google glasses, hands-free headset, handheld game console, and/or the like.

In examples of IoT or MTC use cases, millions of (or more) devices may be connected with a network. Some or all of the devices in IoT or MTC use cases may be relatively low-cost and/or limited capability devices. The devices may be configured to communicate in an energy efficient manner. The devices may attempt to connect to the network simultaneously, which could cause congestion. A connection through a mobile relay device may avoid some issues associated with simultaneous connection with the network. The mobile relay device may comprise a mobile relay WTRU. Some or all of the devices may have little or no coverage of an eNB. Some or all of the devices may be in proximity of a WTRU. For example, the WTRU may act as a mobile relay, for example to extend network coverage.

Signaling mechanisms may be used to allow one or multiple remote WTRUs to communicate via a mobile relay WTRU. In the examples of IoT or MTC use cases, the number of remote WTRUs may be expected to be great. The remote WTRUs may connect to the mobile relay such that direction connections of devices with the network may be reduced. Efficient association/re-association may designed to attempt to provide a relatively equal distribution of remote WTRUs to mobile relays. That WTRUs are configured unnecessarily as mobile relays may be avoided. Proper service continuity to the network and/or between mobile relays may be maintained.

The mobile relay WTRU may communicate with the remote WTRUs using a 3GPP RAT and/or non-3GPP RATs (e.g., WiFi, Bluetooth, and/or the like). The link between the mobile relay WTRU and the remote WTRU may be PC5. A communication may be via D2D. A D2D may be through PC5 interface. A communication may be over a D2D made to support vehicle to vehicle (V2V), low cost wearables, and/or the like. A narrow band IOT (NB-IOT) waveform, RAT and/or the like may be used to support low-cost or low power devices. The low-cost or low power devices may communicate over a non-3GPP RAT. The PC5 link may be over licensed or unlicensed spectrum.

The link between the mobile relay WTRU and the eNB may be Uu. The link may comprise LTE Uu RAT. The link may be over a 3GPP RAT, such as NB-IoT, eMTC, future 5G (NR), and/or the like. The link may be over a non-3GPP RAT such as WiFi. The Uu link may be over licensed or unlicensed spectrum.

The mobile relay WTRU may implement functionality at a layer of protocol stack. The mobile relay may be an layer 2(L2) relay, implemented at MAC, RLC, or PDCP layers. The mobile relay may be an IP relay or above IP relay.

A standardization of D2D communications by 3GPP was completed in Release 12 (R12) of the LTE standard. For example, the R12 standardization efforts focused on direct communications between WTRUs and open discovery procedures for Proximity-Based Services (ProSe). Use of D2D communications for mobile relays may be studied to enhance to allow WTRUs to act as a mobile relay for a WTRU which is out of coverage. As an example, consider two types of mobile relays: 1) WTRU-to-Network mobile relays, and 2) WTRU-to-WTRU mobile relays. A mobile relay WTRU may be considered a WTRU-to-Network mobile relay by being configured to act as a mobile relay between the eNB (e.g., and/or any other mobile network infrastructure node, other RAN nodes, etc.) and a remote WTRU. The remote WTRU may or may not be out of coverage of the eNB and/or other network infrastructure. A mobile relay WTRU may be considered a WTRU-to-WTRU mobile relay by being configured to facilitate communication among two or more remote WTRUs. The multiple remote WTRUs may communicate with each other in D2D when they are out of range/proximity of each other.

Figure 2:
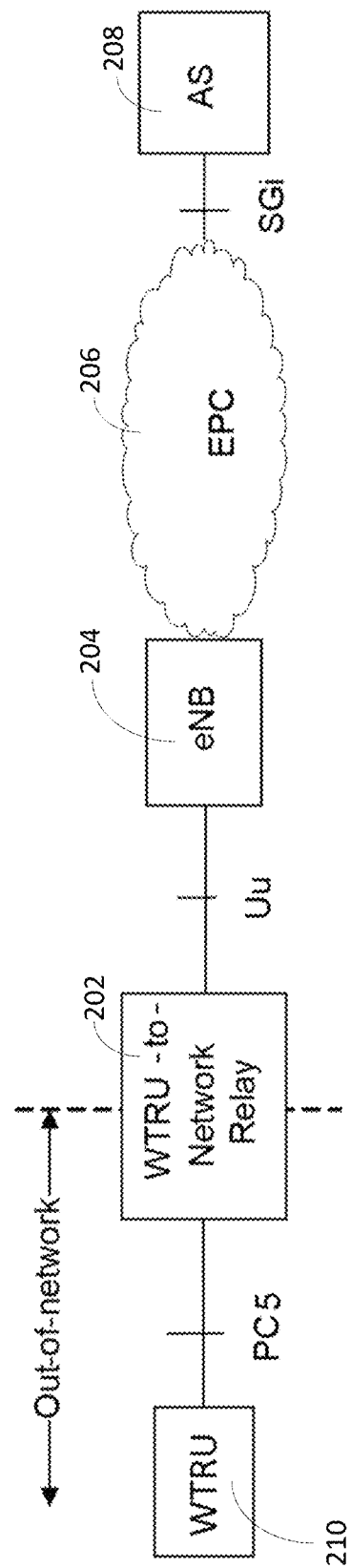
FIG. 2 is a diagram of an example WTRU-to-Network Mobile relay function.

FIG. 2 illustrates an exemplary WTRU-to-Network mobile relay (e.g., mobile relay) deployment. The function may include support for the mobile relay of unicast traffic (e.g., uplink (UL) and downlink (DL)) between remote WTRUs that are not served by evolved universal terrestrial radio access network (E-UTRAN) and the network and/or support bidirectional traffic. For example, the WTRU-to-Network Mobile relay 202 (e.g., mobile relay) may provide a Layer 3 (L3) forwarding function that may relay some types and/or any types of IP traffic that is relevant for public safety and/or commercial communication. The WTRU-to-Network Mobile relay 202 (e.g., a mobile relay) may provide other types communications between eNB 204 and remote WTRU 210. The WTRU-to-Network Mobile relay 202 may provide a layer 2(L2) relay forwarding function, and forward packets at a layer of communications between eNB 204 and remote WTRU 210. For example, WTRU-to-Network Mobile relay 202 may communicate with eNB 204 to send data to and/or receive data from Application Service (AS) 208 (e.g., via EPC 206). The data may be forwarded to and/or communicated on behalf of remote WTRU 210 (e.g., which may be out-of-network coverage). the WTRU-to-Network Mobile relay 202 may communicate with WTRU 210 (e.g., a remote WTRU) via a PC5 interface. The WTRU-to-Network Mobile relay 202 may communicate with eNB 204 via a Uu interface. EPC 206 may communicate with AS 208 (e.g., AS for public safety and/or commercial communication) via a SGi interface. The example illustrated in FIG. 2 may involve a public safety and/or commercial communication application server.

Figure 3:
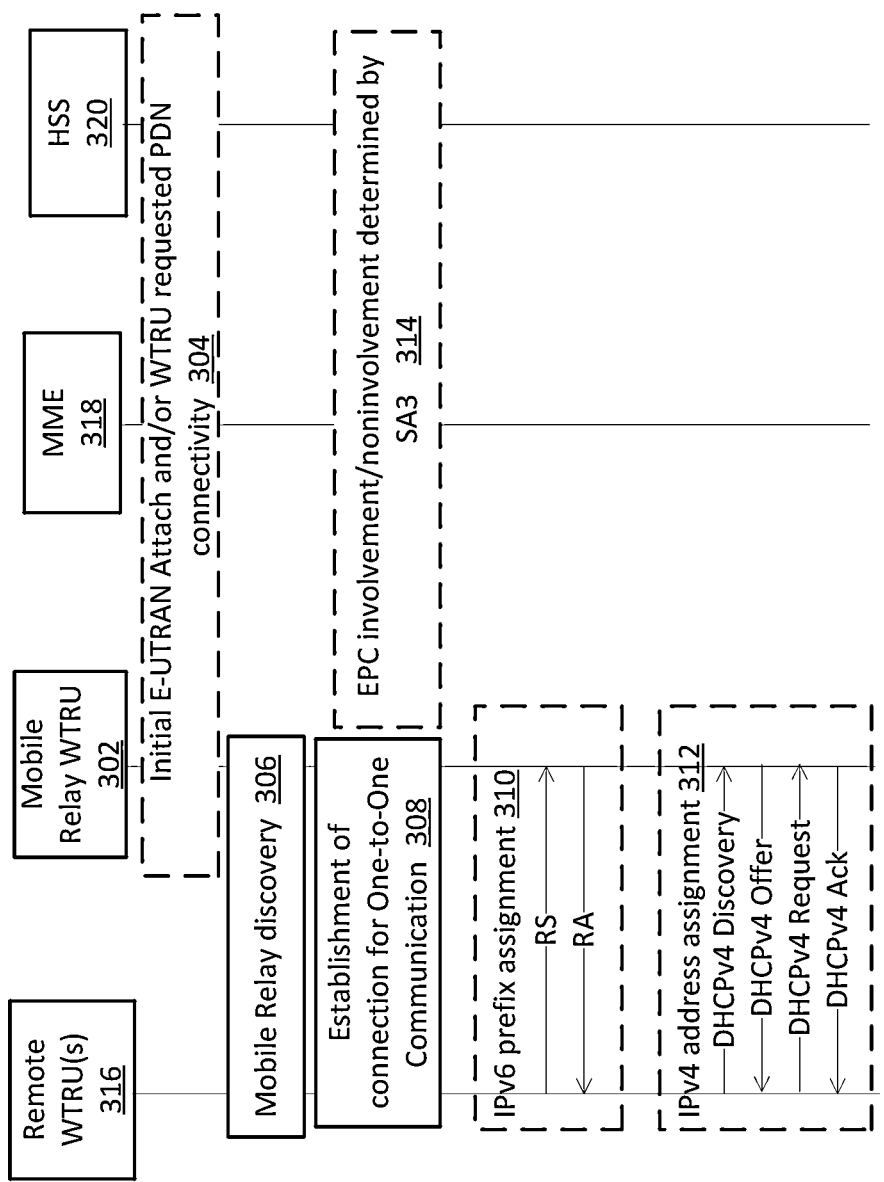
FIG. 3 is a diagram of an example WTRU-to-Network Mobile relay function.

FIG. 3 illustrates an exemplary WTRU-to-network mobile relay communication exchange. For example, the mobile relay WTRU 302 may attach to the network at 304, if mobile relay WTRU 302 is not already attached to the network. The mobile relay WTRU 302 may establish a PDN connection at 304. The packet data network (PDN) connection may be used for communication of traffic to/from remote WTRUs 316. For example, appropriate PDN connection for mobile relays may not yet exist/be configured for the remote WTRU(s) 316. For IPv6, the mobile relay WTRU 302 may obtain an IPv6 prefix, such as via a prefix delegation function from the network (e.g., as defined in 3GPP technical specification (TS) 23.401).

Remote WTRU(s) 316 may perform discovery of a mobile relay WTRU 302 using a discovery procedure, for example, model A and/or model B discovery at 306. For example, a model A discovery may include an announcement, and a model B discovery may include a solicitation and a response. A Remote WTRU 316 may select a mobile relay 302 and establish a connection for one-to-one communication with the mobile relay 302 at 308. The establishment of connection for one-to-one communication may be with or without EPC involvement, as determined by SA3 at 314. The EPC involvement may comprise MME 318 or home subscriber server (HSS) 320.

For IPv6, on PC5, the Remote WTRU 316 may perform IPv6 stateless address auto-configuration at 310. A Remote WTRU 316 may send a Router Solicitation (RS) message to the network using the Layer-2 ID of the Mobile relay as Destination Layer-2 ID at 310. A Remote WTRU 316 may solicit a router advertisement (RA) message (e.g., as specified in with internet engineering task force reason for collaboration (IETF RFC) 4862) at 310. A RA message may include an assigned IPv6 prefix. After the Remote WTRU 316 receives the RA message, it may construct a full IPv6 address via IPv6 stateless address auto-configuration (e.g., in accordance IETF RFC 4862) at 310.

For IPv4, on PC5, the Remote WTRU 316 may use dynamic host configuration protocol (DHCP)v4. A Remote WTRU 316 may send a DHCPv4 discovery message using the layer-2 ID of the Mobile relay as destination layer-2 ID at 312. The mobile relay WTRU 302 may act as a DHCPv4 server, sending a DHCPv4 Offer with the assigned remote WTRU IPv4 address at 312. When the Remote WTRU 316 receives the lease offer, it may send a DHCP REQUEST message containing the received IPv4 address at 312. The mobile relay WTRU 302 acting as DHCPv4 server may send a DHCP ACK message to the remote WTRU 316 including the lease duration (e.g., configuration information that a client may have requested). On receiving the DHCP ACK message at 312, the Remote WTRU 316 may complete a TCP/IP configuration process.

Figure 4:
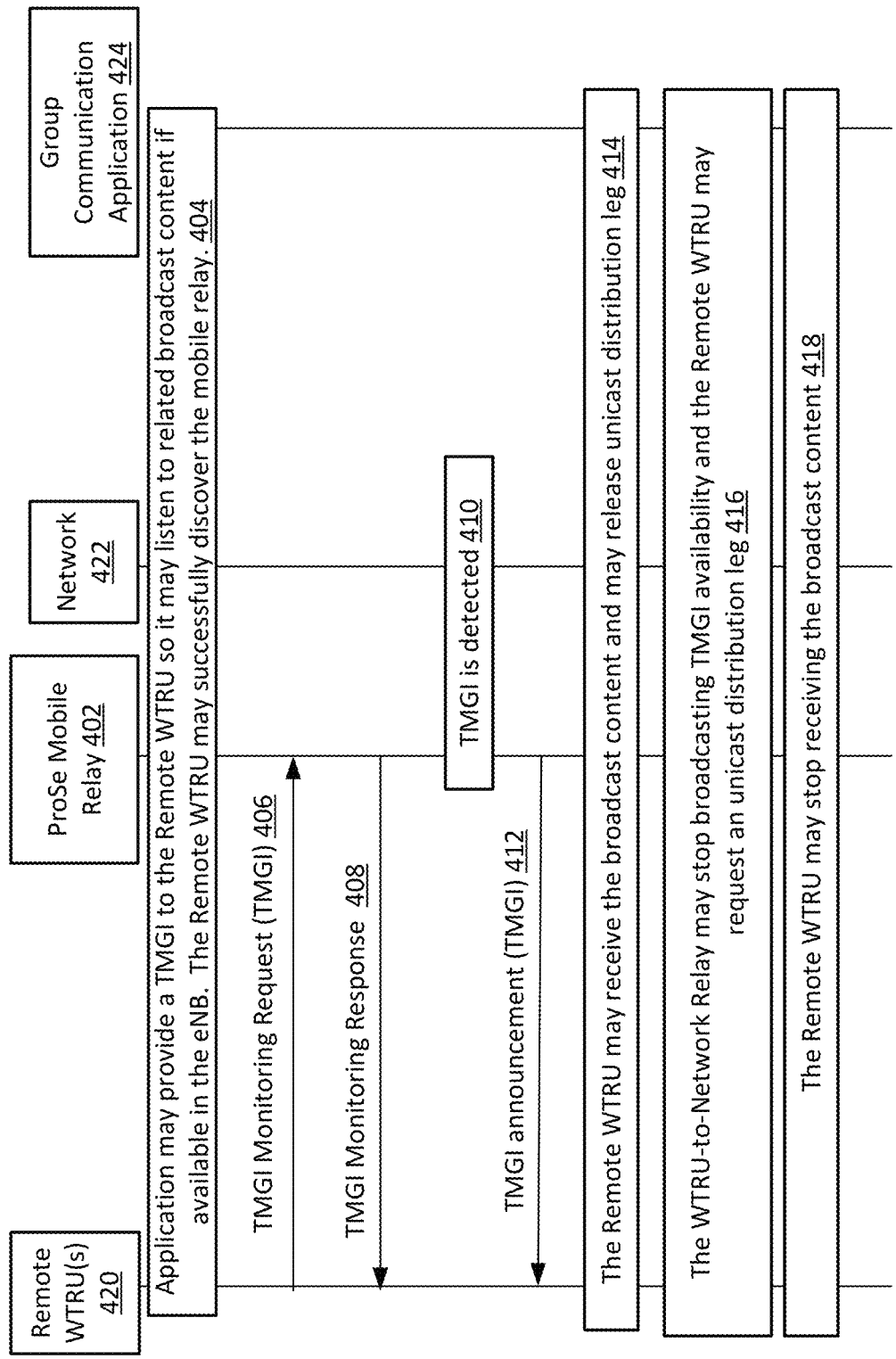
FIG. 4 is a diagram of an example WTRU-to-Network Mobile relay function.

FIG. 4 illustrates an exemplary WTRU-to-Network mobile relay procedure. The procedure may be used by a ProSe-enabled WTRU (e.g., remote WTRU 420) to request a mobile relay 402 to start monitoring the availability of a temporary mobile group identity (TMGI). The mobile relay 402 may broadcast the TMGI on a broadcast channel, for example, when it is detected on the multicast control channel (MCCH) of the serving cell (e.g., a cell of Network 420). The eMBMS traffic related to this TMGI, if available, may also be forwarded to the remote WTRUs 420 served by the mobile relay 402 over a one-to-many link (e.g., identified by a specific Layer-2 Group ID provided by the ProSe mobile relay 402 when the procedure is executed).

If a remote WTRU 420 has successfully discovered the mobile relay 402 and has obtained (e.g., after a one to one communication sessions with the mobile relay 401) from a group communication application a TMGI, the WTRU may use the TMGI to receive related broadcast (e.g., eMBMS) content at 404. The related broadcast content may be available (e.g., in a eNB). The WTRU may obtain the TMGI it is interested in by static configuration or by interaction with the group communication application. This interaction may happen before or after the WTRU has joined the mobile relay 402.

The WTRU may send to the mobile relay 402 a TMGI monitoring request at 406 where TMGI is the value obtained herein. The mobile relay 402 may acknowledge reception of the request herein with a TMGI monitoring response (e.g., layer 2 group ID_traffic, TMGI Monitoring Refresh Timer, and/or the like) at 408. The layer 2 group ID_traffic may be used to forward to remote WTRUs the eMBMS content related to the TMGI value received herein. The TMGI Monitoring Refresh Timer may be configurable in the mobile relay 402. The TMGI Monitoring Refresh Timer may be provided to the WTRU at 408 so that when the timer elapses the WTRU may execute the TMGI monitoring request procedure (e.g., if it is still configured to monitor the TMGI). If a remote WTRU 420 does not execute the TMGI Monitoring Request procedure when the TMGI Monitoring Refresh Timer expires in the mobile relay 402 at 408, and no other WTRU executes the refresh procedure for the TMGI, when the TMGI Monitoring Refresh Timer for the TMGI expires in the mobile relay 402, the mobile relay 402 may stop monitoring the TMGI and/or may stop forwarding related content.

The ProSe mobile relay 402 may detect the TMGI it has been requested to monitor at 410. Upon detection of the TMGI at 410, the mobile relay 402 may broadcast availability of the TMGI by sending a TMGI announcement message over a broadcast channel at 412. The mobile relay 402 may broadcast availability of the TMGI by sending a TMGI announcement message over a broadcast channel at 412 (e.g., repeatedly with a configurable repetition interval). The repetition interval may be shorter than the TMGI Monitoring Refresh Timer. The value of the TMGI may be used by devices discovering the mobile relay 402 as a preference criterion for mobile relay selection (e.g., if they are interested in the TMGI the mobile relay 402 is advertising).

A WTRU may detect a TMGI announcement and may start to receive the broadcast content on the PC5 one-to-many link associated to the layer-2 group ID_traffic, and may release a unicast distribution leg if a unicast distribution leg was being used at 414. Upon detection of loss of TMGI, the mobile relay 402 may stop broadcasting availability of the TMGI at 416. The ProSe mobile relay 402 may send a positive indication of loss of TMGI to accelerate loss of TMGI detection in the WTRU. A WTRU may request a unicast distribution leg from the group communication AS at 416. The group communication may include a public safety or commercial communication. A WTRU may stop receiving the broadcast content on the PC5 one-to-many signaling link associated to the group layer-2 ID_traffic at 418.

Figure 5:
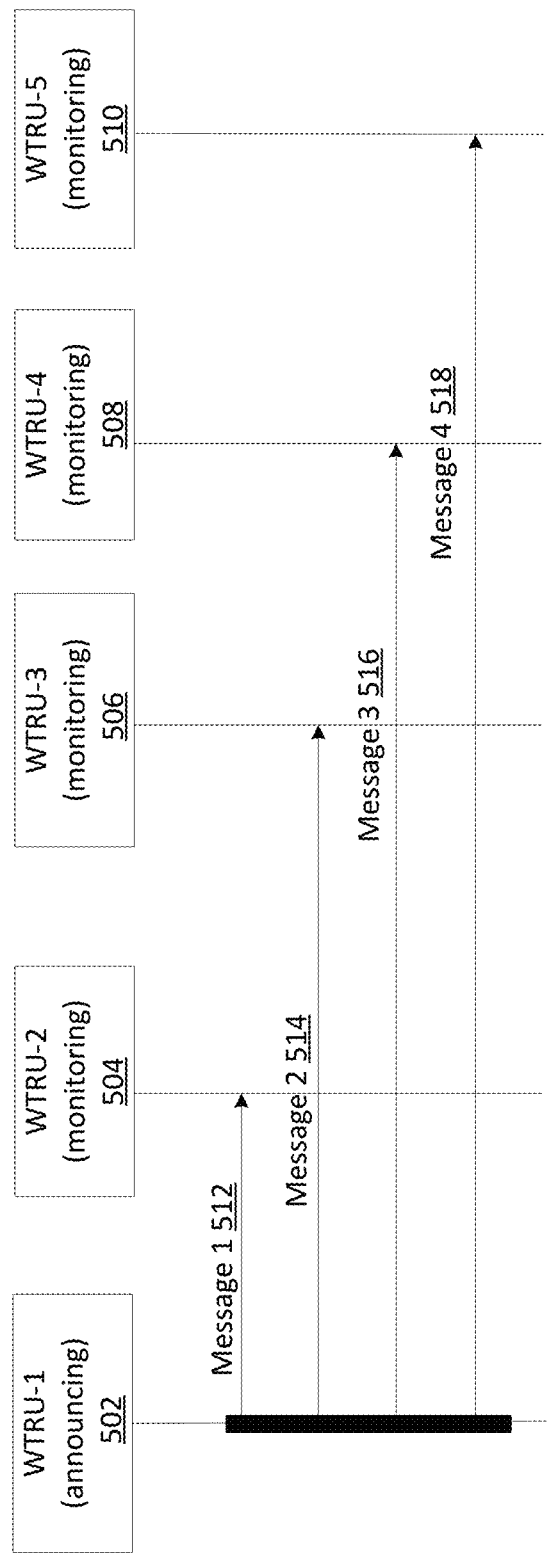
FIG. 5 is a diagram of an example of public safety discovery according to Model A.

FIG. 5 illustrates an exemplary public safety discovery according to Model A. In FIG. 5, the type may be an announcement. The discovery type may be mobile relay discovery. Announcing WTRU-1 502 may send a message to monitoring WTRUs at 504-510. The message sent at 502 may comprise information such as type, discovery type, PLMN ID, connection information, ProSe mobile relay WTRU ID, status, group Information, and/or the like. Some of all of the monitoring WTRUs at 504-510 may receive messages 512-518. For example, WTRU-2 504 may receive message 1 512.

Figure 6:
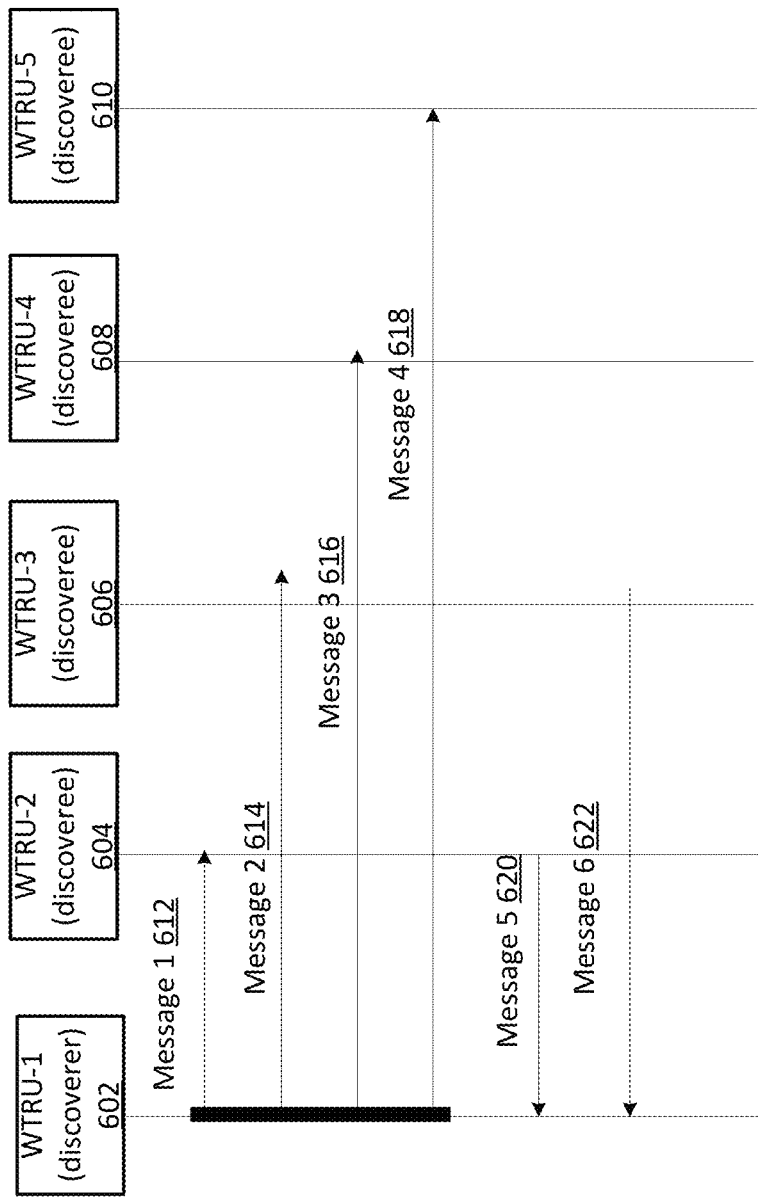
FIG. 6 is a diagram of an example of public safety discovery according to Model B.

FIG. 6 illustrates an exemplary public safety discovery according to Model B. Discover WTRU-1 at 602 may send a message to discoveree WTRUs at 604-610. The messages 1-4 sent at 612-618 may comprise information type, discovery type, PLMN ID, connection information, ProSe mobile relay WTRU ID, status, group information, and/or the like. In FIG. 6, the type may be a solicitation. The discovery type may be mobile relay discovery. Some of all of the discoverees at 604-610 may send the messages back to the discoverer WTRU-1 at 602. For example, in FIG. 6, the dicoveree at 604 and discoveree at 606 may send a message back to the discoverer at 602. The messages 5-6 sent at 620-622 may comprise information type, discovery type, PLMN ID, connection information, proSe mobile relay WTRU ID, status, group information, and/or the like. In the messages 5-6 sent at 620-622, the type may be a response. The discovery type may be a mobile relay discovery.

The following parameters may be used for WTRU-to-Network Mobile relay Discovery in the example shown in FIG. 6. A mobile relay WTRU ID may be a link layer identifier. The link layer identifier may be used for direct communication. The link layer identifier may be associated with a PDN connection that the mobile relay has established. A public land mobile network (PLMN) ID may identify the PLMN to which radio frequencies used on the link to which the Remote WTRU belongs. The radio frequencies may be shared between multiple PLMNs. The radio frequencies may or may not be allocated to a PLMN. The selection of PLMN ID may be configured by the Home PLMN (HPLMN). Connectivity information may comprise a parameter identifying a connectivity that the mobile relay provides (e.g., including APN information). Status/maintenance flags may be used to indicate whether the mobile relay is temporarily without connectivity and/or battery running low (e.g., so the Remote WTRUs can seek/reselect another mobile relay). Group Information may comprise information about the group(s) that the mobile relay is relaying for.

Several complications/difficulties may be associated with using D2D communication to realize a mobile relay function (e.g., for one or both of WTRU-Network and/or WTRU-WTRU mobile relays). For example, a remote WTRU may be served by a mobile relay (e.g., a mobile relay WTRU). The remote WTRU may be unknown to an eNB that serves the mobile relay. The remote WTRU may be unable to receive system information from the eNB. The remote WTRU may be unable to properly select the mobile relay WTRU and/or an optimal mobile relay WTRU (e.g., from the device and/or the network perspective). The mobile relay WTRU may be able to serve the remote WTRU. For example, proper selection of the mobile relay WTRU may be related to a lower-layer signal quality and/or application-layer service. The mobile relay WTRU and/or remote WTRU may be mobile. The remote WTRU may be capable of reselecting a different mobile relay WTRU when the mobile relay WTRU to which the remote WTRU connected becomes unsuitable to serve as its mobile relay.

In addition to mobile relay selection/reselection, current resource assignment rules developed for D2D (e.g., in R12) may be inappropriate and/or sub-optimal for mobile relays. For example, the remote WTRU may be out-of-coverage, and the remote WTRU may be configured to use pre-configured resources for direct communication when out-of-coverage. The usage of the pre-configured resources for direct communication may result in over-use of the pre-configured resources when multiple remote WTRUs and mobile relay WTRUs are co-located in an area (e.g., in an out-of-coverage area).

The resource usage rules defined for direct D2D communication may be inefficient for mobile relay scenarios. An eNB may not be able to control the resources that may be used by the remote WTRUs when R12 rules are applied. For example, R12 rules may lack support for service continuity for scenarios involving mobile relays (e.g., mobile relay mobility and/or remote WTRU mobility between mobile relays). For example, a remote WTRU may enter and/or leave an area that is covered by an eNB, which may affect resource utilization for D2D communications. R12 rules do not provide ways in which the switching of the remote WTRU between areas covered by an eNB and areas not covered by eNB is transparent to the application layer. A mobile relay WTRU may lose coverage with the eNB, and the remote WTRUs that are served by the mobile relay WTRU may or may not be able to maintain service upon the loss of connection.

A WTRU that is attempting to connect to a mobile relay may perform one or more autonomously determined actions to select a mobile relay and/or receive instructions from a network entity to select a mobile relay. For example, a remote WTRU may be configured to perform procedures for selection and reselection of a mobile relay WTRU and configured to perform measurements that may be used to support these selection/reselection procedures. The remote WTRU, the mobile relay WTRU, and/or an eNB may perform procedures associated with initiation of a mobile relay based on the control of the associated eNB. The mobile relay WTRU, the remote WTRU, and/or the eNB may perform procedures for assigning resources for communication between the mobile relay WTRU and the remote WTRU. The mobile relay WTRU, the remote WTRU, and/or the eNB may perform procedures for handling service continuity, for example during remote WTRU mobility between mobile relays and/or between mobile relay mobility between eNBs.

A WTRU may perform a mobile relay selection/re-selection process to select the mobile relay to connect to for services (e.g., one-to-one communication, eMBMS, etc.), and may perform associated measurements that may be provided to the upper layers to perform the mobile relay selection/re-selection process. The process may apply if the WTRU is out-of-coverage and/or in-coverage. The processes may apply if the WTRU is transitioning from being in-coverage to being out-of-coverage. For example, initial mobile relay selection may be performed in the application layer with assistance information by the lower layer (e.g., measurements). Examples described herein may use the term remote WTRU to refer to a WTRU that is connected to and/or attempted to connect to a mobile relay. The mobile relay may be referred to as a mobile relay WTRU.

The lower layers (e.g., physical (PHY), medium access control (MAC), or radio resource control(RRC)) may report measurements taken on mobile relay transmission to higher layers. The measurements may be made on one or more of the following: demodulation reference signal (DMRS) on the sidelink synchronization channel (SL-SCH), DMRS on the physical sidelink broadcast channel (PSBCH), the device to device synchronization signal (D2DSS), discovery resources, and/or the like.

The lower layers in the remote WTRU may report a measurement for a transport block received. For example, the lower layers in the WTRU may report a measurement for a transport block received. The lower layers in the WTRU may report a list of some or all measurements taken. The lower layers may report an averaged measurement report made on multiple transport blocks over a given period of time. The measurements may be sent periodically to the upper layers, or may be provided to the upper layers when requested by the upper layers.

The measurements reported to higher layers may contain one or more of: channel quality measurements (e.g., reference signal received power (RSRP)) and/or mobile relay ID. The mobile relay ID may correspond to an ID retrieved from PSBCH. The mobile relay ID may correspond to the Layer 1 ID decoded in the system aspects (SA). The mobile relay ID may correspond to the L2 WTRU ID. The mobile relay ID may correspond to the ID decoded in MAC header. For example, the mobile relay ID may correspond to the ID decoded in MAC header if measurements are taken from data packets. The measurements may allow the association of a channel quality measurement to the mobile relay ID corresponding to a given mobile relay.

Figure 7:
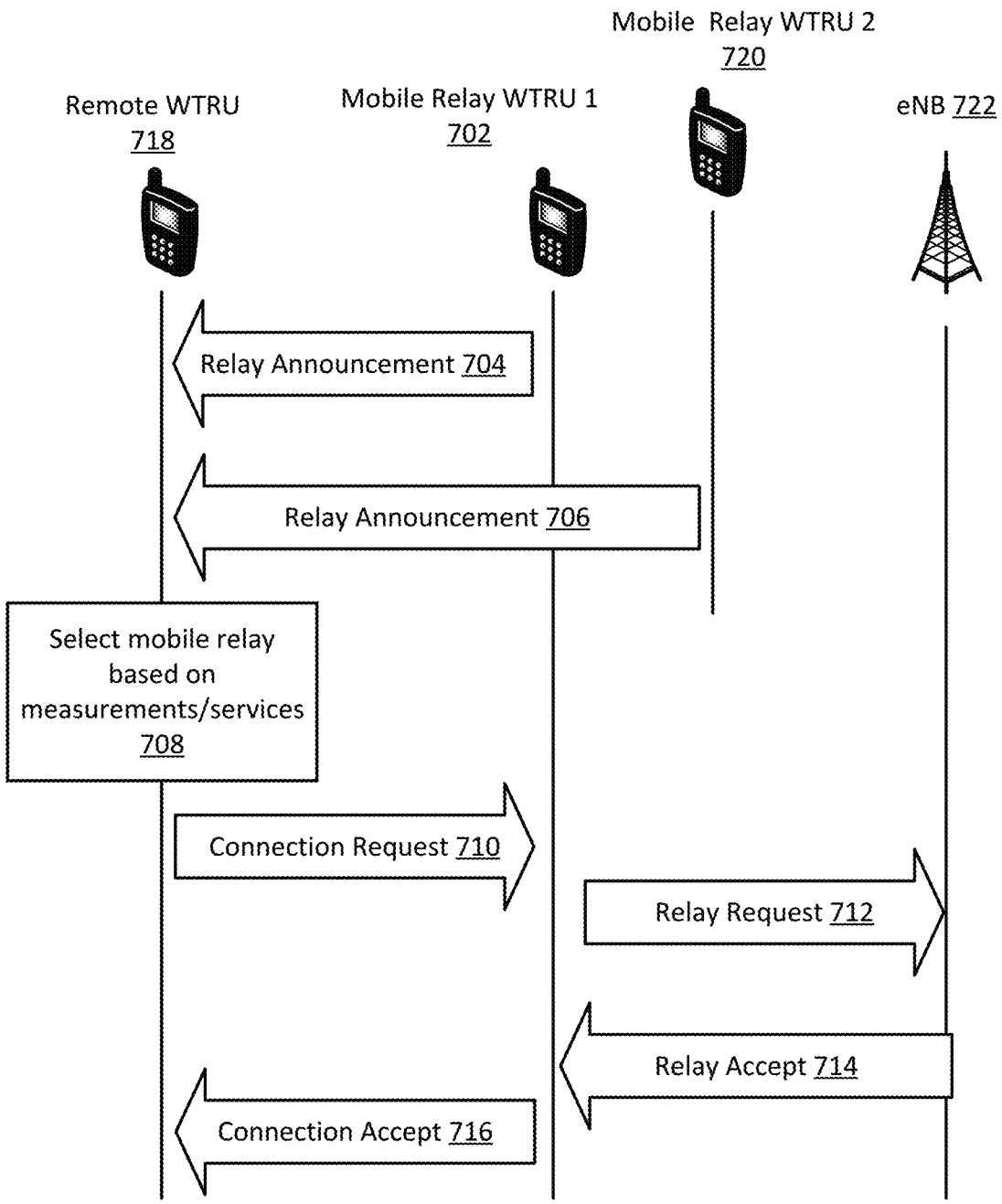
FIG. 7 is a diagram of an example of selection of a mobile relay WTRU.

A mobile relay may be selected based on selection criterion and other information. The selection criteria of the mobile relay may include one or more of: services (e.g., connection info) announced, PLMN ID announced, TMGI, and mobile relay specific information. Mobile relay selection may employ the measurements provided by lower layers and/or one or more thresholds associated with the measurements. The associated thresholds may be provided in the application layer and/or by lower layers. The associated thresholds may be provided as part of a RRC configuration. FIG. 7 is a diagram of an example of selection of a mobile relay WTRU.

A remote WTRU may receive a Model A mobile relay announcement and/or a Model B response from one or more mobile relay WTRUs. For example, as illustrated in FIG. 7, the remote WTRU 718 receives a mobile relay announcement from mobile relay WTRU1 702 at 704. The remote WTRU 718 receives a mobile relay announcement from mobile relay WTRU2 720 at 706. The mobile relay announcement at 704 and at 706 may be a Model A mobile relay announcement and/or a Model B response. The mobile relay announcements may include an indication of services provided by or supported by the mobile relay WTRUs. For example, the mobile relay announcements may include an indication that the mobile relays WTRUs support one or more services requested by the remote WTRU 718. The mobile relay announcements may include an indication of a PLMN that serves the mobile relay WTRUs. For example, the mobile relay announcements may include an indication that the mobile relays WTRUs are associated with one or more PLMNs that the remote WTRU 718 is allowed to connect to.

The application layer associated with the remote WTRU may filter the responses which include the services to be used by the remote WTRU at 708. The application layer associated with the remote WTRU may filter the responses in which the remote WTRU may be allowed on the PLMN at 708. The remote WTRU may filter mobile relay candidates according to a configured threshold(s) at 708. The remote WTRU may compare measurements from the mobile relay announcements to one or more configured thresholds. The remote WTRU may rank the mobile relays whose channel quality exceed the configured threshold(s) according to measurements and/or qualities (e.g., channel qualities) at 708. The rankings may be based on mobile relay WTRUs that support the service to be used by the WTRU and that have signal qualities that exceed the configured threshold. The remote WTRU 718 may select a mobile relay at 708.

For example, the remote WTRU may select a ranked mobile relay that supports certain service and meets certain quality criteria. The ranked mobile relay may be a highest ranked mobile relay. The rankings may be based on received signal strength and/or signal quality (e.g., with the highest strength and/or signal qualities ranked the highest). The remote WTRU may initiate a connection establishment to a selected mobile relay. The remote WTRU may send a connection request to the selected mobile relay at 710. The selected mobile relay may send the mobile relay request at 712 to the eNB 722. The eNB may send the mobile relay accept at 714 to the selected mobile relay 702. The selected mobile relay 702 may send a connection accept at 716 to the remote WTRU 718.

A connection failure may occur. If a connection failure occurs, the remote WTRU may select the next ranked mobile relay and attempt a connection establishment process. A failure to establish a mobile relay connection may occur. A failure to establish a mobile relay connection may occur when the secure link with the mobile relay WTRU may not be established due to failure of the authentication and/or security association. A failure to establish a mobile relay connection may occur when a valid TMGI for broadcast may not be successfully obtained. A failure to establish a mobile relay connection may occur when the remote WTRU may be unable to receive the broadcast for the TMGI. For example, the remote WTRU may be unable to receive the broadcast for the TMGI due to authentication and/or permission reasons. A failure to establish a mobile relay connection may occur when the eNB may reject the connection of the remote WTRU with the mobile relay. For example, the eNB may reject the connection of the remote WTRU with the mobile relay due to inability of the mobile relay to support the resources for the requested services. The eNB may reject the connection of the remote WTRU with the mobile relay due to availability of other mobile relays. The eNB may reject the connection and provide a redirection message. The rejection may be sent by the eNB to the remote WTRU via the mobile relay when the connection is rejected by the eNB. For example, the Uu connection may be used to send the rejection first to the mobile relay WTRU. The mobile relay WTRU may forward the rejection to the remote WTRU. The rejection may be sent by the eNB directly to the remote WTRU over the Uu interface. For example, the rejection may be sent by the eNB directly to the remote WTRU over the Uu interface when the remote WTRU is potentially in coverage of the eNB. A connection acceptance may be sent by the eNB directly to the remote WTRU over the Uu interface when the remote WTRU is potentially in coverage of the eNB or confirmed by the eNB.

The remote WTRU may perform a mobile relay reselection procedure. The remote WTRU may perform autonomous selection/reselection. To perform autonomous mobile relay reselection, the remote WTRU may periodically perform evaluation of signal quality of the mobile relay WTRU to which the remote WTRU is connected. The remote WTRU may start a reselection procedure when one or more of certain conditions are met. The remote WTRU may start a reselection procedure when the signal quality of the mobile relay WTRU to which the remote WTRU is connected is below the configured threshold. For example, the remote WTRU may start a reselection procedure when the WTRU no longer detects the mobile relay. The signal quality of the mobile relay WTRU to which the remote WTRU is connected may be determined using one or more of the measurements described herein.

The remote WTRU may measure signal qualities of the mobile relay WTRU to which the remote WTRU is connected based on Model A or Model B discovery messages. For example, the remote WTRU may measure the signal quality of the mobile relay WTRU to which the remote WTRU is connected based on Model A or Model B discovery messages. The remote WTRU may measure the signal quality by triggering Model B response messages. The remote WTRU may be configured to periodically transmit Model B solicitation to trigger Model B response messages from the serving mobile relay. For example, the remote WTRU may derive measurements of the signal quality from Model B response messages from the serving mobile relay. The remote WTRU may obtain its measurements of the signal quality directly from SL-SCH or SL-BCH of the mobile relay WTRU.

The remote WTRU may initiate a reselection procedure when the mobile relay WTRU is not announcing the service to be use by the WTRU and/or requested by the WTRU. The remote WTRU may start a reselection procedure when one or more other candidate mobile relay WTRUs are announcing the service utilized by the remote WTRU. The remote WTRU may start a reselection procedure when measurements of signal quality of the other candidate mobile relays is above a configured threshold. The remote WTRU may start a reselection procedure when measurements of signal quality of the other candidate mobile relays are better than the measurements of the signal quality of the mobile relay WTRU to which the remote WTRU is connected. For example, the remote WTRU may perform reselection when the signal quality of one or more candidate mobile relays may be better than the measurements of the signal quality of the current mobile relay WTRU by a given offset. The remote WTRU may perform reselection when the signal quality of one or more candidate mobile relays may be better than the measurements of the signal quality of the mobile relay WTRU for a given period of time. The remote WTRU may perform reselection when the signal quality of one or more candidate mobile relays may be better than the measurements of the signal quality of the mobile relay WTRU by a given offset for a given period of time. The remote WTRU may start a reselection procedure when a mobile relay redirection message is received.

Autonomous mobile relay selection/reselection may comprise one or more actions. When one or more of the conditions that trigger the remote WTRU to start a reselection procedure are met and/or other triggers are met, the remote WTRU may trigger higher layers to perform one or more of certain actions. The remote WTRU may trigger higher layers to initiate discovery monitoring process if the discovery monitoring process had been stopped. The discovery monitoring process may be a Model A or Model B. The remote WTRU may trigger higher layers to initiate the remote WTRU to send a new Model B solicitation message. For example, the remote WTRU may trigger higher layers to initiate the remote WTRU to send a new Model B solicitation message to discover other mobile relays that are capable of supporting the required services. The remote WTRU may trigger higher layers to initiate the lower layers to perform updated measurements/quality associated with a potential mobile relay WTRU that has been detected. The remote WTRU may send to higher layers updated measurements/quality associated with a potential mobile relay WTRU. For example, measurements may be taken on one or more of the channels or signals described herein. The remote WTRU may trigger higher layers to perform mobile relay selection procedure based on provided measurements and services advertised for the given mobile relay. The remote WTRU may trigger the lower layers to perform targeted measurements of the mobile relays that initially responded to the Model B solicitation message or for which Model A messages for given mobile relays were received if the lower layer supports the targeted measurements. The remote WTRU may trigger the lower layers to perform targeted measurements through the application layer. The list of mobile relay WTRUs may be provided to the lower layers. For example, the list of mobile relay WTRUs may be provided to the lower layers as a list of L2 IDs. The lower layers may return with corresponding measurements for one or more of the identified WTRUs.

Autonomous mobile relay selection/reselection may comprise various further actions. A selection or reselection of a mobile relay WTRU may or may not be successful. For example, if mobile relay reselection is unsuccessful, a mobile relay redirection message may be received. The WTRU may perform one or more actions upon receiving a mobile relay redirection message. For example, the remote WTRU may perform one or more of the certain actions prior to moving to a new mobile relay upon receiving a mobile relay redirection action.

For example, upon receiving a mobile relay redirection action the remote WTRU may verify that a suggested mobile relay is part of the ranked list of mobile relays. The WTRU may verify that a suggested mobile relay meets the selection criterion (e.g., supports the service requested by the WTRU and/or has a channel quality that exceeds as threshold). For example, if a suggested mobile relay is not part of the ranked list of mobile relays, the remote WTRU may stay connected to its current mobile relay. If a suggested mobile relay is part of the ranked list of mobile relays and meets the selection criterion, the remote WTRU may initiate mobile relay selection to the suggested mobile relay. The remote WTRU may perform a connection establishment procedure with the suggested mobile relay.

Upon determining to reselect to a candidate mobile relay, the remote WTRU may perform one or more actions. For example, upon determining to reselect to a candidate mobile relay, the remote WTRU may tear down the connection with the mobile relay to which the remote WTRU is currently connected. Upon determining to reselect to a candidate mobile relay, the remote WTRU may initiate a connection establishment to the reselected candidate mobile relay.

In an example, rather than tearing down the connection to the current mobile relay, upon determining to reselect to a candidate mobile relay, the remote WTRU may keep the connection to the current mobile relay while attempt a connection establishment procedure with the reselected candidate mobile relay. The remote WTRU may tear down the connection to the mobile relay to which the remote WTRU is connected when it has successfully established a connection with the reselected candidate mobile relay. The connection to the mobile relay to which the remote WTRU is connecting may be torn down, after the remote WTRU has ensured that the remote WTRU has started to receive services from the reselected candidate mobile relay. For example, the services may be via eMBMS.

Autonomous mobile relay selection/reselection may be supported. Reselection may be supported by various layers. For example, reselection may be supported by the remote WTRU upper layers (e.g., Application layer). As an example, the WTRU may be configured to continuously (e.g., regularly or relatively continuously, at set intervals, etc.) perform measurements of the mobile relay to which the remote WTRU is connected. For example, the remote WTRU upper layers may configure continuous measurements of the mobile relay to which the remote WTRU is connecting. The upper layer may request the lower layers to send measurements associated with the currently connected mobile relay and/or mobile relays that transmitting measurable signals. Upper layers may configured the lower layers to measure one or more other mobile relays, which may be identified by a mobile relay ID. When the remote WTRU has been successfully connected to a mobile relay WTRU, the upper layers in the remote WTRU may configure measurements to be performed by the lower layers on the mobile relay. When requested by the upper layers, the lower layers may stop collecting measurements on the SL-SCH for the specific mobile relay ID. For example, the upper layers may request the lower layer to stop collecting measurements on the SL-SCH for the mobile relay ID when the remote WTRU terminates a connection to the mobile relay.

For autonomous mobile relay selection/reselection, the remote WTRU may inform the eNB of the identity of a selected mobile relay. For example, a mobile relay selection/reselection may occur while the remote WTRU is still in coverage of the eNB. The selection/reselection may occur autonomously. The WTRU may inform the eNB the identity of the selected mobile relay. The WTRU may inform the eNB of relevant information about the selected mobile relay. Relevant information about the selected mobile relay may include one or more of mobile relay identification information (e.g., Mobile relay L2 ID, PHY layer ID, and/or the like), the identity of the eNB to which the mobile relay is connected, measured signal quality (e.g., PC5 measurements) of the mobile relay, access point name (APN) or connectivity information broadcast by the mobile relay, and/or the signal quality of the Uu link between the mobile relay and the eNB. Informing the eNB may occur through Uu and/or via a mobile relay.

A reselection of a mobile relay may be indicated to the eNB to inform the eNB of the reselected mobile relay. Indication of the reselection and the reselected mobile relay may occur periodically. Indication of the reselection and the reselected mobile relay may occur when the measured PC5 link quality with the selected mobile relay deteriorates. A WTRU may inform the eNB of the reselection and the reselected mobile relay (e.g., information of the reselected mobile relay) at connection establishment with the mobile relay.

Reselection to a new mobile relay may be triggered by the eNB. Reselection may be triggered by the eNB based on measurements, for example measurements that are reported by the remote WTRU. Measurements of the remote WTRU by the mobile relay WTRU may be performed and be sent to the eNB in order to facilitate eNB-based mobile relay reselection. The remote WTRU may take measurements of the PC5 link and send the measurements of the PC5 link to the eNB via the mobile relay WTRU. The remote WTRU may take measurements of the PC5 link and send the measurements of the PC5 link directly to the eNB when connection between the remote WTRU and the eNB is available (e.g., the remote WTRU is in coverage). The remote WTRU may indicate to the mobile relay WTRU that the measurements should be sent to the eNB (e.g., via the mobile relay WTRU) using an indication that indicates to the mobile relay WTRU that the measurements are intended to be sent to the eNB. For example, measurements that are intended for the eNB may be sent to the mobile relay WTRU using a dedicated message that that indicates that the measurements are meant for the eNB. The mobile relay WTRU may take measurements of the PC5 link between the mobile relay and the remote WTRU and send the measurements of the PC5 link between the mobile relay and the remote WTRU to the eNB.

The eNB or the mobile relay WTRU may send a configuration to the remote WTRU. The configuration may include indication to the remote WTRU to enable measurements, indication to the remote WTRU to send measurements, criterion that may be used by the remote WTRU to determine when a measurement report may be triggered from transmission to the eNB, and/or an allowable list of mobile relays which may be measured.

For example, the configuration may be broadcast by the mobile relay WTRU to some or all remote WTRUs connected to the mobile relay WTRU. A broadcast mechanism discussed herein may be used. The configuration for the remote WTRU may be derived from the same or a different measurement configuration for the mobile relay WTRU. The configuration for the mobile relay WTRU may be sent by the eNB to the mobile relay WTRU over the Uu link. For example, the configuration for the mobile relay WTRU may be sent using system information block (SIB) signaling or RRC signaling.

Based on the configuration, the remote WTRU may enable measurements over the PC5 link of mobile relay WTRUs which are transmitting discovery messages within the communication range of the remote WTRU. The allowable list of mobile relays which may be measured may be sent by the eNB to the remote WTRU. The allowable list of mobile relays which may be measured may be sent by the eNB to the remote WTRU as part of the configuration. The allowable list of mobile relays to which the remote WTRU is allowed to reselect may be sent by the eNB to the remote WTRU as part of the configuration.

The remote WTRU may receive a configuration indicating that the remote WTRU may send measurements to the eNB via the mobile relay WTRU and may use an indication in a measurement report that indicates to the mobile relay WTRU that the measurements are meant for the eNB. The remote WTRU may compile a list of measurements and transmit the list of measurements to the mobile relay WTRU using an indication that the measurements are meant for the eNB. The indication and the measurements may include a list of one or more mobile relay WTRUs, the signal qualities for the one or more mobile relay WTRUs, and/or quality measurements for some or all mobile relay WTRUs that are reported. The indication and the measurements may be sent using a MAC CE over PC5.

The configuration may include criterion that may be used by the remote WTRU to determine when a measurement report may be triggered from transmission to the eNB. The WTRU may trigger a report to the eNB when one or more of the configured criterion is met and when one or more of the criterion described herein as part of WTRU autonomous reselection are met. Example criterion for triggering a measurement report to the eNB may include information that the signal quality for the mobile relay to which the remote WTRU is connected may be below a threshold for a given time period. Example criterion for triggering a measurement report to the eNB may include information that the mobile relay to which the remote WTRU was connecting may no longer be detected. Example criterion for triggering a measurement report to the eNB may include information that a different candidate mobile relay WTRU may be detected. The WTRU may trigger a report to the eNB when one or more of the configured criterion is met and when one or more of the criterion described herein as part of WTRU autonomous reselection are met.

For example, a different candidate mobile relay WTRU may be detected when a candidate mobile relay WTRU meets the higher layer configured connection criterion. The remote WTRU may select the candidate mobile relay when the signal quality of the different candidate mobile relay WTRU may be above a threshold for a period of time. The remote WTRU may select the candidate mobile relay when the signal quality of the different candidate mobile relay WTRU may be better than the mobile relay to which the remote WTRU was connecting by a threshold for a period of time.

The mobile relay WTRU may send the measurements over the Uu interface to the eNB. For example, the mobile relay WTRU may send the measurements over the Uu interface to the eNB when receiving a measurement packet (e.g., a MAC CE or a RRC-like message) over the PC5 interface from the remote WTRU. This measurement report may be sent using RRC signaling and/or MAC CE. The measurement report may contain identification of the remote WTRU making the measurements. The identification may include L2 ID, physical layer ID, and/or the like. The measurement report may contain a list of measured mobile relay WTRUs. The list of measure mobile relay WTRUs may be reported in terms of L2 ID or physical layer ID. The measurement report may contain associated measurements for a mobile relay. The measurement report may contain the measurement quality of the mobile relay to which the remote WTRU is connecting. The measurement report may contain type of service requested by the WTRU.

The list of mobile relay WTRUs that the remote WTRU may report to the eNB may be filtered at the application layer based on application-layer services of application layer information sent in the discovery message. A mobile relay may or may not serve the purposes of a remote WTRU. When a mobile relay does not serve the purposes of a remote WTRU, the remote WTRU may or may not send measurements to the eNB for the mobile relay. A mobile relay may or may not offer the services. When a mobile relay does not offer the services, the remote WTRU may or may not send measurements to the eNB for the mobile relay. A mobile relay may be on a non allowed or unauthorized PLMN. When a mobile relay is on a non allowed or unauthorized PLMN, the remote WTRU may or may not send measurements to the eNB for the mobile relay. The eNB may control reselection based on the list of mobile relays that may serve the remote WTRU.

The remote WTRU may receive a command to perform a reselection to a mobile relay that is measured and reported to the eNB. The remote WTRU may receive a command to perform a reselection to a mobile relay that is measured and reported to the eNB at a time of the mobile relay selection/reselection procedure. The eNB may send the information to the mobile relay WTRU using RRC message. The mobile relay WTRU may send a RRC message to the remote WTRU over the PC5 interface. The RRC message that is sent from the mobile relay WTRU to the remote WTRU may be similar to the RRC message that is sent from the eNB to the mobile relay WTRU. A MAC CE may be used to transfer a reselection command.

Upon determining a reselection of a candidate mobile relay, the remote WTRU may perform one or more of certain actions. Upon determining a reselection of a candidate mobile relay, the remote WTRU may tear down the connection with the mobile relay to which the remote WTRU is connecting. Upon determining a reselection of a candidate mobile relay, the remote WTRU may initiate a connection establishment to the reselected candidate mobile relay. Upon determining a reselection of a candidate mobile relay, the remote WTRU may keep the connection to the mobile relay to which the remote WTRU is connecting and attempt a connection establishment with the reselected candidate mobile relay. The remote WTRU may tear down the connection to the mobile relay to which the remote WTRU is connecting when it has successfully established connection with the reselected candidate mobile relay. The connection to the mobile relay to which the remote WTRU is connecting may be torn down, after the remote WTRU has ensured that the remote WTRU has started to receive services from the reselected candidate mobile relay. For example, the services may be eMBMS.

Selection/reselection of a mobile relay may be triggered by a combination of one or more of autonomous triggers and/or eNB triggers. The configuration received by the remote WTRU may control the reselection behavior of the remote WTRU. The behavior of the remote WTRU may depend on the measured signal strength of the mobile relay to which the remote WTRU is communicating. How reselection is performed may depend on the measured signal strength of the mobile relay to which the remote WTRU is communicating. This may allow the remote WTRU to have flexibility to perform mobile relay reselection on its own when the quality of the PC5 link and/or Uu link is degrading. The remote WTRU may or may not be able to successfully transmit the measurements to the mobile relay. The remote WTRU may be able to successfully transmit the measurements to the eNB.

The combination of autonomous and eNB triggers may be controlled by certain rules related to the Uu link quality. The combination of autonomous and eNB triggers may be controlled by certain rules related to the link state between the remote WTRU and the eNB, when the WTRU performs mobile relay selection/reselection in the coverage of the eNB.

If certain quality criteria for the Uu link between the eNB and the mobile relay WTRU are met, the remote WTRU may or may not perform mobile relay selection/reselection. For example, the remote WTRU may hold or delay the selection/reselection if under eNB coverage. The remote WTRU may wait to receive the choice of the mobile relay WTRU from the eNB. If the quality criteria of the Uu link is no longer met, the remote WTRU may autonomously trigger selection/reselection on its own. If the quality criteria of the Uu link is no longer met, the remote WTRU may autonomously select the mobile relay WTRU for connection. For example, the determination that the quality of the Uu link is low enough to merit autonomous selection/reselection may be related to a measured RSRP of the eNB. The determination that the quality of the Uu link is low enough to merit autonomous selection/reselection may be related to measurements made by the WTRU on the Uu link that are below a configured threshold for a configured period of time. A determination that the quality of the Uu link is low enough to merit autonomous selection/reselection may be based on the state of the RRC connection on the Uu link. For example, the state of the RRC connection on the Uu link following radio link failure (RLF) and/or the state of the RRC connection on the Uu link following an unsuccessful RRC connection re-establishment may be used.

For example, the remote WTRU may receive two thresholds as part of the configuration (e.g., thresh1>thresh2). If the measurements of the mobile relay WTRU to which the remote WTRU is connected is below thresh1, but still above thresh2, the remote WTRU may be triggered to start performing measurements of other mobile relay WTRUs. The remote WTRU may be triggered to start sending these measurements to the eNB. The mechanism discussed for eNB-triggered reselection may be used, for example while the mobile relay WTRU to which the remote WTRU is connected is below thresh1, but still above thresh2. If the measurements of the mobile relay WTRU to which the remote WTRU is connected are below thresh2, the mobile relay WTRU may initiate a mobile relay reselection procedure. For example, the mobile relay reselection procedure may be as described for remote-WTRU autonomous reselection based on the mobile relay signal quality falling below thresh2. The WTRU may perform autonomous reselection, and upon reselection criteria being triggered, the WTRU may notify the eNB of the reselection decision.

Upon reselecting a mobile relay, the WTRU may autonomously initiate a connection establishment procedure to the reselected candidate mobile relay. In an example, the remote WTRU may wait for an explicit indication from the eNB, and for example the explicit indication may inform the remote WTRU whether to initiate the connection establishment to the reselected mobile relay WTRU. The eNB may proactively stop the establishment of a connection to the reselected mobile relay. Upon reselection to the mobile relay, the WTRU may indicate to the reselected mobile relay the identity of the mobile relay to which the remote WTRU is connecting. Indicating to the reselected mobile relay the identity of the mobile relay to which the remote WTRU is connecting may occur in the establishment request or over a new PC5 message.

An internal state or condition within the WTRU, the eNB, and/or combination of the two, may affect how reselection is performed. For example, in the case of a remote WTRU starting from in-coverage and moving out of coverage of an eNB, how the reselection is performed when the remote WTRU is in RRC_CONNECTED may be different from when the WTRU is in RRC_IDLE. For example, in the RRC_CONNECTED state, reselection may be eNB controlled. The eNB may be allowed make a decision about which mobile relay the WTRU may be connected to. The remote WTRU may use transmission resources when the remote WTRU is connected to the mobile relay. The remote WTRU was previously actively transmitting with the eNB in connected mode. If the remote WTRU is in RRC_IDLE, the remote WTRU may perform a WTRU-autonomous mobile relay selection. The remote WTRU may potentially receive eMBMS traffic from the eNB. The remote WTRU may expect to receive eMBMS from a mobile relay WTRU.

Lower layer measurements may be used to support the selection/reselection procedures. The upper layer may configure the measurements of the lower layers. The upper layer may enable the measurements at different times or continuously on relays including the relay to which the remote WTRU is connected.

Enhancements to R12 discovery/communication and measurement procedures may be introduced to provide a measurement quality of the mobile relay WTRU as seen by the remote WTRU. An indication of the quality of a mobile relay WTRU from the remote WTRU may be provided. An indication of the quality of a mobile relay WTRU from the remote WTRU may be provided to the higher layer.

Measurement configuration of the lower layers (e.g., PHY/MAC/RRC) may be done by the upper layers. The upper layers may configure the lower layers to report measurements associated with transport blocks coming from a source. The transport blocks may come from a specific source or from any number of sources identified as mobile relays. The source or sources may be identified as the source WTRU ID. The source or sources may found in the MAC header of the SL-SCH. The source or sources may found in the layer 1 ID decoded in the SA. The source or sources may be found in the ID retrieved from the PSBCH. The source or sources may be received from a resource reserved for sending messages or signals.

Measurements may be enabled by the upper layers (e.g., higher layer) at different times. The measurements may be enabled during the period of time when the upper layer is expecting a Model B response message and/or a Model A announcement message. The Model B response message and/or the Model A announcement message may be transmitted by a potential mobile relay. The measurements may be disabled by the upper layers of the remote WTRU. The measurements may be disabled by the upper layers of the remote WTRU when some or all expected discovery messages are received. Some or all expected discovery messages may be received after the expiry of a timer.

The measurements may be enabled continuously to allow for measurements of mobile relay WTRUs on a continual basis. Measurements may be enabled continuously on the mobile relay to which the remote WTRU is connecting. The measurements on other mobile relays may be started and/or stopped. Measurements may be enabled continuously based on the value of the measurements. For example, if the measurements on the mobile relay to which the remote WTRU is connecting go below a specific threshold, the upper layers may enable measurements on the other mobile relays that were ranked and measured. If the measurements on the mobile relay to which the remote WTRU is connecting go below a specific threshold, the upper layers may perform measurements on some or all mobile relays sending announcements. The threshold may be configured in the remote WTRU by the upper layers or by the mobile relay WTRU or eNB. The threshold may be sent to the remote WTRU from the mobile relay WTRU or the eNB during the establishment of the secure link with the remote WTRU.

To support measurements of a mobile relay WTRU, the PSBCH may be transmitted by a WTRU that acts as a mobile relay at a given time. The upper layers of the mobile relay WTRU may enable the transmission of the PSBCH whenever a mobile relay connection is made to the mobile relay, and/or disabled whenever the WTRU no longer has mobile relay connections to it.

The remote WTRU may perform measurements of the sidelink broadcast channel SL-BCH (sidelink broadcast channel) and/or sidelink shared channel (SL-SCH).

The remote WTRU may perform measurements on DMRS that is transmitted by the mobile relay WTRU on the SL-SCH. This may be done, for example, where the Model B discovery response or Model A mobile relay announcements are sent by the remote WTRU through D2D communications (e.g., on SL-SCH).

The measurements/quality of the mobile relay WTRU may be based on measurements made by the remote WTRU of the DMRS transmitted in the PSBCH. To allow measurement procedures (e.g., measurements of SL-SCH), the R12 PSBCH may be enhanced to include, in the payload, the L2 WTRU ID of the WTRU transmitting the PSBCH. To allow measurements during the Model B response or Model A announcement when the response is transmitted using D2D discovery, D2D discovery may be enhanced so that the PSBCH is transmitted during D2D discovery. For example, the upper layers in the mobile relay WTRU may configure the lower layers to transmit PSBCH using the D2D discovery to send the Model B response.

Radio access network level relay control may comprise operations and procedures to preselect relays and/or initiate relays at various stages including relay discovery, relay connection request, request to receive broadcast from a TMGI, and/or the like.

Mobile relay operation may be controlled by the eNB. The eNB may perform resource allocation for mobile relay operation. For example, the eNB may specify which resources should be used by a mobile relay WTRU for communicating with a remote WTRU (e.g., and/or vice versa). The eNB may allow/reject mobile relay operation depending on available resources, optimized resource, and WTRU to mobile relay grouping. The eNB may interact with higher layer following certain procedures. For example, the mobile relay may send a request and/or report to the eNB.

To enable RAN control of mobile relay operation, the mobile relay WTRU may initiate a transmission of a report and/or a request to the eNB. The mobile relay WTRU may send the request according to one or more of the following triggers. The triggers may include pre-selection occurring prior to a higher-layer mobile relay discovery operation. The triggers may include initiation of model A discovery for a mobile relay. The triggers may include initiation of Model B discovery for a mobile relay when the mobile relay is in a monitoring mode. The triggers may include initiation of Model B discovery for a mobile relay when the mobile relay wants to initiate the transmission of the solicitation message. The triggers may include reception of a solicitation message (e.g., from Model B) for which the WTRU is allowed to send a response message. The solicitation message may be from Model B discovery. The triggers may include request by the remote WTRU to establish a one-to-one connection. The triggers may include successful connection completion as determined by higher layers. The triggers may include request by a remote WTRU to receive broadcast messages for a specific TMGI. The triggers may include detection of TMGI that it has been requested to monitor a WTRU requested TMGI from the eNB. The triggers may include request by the remote WTRU to change the type of service. For example, changing the service may include starting a different video call over the same mobile relay link. Changing the service may include dropping an existing service. Changing the service may include stopping the link to a service.

The request/report may contain certain information. The request/report may contain type of discovery. The type of discovery may be mobile relay, group member, or the like. The request/report may contain discovery model type. The discovery mode type may be Model A or Model B. The type of discovery may contain stage of Model B. The state of Model B may include monitoring for solicitation message, transmission of solicitation message, solicitation message received and trigger of response required, or the like. The request/report may contain connection information. The connection information may be to help the eNB determine whether the eNB supports a service. The connection information may be to help the eNB determine whether the mobile relay may act as a mobile relay. The request/report may contain measurement report indicating the signal strength with respect to the eNB. The request/report may contain ID of the remote WTRU. The request/report may contain ID of a detected mobile relay announcing mobile relay operation or announcing a service. The request/report may contain TMGI requested by the WTRU(s). The request/report may contain TMGI detecting that the mobile relay has been requested to monitor. The request/report may contain measurements of the selected mobile relay and/or other mobile relays. The measurements may be made by a remote WTRU and/or by the mobile relay WTRU. The request/report may contain an indication of services and/or resources needed by the remote WTRU.

The request message may be MOBILE RELAY_REQUEST_MESSAGE. Depending on which stage the request message is sent in, the response from the eNB may configure different behavior in the WTRU. The MOBILE RELAY_REQUEST_MESSAGE may be sent to the eNB through RRC or MAC CE. The MOBILE RELAY_REQUEST_MESSAGE may trigger the assignment of resources by the eNB to be used by the mobile relay. The MOBILE RELAY_REQUEST_MESSAGE may trigger outright rejection of the request by the eNB.

A WTRU may be configured to act as a mobile relay and/or reject mobile relay-related operations before and/or after initialization of mobile relay related procedures. The mobile relay related procedures may include discovery, establishment of connection, TMGI request, and/or the like.

A WTRU may be configured to act as a mobile relay during pre-selection processes based on the WTRU's capability to act as a mobile relay, the number of remote WTRUs that the WTRU may be able to serve as determined by a prediscovery procedure, and/or the location of the WTRU. The pre-selection may occur before the WTRU receives higher-layer requests for operation as a mobile relay. A process of pre-selection of mobile relay WTRUs may be performed so that in-coverage WTRUs are selected to serve as mobile relay WTRUs in an intelligent manner. When information may be communicated by a mobile relay WTRU, multiple WTRUs mobile communicating the same information may be avoided by performing the pre-selection process. Pre-selection of mobile relay WTRUs may be performed by the eNB and/or the network. Pre-selection of mobile relay WTRUs may be performed by the eNB and the network acting in coordination. The network, the application/function, or a combination of the network, the application/function may be involved in the pre-selection (e.g., by the eNB).

The eNB may configure a WTRU to act as a mobile relay based on the WTRU's capability. The WTRU may register with the eNB and provide its capabilities to the eNB and/or the network. The WTRU may provide information about whether it is capable of operating as a mobile relay. The WTRU may provide information about its mobile relay properties. For example, the mobile relay properties may include whether the WTRU may operate using one or more separate radios, separate operating frequencies/bands, and/or the like.

Figure 8:
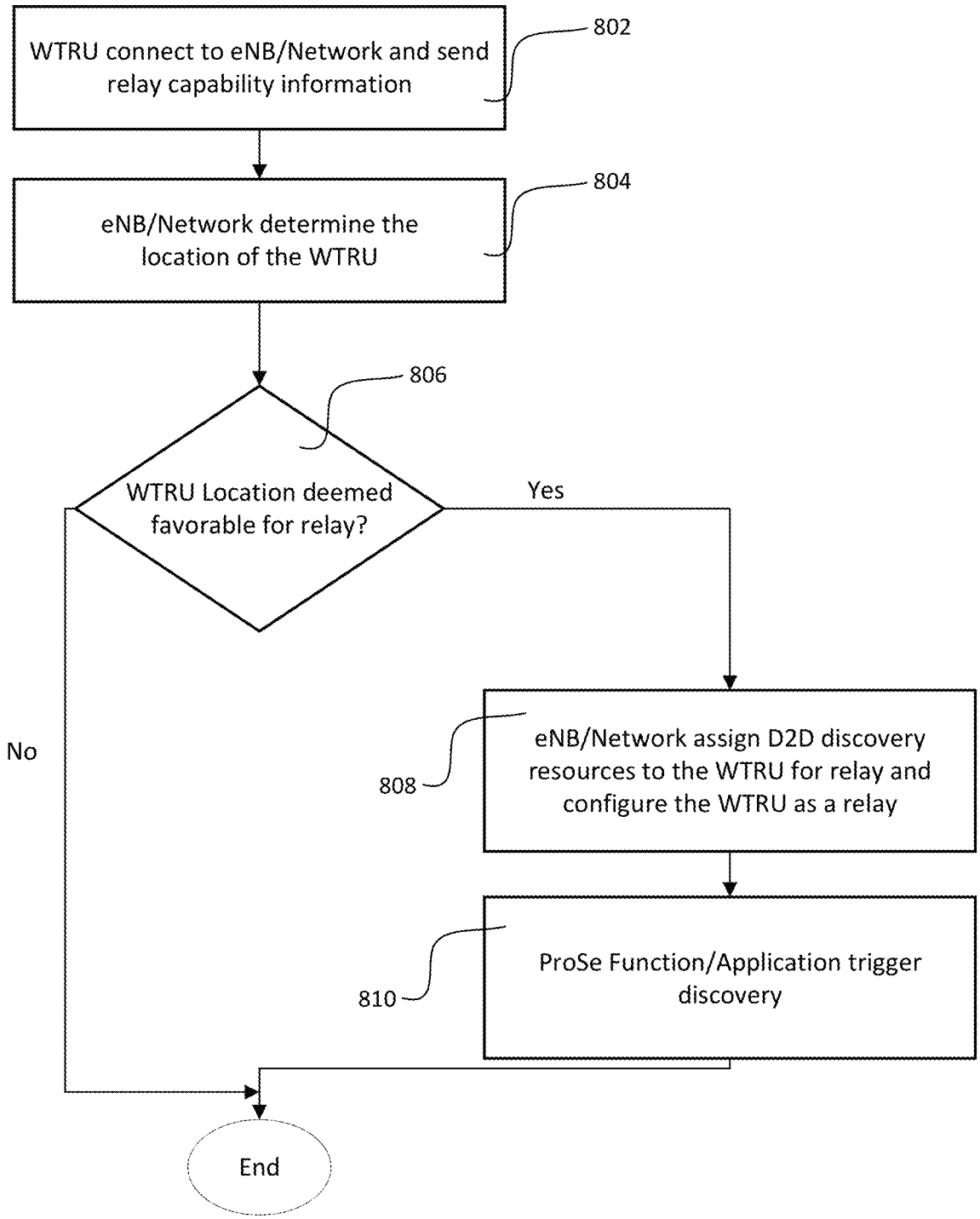
FIG. 8 is a diagram of an example of pre-selection of a mobile relay WTRU based on location.

A pre-selection of a mobile relay may be made based on the location of the mobile relay. The eNB may configure the WTRU to operate as a mobile relay and allow it to participate in mobile relay discovery based on the location of the WTRU and/or the capability of the WTRU to act as a mobile relay. FIG. 8 illustrates an exemplary pre-selection based on location. The WTRU may connect to the eNB and/or send its mobile relay capability information to the eNB at 802. The capability information may include frequencies on which the WTRU may operate. The capability information may include ability to operate with separate radios. The capability information may include ability to release support. For example, the ability to release support may include whether the WTRU supports mobile relay operation. The eNB may determine the location of the WTRU at 804. The eNB may use channel quality measurements. The eNB may use specific functions for localization. Specific functions for localization may be obtained from higher layers.

The eNB may decide whether or not to allow the WTRU to function as a mobile relay at 806. The eNB may use the eNB'ss knowledge of the WTRU's location relative to the eNB. For example, the eNB may decide to configure a WTRU as a mobile relay if the WTRU is close to the coverage edge of the eNB at 806. The WTRU that is close to the coverage edge of the eNB may serve a maximum number of potential remote WTRUs which are outside the coverage area of the eNB. WTRUs which are known by the eNB to be relatively close to the eNB may or may not be configured by the eNB as a mobile relay at 806. For example, if other options exist, WTRUs which are known by the eNB to be relatively close to the eNB may not be configured by the eNB as a mobile relay. The other options may include a mobile relay WTRU at the edge of the coverage area of the eNB. The eNB may or may not advertise the WTRUs which are known by the eNB to be relatively close to the eNB to WTRUs that are searching for a mobile relay. The preselection process may end.

The eNB may send a message to the WTRU to configure the WTRU to participate in mobile relay discovery or to disable mobile relay discovery at 808. If the WTRU is allowed to operate as a mobile relay, the eNB may assign discovery or communication resources to the mobile relay. The eNB may send an RRC message to configure/reconfigure the mobile relay D2D resources. For example, the eNB may configure the higher layers in the mobile relay to listen to a solicitation message and/or to send the Model A announcement message. The WTRU may receive a positive indication to behave as a mobile relay. The WTRU may indicate to the higher layers that it is able to accept mobile relay solicitation messages. The WTRU may start transmission of Model A discovery announcement message at 810. The WTRU may receive a negative indication. The negative indication may indicate that the WTRU may not act as a mobile relay. The WTRU may trigger the notification to upper layers. The notification may notify the upper layers not to transmit Model A announcement or not to respond to Model B solicitation messages. The eNB may or may not configure discovery resources for the WTRU if the WTRU may not act as a mobile relay.

If mobile relay operation is accepted, the eNB and/or the mobile relay may initiate reconfiguration of the mobile relay resources at 808. The resources may be used for discovery at 810. The discovery may include Model A and/or Model B discovery. For example, for Model A discovery, mobile relay WTRU may transmit discovery announcement for mobile relay discovery. The WTRU may request additional mobile relay resources based on the results of the relay initiation during relay discovery and/or relay initiation during request to receive broadcast from TMGI.

Pre-selection based on location may be performed through signaling. The eNB may use signaling to provide the WTRU with acceptable locations for mobile relay operation. The signaling may include broadcast or dedicated RRC signaling. For example, the eNB may signal the allowable location(s) for mobile relay operation via broadcast signaling. The WTRU may perform its own determination of whether the WTRU's location may be within the acceptable locations for mobile relay operation. The WTRU may perform its own determination of whether the WTRU's location may satisfy the location requirements of the eNB and/or whether the WTRU's location may satisfy other requirements. If the WTRU determines that the WTRU's location satisfies the location requirements of the eNB and other requirements, the WTRU may operate as a mobile relay. The WTRU may utilize resources assigned by the eNB to perform discovery. The eNB may have assigned resources through dedicated and/or broadcast signaling.

A pre-selection of a mobile relay may be made based on pre-discovery of WTRUs that may act as remote WTRUs. An eNB/Network/function may initiate a pre-discovery procedure to determine which WTRUs may be configured as mobile relays for which potential remote WTRUs. The pre-discovery procedure may use R12 D2D discovery to determine which WTRUs are in proximity of each other. The pre-discovery procedure may use R12 D2D discovery to determine which WTRUs are capable of mobile relay operation. The pre-discovery procedure may use R12 D2D discovery to determine which WTRUs may serve the maximum number of remote WTRUs.

For example, an eNB may perform the pre-discovery procedure. The eNB may perform the pre-discovery procedure periodically. The eNB may use the pre-discovery procedure eNB to designate potential mobile relay WTRUs within the eNB coverage. The eNB may initiate the procedure when a number of WTRUs are already operating as mobile relays. The eNB may use the pre-discovery procedure eNB to have mobile relay WTRUs cease operation as mobile relay WTRUs.

The pre-discovery procedure may comprise one or more of the following steps in any order. In the pre-discovery procedure, the eNB may configure some or all D2D capable WTRUs within its coverage which have registered with the network to listen for discovery messages on a pre-configured discovery resource pool. In the pre-discovery procedure, a remote WTRU may perform a self-initiated discovery message to find D2D WTRUs which may serve as mobile relays. The remote WTRU may perform a self-initiated discovery message when it is turned on without coverage of an eNB. The remote WTRU may perform a self-initiated discovery message when it moves to an out-of-coverage scenario. A code for the self-initiated discovery message may be hardcoded or otherwise preconfigured in the WTRU. A default value may be used for Mobile relay Search. The discovery message may contain "Mobile relay Search" code. The discovery message may contain an identifier for the WTRU. The identifier for the WTRU may be used to identify which WTRUs sent the discovery message. The identifier for the WTRU may be used to identify which WTRUs are searching for a mobile relay. The identifier may be part of the application code within the discovery message. A remote WTRU that is out of coverage of an eNB may use pre-configured discovery resources as defined in R12. Out-of-coverage WTRUs which are already being served by a mobile relay may or may not send the discovery message.

In the pre-discovery procedure, some or all D2D WTRUs that successfully receive the discovery message with the application code of "Mobile relay Search" may report the reception of the discovery message to the eNB/Network. The report may be performed via RRC message, MAC CE, and/or application message. The report may contain the identity of the remote WTRU. The D2D capable WTRUs may be responsible for sending the report. The D2D capable WTRUs may compile a report containing some or all remote WTRUs for which it received a discovery message with the code of "Mobile relay Search" for a certain period of time.

In the pre-discovery procedure, the eNB may collect some or all reports from the various D2D capable WTRUs within its coverage. The eNB may designate a set of WTRUs which are in coverage to act as mobile relays. The eNB may designate the set of WTRUs based on the reported remote WTRUs. The eNB may designate the set of WTRUs based on which WTRUs that are in the coverage reported the remote WTRUs for multiple times. In the pre-discovery procedure, the eNB may indicate to core network that a WTRU or a set of WTRUs may be configured as WTRU-Network mobile relays. In the pre-discovery procedure, the selected coverage WTRUs may be configured as mobile relays. The selected mobile relay WTRUs may perform a mobile relay discovery operation. The mobile relay discovery operation may be based on Model A and/or Model B.

A WTRU may be configured to act as a mobile relay and/or reject mobile relay-related operations after initialization of mobile relay related procedures. Mobile relay initiation may occur at various stages. Mobile relay initiation may occur during mobile relay discovery. If the eNB and WTRU support mobile relay operation, higher layers associated with the WTRU may initiate mobile relay related procedures. The WTRU may trigger a report or request to the eNB. The mobile relay related procedures may include Model A, Model B, mobile relay announcement, WTRU to mobile relay establishment success, TMGI request, and/or the like.

The WTRU may trigger a report to the eNB when Model A discovery procedure is triggered in the WTRU by higher layers. The WTRU may trigger a report to the eNB when Model B solicitation request is received and the mobile relay WTRU may send a response. The response may be sent according to higher layers.

Certain information may be provided to the eNB. The report may contain the information. The information may include discovery type. The discovery type may include mobile relay discovery (e.g., WTRU-to-network discovery), group member discovery, or WTRU-to-WTRU mobile relay discovery. The information may include type of message. The types of message may include announcement, solicitation, and/or response. The information may include connection information. The connection information may include what the mobile relay WTRU intends to announce. The connection information may include what the mobile relay WTRU intends to send in the response message. The information may include the received WTRU ID and/or the group of the received WTRU IDs in the solicitation message if the discovery is model B response type. The information may include WTRU ID or mobile relay ID of the WTRU that is sending the report to the eNB. The information may include channel quality measurement of the WTRU that is sending the message or location information of the WTRU that is sending the message. The channel quality measurement may be for the eNB, for detected mobile relay WTRUs, and/or for remote WTRUs.

The eNB may take certain actions. The eNB may receive a request (e.g., a request for a mobile relay WTRU). The eNB may determine whether to allocate resources to the potential candidate mobile relays WTRUs for the requested services. The eNB may determine whether to allow the operation of the WTRU as a mobile relay. To allow the operation of the WTRU as a mobile relay, the eNB may allow the initiation of the transmission of discovery messages, announcement, and/or WTRU response.

The eNB may determine whether to allow mobile relay operation of the potential candidate WTRU based on the reports sent by the WTRU. The eNB may determine whether to allow mobile relay operation of the potential candidate WTRU based on certain information. The eNB may determine whether to allow mobile relay operation of the potential candidate WTRU based on reported remote WTRUs and/or the number of mobile relay WTRUs that indicate solicitation requests and/or mobile relay establishment from the reported remote WTRUs. The eNB may determine whether to allow mobile relay operation of the potential candidate WTRU based on service requested by the remote or mobile relay WTRU, if the network supports that type of service. The eNB may determine whether to allow mobile relay operation of the potential candidate WTRU based on the location of the WTRU with respect to the eNB. The location of the WTRU with respect to the eNB may be determined based on measurement received. The eNB may determine whether to allow mobile relay operation of the potential candidate WTRU based on candidate mobile relay WTRUs detected in the proximity of the potential candidate mobile relay WTRU that is requesting to become a mobile relay. Based on the reports sent by the WTRU and the information, the eNB may determine whether to allow mobile relay operation and may respond to the potential candidate WTRU by allocating resources, if resources are not already available in the WTRU. The eNB may send an explicit message indicating that mobile relay operation is allowed.

The potential candidate mobile relay WTRU may take certain actions. The WTRU may initiate the transmission of higher layer message and/or reconfiguration of the mobile relay resources when the potential candidate mobile relay WTRU receives a message providing resources for the requested service. The WTRU may initiate the transmission of higher layer message and/or reconfiguration of the mobile relay resources when the potential candidate mobile relay WTRU receives an explicit approval of mobile relay operation. The WTRU may initiate the transmission of higher layer message and/or reconfiguration of the mobile relay resources when the WTRU determines that the criterion to become a mobile relay has been met. The criterion may be configured by the eNB. Mobile relay operation discovery transmission may be rejected. When mobile relay operation discovery transmission may be rejected, the higher layers may stop the discovery message transmission.

Mobile relay initiation may occur during a Mobile relay Connection Request. A mobile relay WTRU may send a report to the eNB when a connection with a remote WTRU has been requested to be established. A mobile relay WTRU may send a report to the eNB when a connection with a remote WTRU has been established.

Mobile relay initiation may occur during mobile relay connection request. The mobile relay WTRU may be triggered to send a report and/or request to the network when certain events occur. The triggering events may be that the mobile relay WTRU has established a successful connection with a remote WTRU. The higher layers may determine whether the mobile relay WTRU has established a successful connection with a remote WTRU. A successful connection may be established with additional remote WTRUs. The triggering event may be that the mobile relay WTRU has established a successful connection with an additional remote WTRU. The triggering event may be that the mobile relay WTRU has established a successful connection with a remote WTRU that belongs to a group different from a group for the remote WTRU. The triggering event may be that the mobile relay WTRU has established a successful connection with a remote WTRU that may request a type of service different from the services requested by the remote WTRU. The triggering event may be that the mobile relay WTRU receives a connection establishment message from an additional remote WTRU. The triggering event may be that the remote WTRU requests additional or different services. The triggering event may be that the remote WTRU disconnects from a mobile relay WTRU. The triggering event may be that a TMGI request is not renewed by the remote WTRU, indicating that the remote WTRU may or may not use the services of the mobile relay.

A report may comprise identifications of remote WTRU or potential remote WTRUs and/or service related information. The report may be the same report that was sent when the triggering events occur. The information in the report may include the remote WTRU identity (e.g., WTRU ID), a list of WTRUs with which the remote WTRU is connected, and/or the WTRU ID(s) of the remote WTRUs that request connection establishment or have requested connection establishment. The information in the report may include the service or any other service-related information. The service information may include connection info and/or group info. Service related information may include connection information. Connection may be for requesting a list of available TMGIs. For example, connection may be for requesting to connect to a broadcast service. Connection may be for one-to-one communication. The one-to-one communication may include file download from a server. The information in the report may include measurements with respect to the eNB.

The eNB may accept or reject the request and or report to connect, and/or the eNB may initiate a redirection process as described herein. The eNB may decide to not provide resources for mobile relay communication, to reject the connection to the remote WTRU, or to redirect. The determination may be based on the information that the eNB received. The received information may include services provided, TMGI requested, measurements, and/or methods described herein. The initiation of a mobile relay may be rejected by the eNB for various reasons. For example, the eNB may not be able to provide communication resources that is used for the mobile relay connection (e.g., even though the mobile relay WTRU may be able to be configured using discovery resources). Other mobile relays in the system may be present that can offer the services of the remote WTRU.

The mobile relay WTRU may forward the rejection to the higher layers. Reception of the rejection by the higher layers may trigger the higher layer to initiate a procedure to break and/or reject the connection with the remote WTRU. For example, the mobile relay WTRU may reject a connection by not continuing the connection establishment procedure with the higher layers and/or by sending a connections establishment failure message to the remote WTRU. A report provided herein may be sent to the eNB prior to the connection between the mobile relay WTRU and the remote WTRU is fully approved by the function. For example, a report provided herein may be sent to the eNB when the connection establishment procedure from a remote WTRU to a mobile relay WTRU is initiated. Forward the rejection to the higher layers may initiate the breaking or stopping of the connection between the remote WTRU and the mobile relay WTRU such that the remote WTRU may find another candidate mobile relay WTRU.

Mobile relay initiation may occur during a request to receive broadcast from a TMGI. The eNB may reject a request that comes from a remote WTRU asking to receive eMBMS broadcast from a mobile relay. An eNB may reject the initiation of a mobile relay or the connection of the remote WTRU to the mobile relay during a request to receive broadcast from a TMGI for various reasons. For example, the eNB may or may not be able to provide sufficient resources to the mobile relay to broadcast traffic for the associated TMGI. An eNB may reject initiation of the mobile relay to remote WTRU connection such that the remote WTRU may connect to another mobile relay that may be broadcasting the requested TMGI. An eNB may or may not have resources to assign to the mobile relay WTRU. The mobile relay WTRU may be operating as a mobile relay for other remote WTRUs.

A potential rejection of mobile relay connection by the eNB during the request to receive broadcast from a TMGI may be supplemented by identifying one or more alternative mobile relay WTRUs to which the remote WTRU may connect to obtain the services. Identifying one or more alternative mobile relay WTRUs to which the remote WTRU may connect to obtain the services may allow the eNB to control which mobile relay WTRUs may forward broadcast services related to a specific TMGI. Being able to control which mobile relay WTRUs may forward broadcast services related to a specific TMGI may avoid a scenario where different mobile relay WTRUs may be transmitting broadcast services associated with the same TMGI to different remote WTRUs. Services associated with the same TMGI may be broadcasted by a mobile relay WTRU to different remote WTRUs. Multiple remote WTRUs may be connect to the same mobile relay WTRU.

An eMBMS broadcast that is sent by a mobile relay WTRU may be controlled by the eNB through the transmission of a request. For example, the request may be BROADCAST_MOBILE RELAY_REQUEST_MESSAGE from the mobile relay WTRU to the eNB. The upper layers may trigger the lower layers of the mobile relay WTRU to send the BROADCAST_MOBILE RELAY_REQUEST_MESSAGE to the eNB in one or more of the following scenarios. The upper layers may trigger the lower layers of the mobile relay WTRU to send the BROADCAST_MOBILE RELAY_REQUEST_MESSAGE to the eNB when the upper layers of the mobile relay WTRU receives a request from a remote WTRU to monitor a specific TMGI. The upper layers may trigger the lower layers of the mobile relay WTRU to send the BROADCAST_MOBILE RELAY_REQUEST_MESSAGE to the eNB when the upper layers of the mobile relay WTRU detects that a remote WTRU stops monitoring a specific TMGI that the remote WTRU is requesting. The upper layers of the mobile relay WTRU may receive a direct message that is sent from the remote WTRU to the mobile relay WTRU. The direct message may indicate that the upper layers of the mobile relay WTRU may stop monitoring a specific TMGI that the remote WTRU is requesting. The upper layers of the mobile relay WTRU may detect that the remote WTRU stops re-requesting the same TMGI after a certain predefined time period. The upper layers may trigger the lower layers of the mobile relay WTRU to send the BROADCAST_MOBILE RELAY_REQUEST_MESSAGE to the eNB when the upper layers of the mobile relay WTRU receive a request from a remote WTRU to monitor a TMGI which does not correspond to TMGIs that are monitored by the mobile relay WTRU. For example, the TMGI which does not correspond to TMGIs that are monitored by the mobile relay WTRU may include a new TMGI. Some or all broadcast messages associated with a TMGI may be sent over PC5 by the mobile relay using the same D2D resources. The upper layers may trigger the lower layers of the mobile relay WTRU to send the BROADCAST_MOBILE RELAY_REQUEST_MESSAGE to the eNB when the mobile relay WTRU stops monitoring a TMGI for WTRUs. The upper layers may trigger the lower layers of the mobile relay WTRU to send the BROADCAST_MOBILE RELAY_REQUEST_MESSAGE to the eNB when a mobile relay WTRU may periodically send the BROADCAST_MOBILE RELAY_REQUEST message to the eNB with the required information.

The BROADCAST_MOBILE RELAY_REQUEST message may contain certain information. The BROADCAST_MOBILE RELAY_REQUEST message may contain an indication of a cause(s) for sending the BROADCAST_MOBILE RELAY_REQUEST message. Exemplar causes may include a new WTRU requesting a TMGI to be monitored, a WTRU no longer monitoring a TMGI, a periodic report or the like. The BROADCAST_MOBILE RELAY_REQUEST message may contain the TMGI that is requested to be monitored and communicated. The BROADCAST_MOBILE RELAY_REQUEST message may contain the WTRU ID of the remote WTRU that is requesting the TMGI and/or the WTRU ID of the remote WTRU that has stopped requesting the reception of a TMGI. The WTRU ID may be L2 WTRU ID, the physical layer ID of the WTRU, or the like. The BROADCAST_MOBILE RELAY_REQUEST message may contain the connection information associated with a connection that the remote WTRU has established with the mobile relay WTRU. The BROADCAST_MOBILE RELAY_REQUEST message may contain information related to the service. The information related to the service may identify the amount of resources that may be used to forward the broadcast traffic over PC5. The BROADCAST_MOBILE RELAY_REQUEST message may contain the information described herein including TMGI, WTRU ID, connection information, additional service information for a remote WTRU that is listening to the mobile relay ID for eMBMS broadcast. The BROADCAST_MOBILE RELAY_REQUEST message may contain measurements from remote WTRU of other mobile relay WTRUs detected in the vicinity that may offer the services. The BROADCAST_MOBILE RELAY_REQUEST message may contain indication of presence of other mobile relay WTRUs detected in the vicinity that may offer the services.

The BROADCAST_MOBILE RELAY_REQUEST message may be sent using MAC CE or RRC message, for example. The BROADCAST_MOBILE RELAY_REQUEST message is used as an example. A message described herein may be used to send such a request and/or information that is contained in the BROADCAST_MOBILE RELAY_REQUEST message. A WTRU Information message may be used to send such a request and/or information that is contained in the BROADCAST_MOBILE RELAY_REQUEST message. The request and/or information may be one of more of information described herein.

The eNB may not respond to the BROADCAST_MOBILE RELAY_REQUEST message. For example, the eNB may not respond to the BROADCAST_MOBILE RELAY_REQUEST message when a periodic BROADCAST_MOBILE RELAY_REQUEST message serves an indication.

The eNB may respond to the BROADCAST_MOBILE RELAY_REQUEST message in various ways. The eNB may reconfigure the D2D resources required by the mobile relay. The eNB may respond to the BROADCAST_MOBILE RELAY_REQUEST through an RRC message, a MAC CE or the like. The response may be forwarded by the mobile relay WTRU to its upper layers.

The eNB's response may include accepting the request. For example, the eNB's acceptance may cause the upper layers in the remote WTRU to respond to the request. For example, if the request was sent as a result of a remote WTRU's requesting to monitor a TMGI, the acceptance may cause the upper layers in the remote WTRU to accept the TMGI monitoring request from the remote WTRU and to provide information associated with the TMGI monitoring request.

The eNB's response may include rejecting the request. For example, the eNB may reject the request of the mobile relay WTRU to monitor or mobile relay a TMGI. The mobile relay WTRU may forward the rejection to the higher layers. The higher layers may trigger the mobile relay WTRU to send a rejection message to the remote WTRU. The rejection message may indicate the mobile relay WTRU's rejection the mobile relaying of a TMGI. The connection between the remote WTRU and the mobile relay WTRU may break. The disconnection may be initiated upon the reception of the rejection message by the remote WTRU. The remote WTRU may find a different candidate mobile relay WTRU.

The eNB's response may include sending to the mobile relay WTRU identifications of one or more mobile relay WTRUs (e.g., L2 ID of the mobile relay) that provide connection to the service that the rejected mobile relay WTRU may offer, along with the rejection of the request. The identification may be sent to the upper layers. The upper layers may provide a re-direction message. The redirection message may prompt the remote WTRU to act in various manner. In some instances, the redirection message may suggest the remote WTRU to act in certain manner. In some instances, the redirection message may force the remote WTRU to act in certain manner.

The redirection message may prompt the remote WTRU to tear-down the connection with the mobile relay to which the remote WTRU is connecting. The mobile relay to which the remote WTRU is connecting may not be tasked with communicating the broadcast traffic associated with the requested TMGI.

The redirection message may prompt the remote WTRU to initiate a mobile relay reselection process to find candidate mobile relays that may offer the service that the rejected mobile relay WTRU may offer.

The redirection message may prompt the remote WTRU to initiate a connection with a candidate mobile relay WTRU that may be included in the re-direction message. The remote WTRU may ignore the prompt or act accordingly. For example, the remote WTRU may not hear the candidate mobile relay that is suggested by the eNB. An example, the candidate mobile relay may not have responded to a Model B discovery when the remote WTRU initiated the Model B discovery. The remote WTRU may ignore the suggestion of the candidate mobile relay and continue to operate on the mobile relay to which the remote WTRU is connecting.

The remote WTRU may act accordingly when the redirection message may prompt the remote WTRU to initiate a connection with a candidate mobile relay WTRU. The remote WTRU may hear the candidate mobile relay suggested by the eNB. An example, the candidate mobile relay may have responded to a Model B discovery when the remote WTRU initiated the Model B discovery. The remote WTRU may tear down the connection with the mobile relay to which the remote WTRU is connecting. The remote WTRU may initiate a connection with the candidate mobile relay suggested by the eNB. The remote WTRU may request broadcasting of a TMGI. It is possible that the candidate mobile relay may be already broadcasting the same TMGI.

Figure 9:
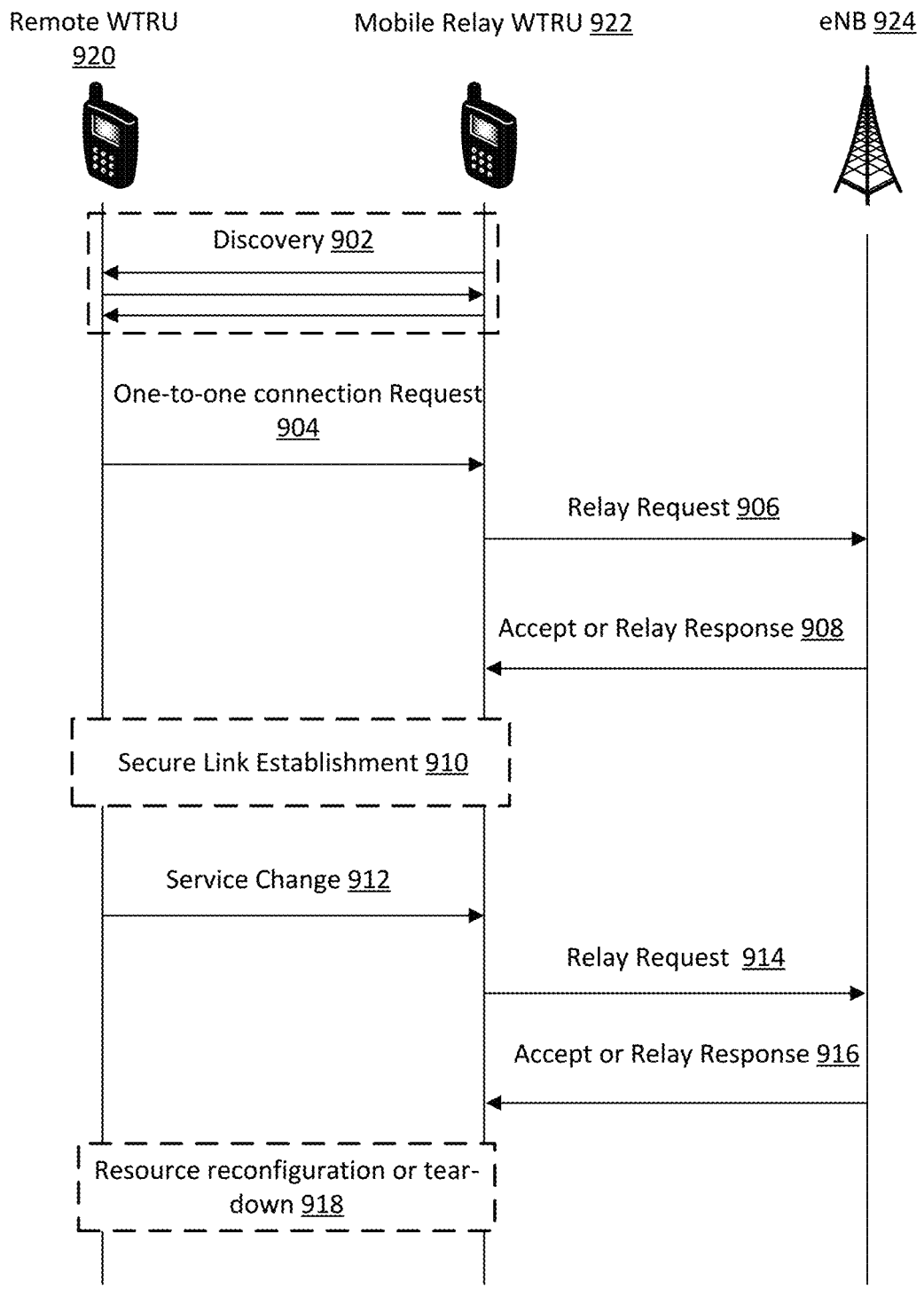
FIG. 9 is a diagram of an example of a selection/connection establishment.

FIG. 9 is example of a selection/connection establishment. The remote WTRU 920 and mobile relay WTRU 922 may engage in discovery at 902 (e.g., public safety or commercial communication discovery). The mobile relay WTRU 922 may have been previously initiated by the eNB 924 using criterion described herein. The remote WTRU 920 may perform measurements of potential candidate mobile relays in the vicinity at 902. The remote WTRU 920 may use signals in the discovery messages transmitted by the mobile relay WTRU 922. The remote WTRU 920 may select a mobile relay WTRU that has acceptable measurements and whose upper layer information (e.g., services, PLMN ID) meets the service requirements of the remote WTRU 920. The remote WTRU 920 may send a one-to-one connection request to the mobile relay WTRU 922 at 904. The one-to-one connection request may include identification and measurements of selected and other mobile relays, required service, and/or the like. The remote WTRU 920 may send identification of the mobile relay WTRU 922 and the identifications of candidate mobile relays at 904. The remote WTRU 920 may send the service requirements at 904. The remote WTRU 920 may send a list of mobile relay WTRUs that may satisfy the requirements of the remote WTRU 920, and measured qualities of the mobile relay WTRUs at 904. The mobile relay WTRU 922 may send a mobile relay request to the eNB 924 at 906. The request may include identification and measurements of selected and other mobile relays, required service, and/or the like. The mobile relay request may include identification of the mobile relay WTRU 922 and the identifications of candidate mobile relays, a list of mobile relay WTRUs that may satisfy the requirements of the remote WTRU 920 and measured qualities of the mobile relay WTRUs, and/or service requirements of the remote WTRU 920. The mobile relay request may include the number of WTRUs that are connected to mobile relay WTRU 922. The mobile relay WTRU 922 may forward the measurements sent by the remote WTRU 920 to the eNB 924 at 906. At 908, the eNB 924 may respond to the request that was forwarded at 906. The eNB 924 may accept the request, reject the request, and/or provide an candidate mobile relay from the list of mobile relays that was provided at 906 and given by the remote WTRU 920 at 908. The eNB 924 may reconfigure the D2D resources at 908. For example, the eNB 924 may reconfigure the D2D resources at 908 if additional resources are to be allocated to support the transmission. Secure link establishment may occur at 910. The remote WTRU 920, during connection with the mobile relay WTRU 922, may indicate to the mobile relay WTRU 922 a request to change the service at 912. The change of services at 912 may be based on an additional bearer that is established to the network, starting an additional/different video connection, ceasing to use the mobile relay WTRU 922 or other mobile relays, and/or the like. The mobile relay WTRU 922 may send a different mobile relay request at 914, indicating a change in service for the remote WTRU 920. The different mobile relay request at 914 may include identification of the mobile relay WTRU 922, identification of a candidate mobile relay that may be selected, and the identifications of candidate mobile relays. The different mobile relay request at 914 may include a list of mobile relay WTRUs that may satisfy the change of the service request of the remote WTRU 920 and measured qualities of the mobile relay WTRUs in the list, and/or service requirements of the remote WTRU 920. The mobile relay request may include the number of WTRUs that are connected to mobile relay WTRU 922 and/or the candidate mobile relay that may be selected at 914. At 916, the eNB 924 may respond to the request that was sent at 914. The eNB 924 may accept the request, reject the request, or provide a candidate mobile relay from the list of mobile relays that was provided at 914. The eNB 924 may reconfigure the D2D resources at 916. The response by the eNB 924 may trigger the tear-down of the link to the mobile relay WTRU 922 at 918. The response by the eNB 924 may trigger a reconfiguration of the resources used on the PC5 interface at 918.

Resource may be allocated or assigned for mobile relay WTRUs and/or for D2D communications. Resource assignment including scheduling of resources may be performed by the eNB or mobile relays. Assignment of resources to mobile relay WTRUs may be performed based on various requirements including estimation of services that may be offered to the remote WTRUs. Assignment of resources to D2D communications including scheduling of resources may be achieved by various approaches. Certain approaches may comprise an eNB that configures a resource pool and WTRUs that schedule resources among resource pools. Certain approaches may comprise an eNB that configures a resource pool and WTRUs that segregate resources and assigned segregated resources to remote WTRUs or groups of remote WTRUs. Certain approaches may comprise an eNB that directly schedules resource among resource pools. For example, an eNB may directly schedule a resource pool for mobile relay WTRUs, and WTRUs may schedule resources among resource pools for other WTRUs.

A mobile relay WTRU may be configured with a pool(s) of resources. For example, the eNB may allocate a set of resources or resource pool(s) to be used for mobile relays. The pool of resources may dedicated for mobile relays. The dedicated mobile relay resources may be a subset of the D2D communication resources which may be used by the mobile relay WTRU. The dedicated mobile relay resources may be separate resources from the resources that the mobile relay may use for D2D communications. The eNB may re-configure the dedicated mobile relay WTRU resources. RRC configuration message may be used to re-configure the dedicated mobile relay WTRU resources. The eNB may re-configure the dedicated mobile relay WTRU resources when the eNB receives an update from the mobile relay WTRU. The update may be related to the change of the number of remote WTRUs that are managed by the mobile relay WTRU. For example, the number of remote WTRUs may change with the addition/removal of a remote WTRU to/from the remote WTRUs that are managed by the mobile relay WTRU. Resource pool(s) dedicated to a mobile relay WTRU may be modified/reconfigured dynamically when the number of services requested by remote WTRU is changes. Resource pool(s) dedicated to a mobile relay WTRU may be modified/reconfigured dynamically when the estimated traffic for the mobile relay WTRUs changes. Changes and/or reallocation of resources may be performed through various approaches.

Resource assignments for mobile relay WTRUs may be achieved by estimating the services provided by a mobile relay WTRU. Upon connection of a remote WTRU to a mobile relay WTRU, the amount of resources that may be used to serve the remote WTRU may be estimated. The mobile relay WTRU and/or the eNB may estimate the amount of resources that may be used to serve the remote WTRU. For example, the remote WTRU may request the communication of eMBMS traffic which the mobile relay WTRU is already transmitting over the PC5 interface to a different remote WTRU. The estimation may be made that the amount of resources that are used by the remote WTRU may not be changed significantly to meet the request of the remote WTRU. The eNB may make the estimation.

The estimate of these resources may be based on an assumption that the resources to be used may be near a maximum needed for a given service or set of service requirements. For example, an estimation may be made such that the maximum amount of resource for the given service may be added to available resources when the given service starts. The mobile relay WTRU may send an indication of increase in the amount of resources when the mobile relay WTRU is connected with an additional remote WTRU. The mobile relay WTRU may send an indication of the set of additional services that concern the additional remote WTRU. The estimate of the resources may take into account all possible services that may be used by the additional remote WTRU. The mobile relay WTRU may use the estimation of the resources to define the resource pool configuration for the mobile relay WTRU. The mobile relay WTRU may take into account of the number of remote WTRUs that the mobile relay WTRU serves. The mobile relay WTRU may send to the eNB via RRC signaling the indication of increase in the amount of resources when the mobile relay WTRU is connected with an additional remote WTRU and/or the indication of the set of additional services that concern the additional remote WTRU. The indications may be sent by the mobile relay WTRU to the eNB via a MAC CE.

The indications may contain various information. The indications may include the number of remote WTRUs that the mobile relay WTRU serves. The indications may include the amount of resources that may be used. The amount of resources that may be used may be based on the amount of additional resources that may be used as a result of an additional remote WTRU(s) becomes connected with the mobile relay WTRU and/or the amount of resources that are used by some or all of the remote WTRUs that are connected with the mobile relay WTRU. The indications may include the loading of resource pools that the mobile relay WTRU is experiencing. The loading of resource pools that the mobile relay WTRU is experiencing may be based on the mobile relay WTRU's knowledge of scheduling resources when the mobile relay WTRU uses Mode 2. The indications may include the additional services requested by the additional/or a remote WTRU that is connected to the mobile relay WTRU.

The mobile relay WTRU may report the amount of resources and/or the services that may be used to serve remote WTRUs. In the report, the mobile relay WTRU may indicate the number of independent streams or destinations that it serves. The mobile relay WTRU may indicate the data rate requested for some or all of independent streams. The mobile relay WTRU may or may not have the capability to transmit to multiple destination and/or independent streams simultaneously. The eNB may use the report to provide sufficient time-resources to the mobile relay WTRU.

Scheduling resources for D2D communications may be achieved by various modes. The modes may include mode 1, mode 2, or enhanced modes. In mode 1, the eNB may directly schedule the resources among the resource pool to be used for transmission. The scheduling of the resources may be communicated via the SA. In mode 2, the eNB configures a resource pool. The transmitting WTRU may autonomously decide the resources to be used for a scheduling period. Enhanced modes may be based on and improved on mode 1 and/or mode 2. The remote WTRU may be out-of-coverage, and may or may not receive the pool configuration from system information. Mode 1 and/or mode 2 may be enhanced in the context of mobile relay WTRUs and scheduling resources to be used by the remote WTRU.

Scheduling resources for D2D communications may be achieved through various approaches that may be based enhanced modes. Certain approaches may comprise an eNB that configures a resource pool and WTRUs that schedule resources among resource pools. Certain approaches may comprise an eNB that configures a resource pool and WTRUs that segregate resources and assigned segregated resources to remote WTRUs or groups of remote WTRUs. Certain approaches may comprise an eNB that directly schedules resource among resource pools. For example, an eNB may directly schedule a resource pool for mobile relay WTRUs, and WTRUs may schedule resources among resource pools for other WTRUs.

Certain approaches may comprise an eNB that configures a resource pool and WTRUs that schedule resources among resource pools. A WTRU may transmit D2D discovery or communication using pre-configured pools and/or using pools signaled by the eNB. The pre-configured pools may include configured pools in the device and/or configured pools by the layer. For example, pre-configured pools may be used when the WTRU is out-of-coverage. eNB signaled pools may be used when the WTRU is in coverage. To allow a WTRU (e.g., a WTRU that is out of coverage of the eNB) to communicate with a mobile relay WTRU (e.g., a WTRU that is in coverage of the eNB), the transmitter (TX) pool of a WTRU may reside within the receiver (RX) pool of a different WTRU. Making the TX pool of a WTRU reside within the RX pool of a different WTRU may be achieved through various approaches.

The various approaches for making the TX pool of a WTRU reside within the RX pool of a different WTRU may include a mobile relay WTRU indicating to the eNB its own pre-configured resources and/or the pre-configured resources of the remote WTRU. The mobile relay WTRU may indicate to the eNB its own pre-configured resources and/or the pre-configured resources of the remote WTRU via RRC signaling. The mobile relay WTRU may indicate to the eNB its own pre-configured resources when its own pre-configured resources match the pre-configured resources of the remote WTRU. The remote WTRU may send its preconfigured resources to the mobile relay WTRU during connection establishment with the mobile relay WTRU. The eNB may configure resources for the mobile relay WTRU based on the knowledge of the pre-configured resources.

The various approaches for making the TX pool of a WTRU reside within the RX pool of a different WTRU may include the eNB receiving the pre-configured resources to be used by a certain mobile relay WTRU(s) from the network and/or from the function. The eNB may configure the pools to be used by the mobile relay WTRU based on the information received from the network and/or the function. The pre-configured pools may be specifically related to a remote WTRU. If the pre-configured pools are specifically related to a remote WTRU, the eNB may use the identification of the remote WTRU to determine the pools to be used by the mobile relay WTRU for communicating with the remote WTRU. The eNB may receive from the mobile relay WTRU the identification of the remote WTRU (e.g., by means described herein).

The resource pool configuration may be communicated to mobile relay WTRUs and/or remote WTRUs. The eNB may determine the resource pool(s) to be used by the mobile relay and remote WTRUs as discussed herein. The eNB may configure the mobile relay WTRU with the resource pool configuration. The eNB may use a R12 mechanism of RRC signaling to configure the mobile relay WTRU. The mobile relay WTRU may forward the resource pool configuration to remote WTRUs. A control D2D communication message may be used to forward the resource pool configuration to remote WTRUs. For example, the D2D control message used to forward the resource pool configuration to the remote WTRUs may be referred to as a D2D mobile relay resource pool control message. The D2D mobile relay resource pool control message may be destined for example to the RRC layer of a remote WTRU. The D2D mobile relay resource pool control message may inform the remote WTRU of the resource pool(s) to be utilized for future D2D communications. The control D2D message may be identified through a number of different ways.

The D2D mobile relay resource pool control message may be identified through a certain SCI format (e.g., SCI format 1). The SCI format may be used to transmit the D2D mobile relay resource pool control message. The remote WTRU may identify data corresponding to the D2D mobile relay resource pool control message. The data may be forwarded to radio resource control (RRC).

The D2D mobile relay resource pool control message may be identified through a certain group destination ID (e.g., L2 ID). The group destination ID may be used for the D2D mobile relay resource pool control message. The group destination ID may be indicated in a SCI format. For example, the SCI format may be the SCI format 0. The SCI format 0 may schedule resource blocks to be received/decoded on the SL-SCH. The group destination ID may allow some or all remote WTRUs to receive a control message. For example, the mobile relay WTRU may transmit a message to some or all remote WTRUs that the mobile relay WTRU serves.

The D2D mobile relay resource pool control message may be identified through a certain field or indicator in the packet data convergence protocol (PDCP) packet header. The field and/or indicator may indicate that a certain type of PDCP packet may be destined for RRC control. The field and/or indicator may indicate that the type of PDCP packet is not to be forwarded to the application layer (e.g., but rather to a RRC layer).

The D2D mobile relay resource pool control message may be identified through a method utilized for sending broadcast messaging. The D2D mobile relay resource pool control message may be identified through RRC signaling directly from the eNB. The remote WTRU may be in coverage of the eNB when the resources for D2D are being configured.

The remote WTRU may be signaled via the D2D mobile relay resource pool control message to use the pre-configured resources. The remote WTRU may be signaled prior to initial configuration. When the D2D mobile relay resource pool control message is received and resource pool(s) for the remote WTRU reconfigured, the remote WTRU may listen to reconfigured pool(s). The remote WTRU may transmit on the new pool(s) to communicate with the mobile relay. A subsequent reconfiguration may take place in a manner discussed herein.

Resource pool reconfiguration may include various types of reconfiguration. The remote WTRU may be reconfigured to monitor additional RX discovery and/or communication pools in addition to the pre-configured RX pools. The remote WTRU may use the pre-configured TX pools to transmit. The remote WTRU may be reconfigured by the eNB (e.g., via the mobile relay) to monitor a certain set of RX pools. The remote WTRU may transmit using a certain set of TX pools for discovery and/or communication. The mobile relay WTRU may be reconfigured to monitor a certain set of RX pools. The mobile relay WTRU may be reconfigured by the eNB or the function. The set of RX pools may include the pre-configured TX pools of the remote WTRU. The mobile relay WTRU may use the initial eNB configured TX pools to transmit.

Resource pool reconfiguration may be useful for out-of-coverage WTRUs. Out-of-coverage WTRUs may be reached through the use of pre-configured resources. For example, some or all mobile relays may use pre-configured resources for initial communication with the remote WTRUs. Pre-configured resources may allow some or all mobile relays to establish the connection with the remote WTRUs. Mobile relay communication may use a large amount of resources. The eNB may control the large amount of resources without defining the pre-configured pools to ensure the sufficient bandwidth for mobile relay operation. The eNB may control the resources for efficient resource management.

Resource pool reconfiguration may occur in various manners. Resource pool reconfiguration may occur during connection establishment. The remote WTRU may use pre-configured discovery and/or communication resource pools to perform mobile relay discovery and/or connection establishment. During connection establishment, the remote WTRU may be reconfigured to use a reconfigured set of resource pools for further communication over the mobile relay link following reception of the reconfiguration message. The remote WTRU may be reconfigured, at the end of the connection establishment procedure, to use a reconfigured set of resource pools for some or all further communication over the mobile relay link following reception of the reconfiguration message. The remote WTRU may be reconfigured when D2D communication for the connection establishment procedure completes.

Figure 10:
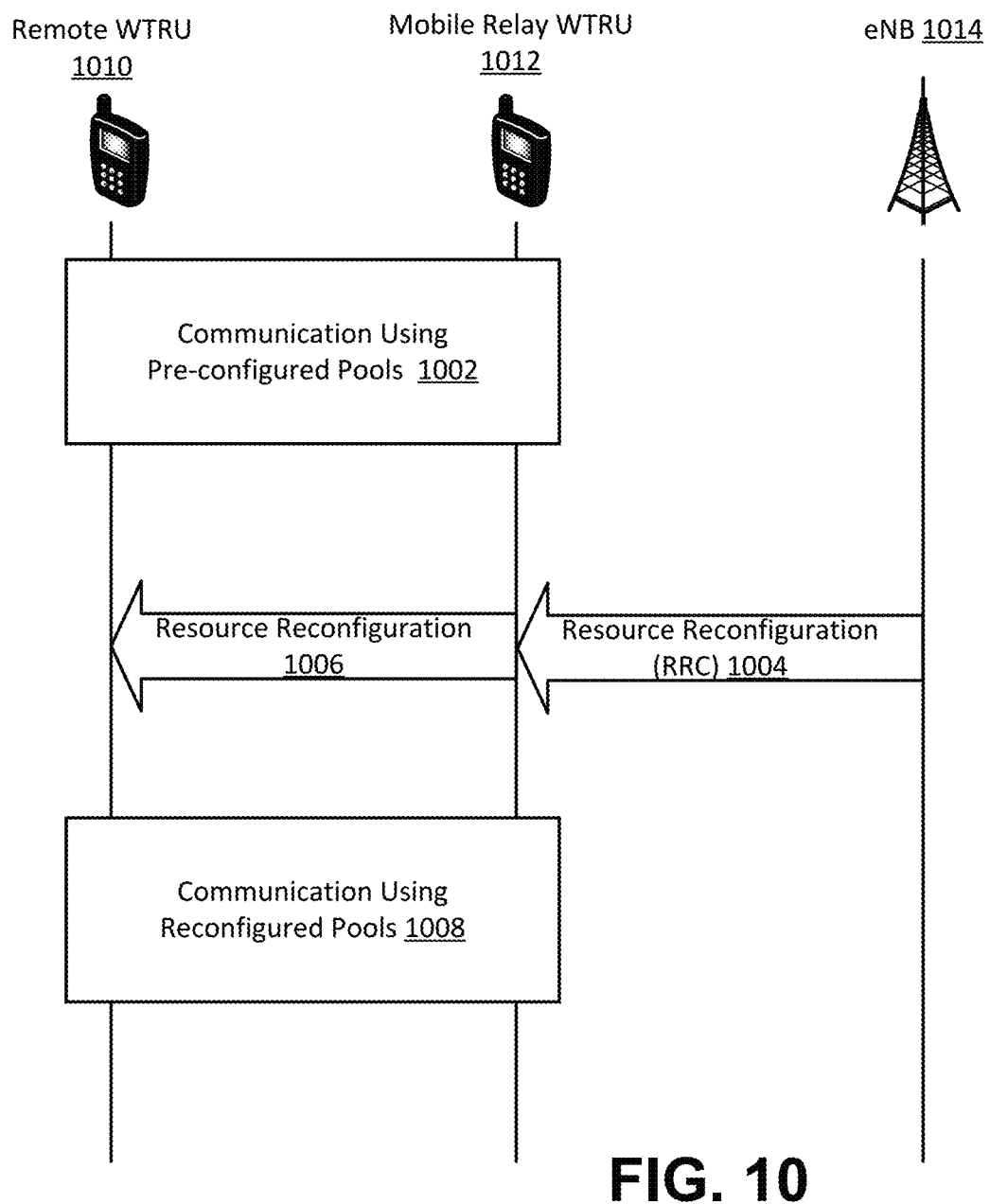
FIG. 10 is a diagram of an example of resource reconfiguration.

FIG. 10 is a diagram of an example of resource reconfiguration. The remote WTRU 1010 may send a connection establishment request message using pre-configured D2D communication resources at 1002. The mobile relay WTRU 1012 may check with the eNB 1014 to authorize the use of resources for the remote WTRU 1010. The mobile relay WTRU 1012 may receive the resource pools to be used by the mobile relay WTRU 1012 and remote WTRU 1010 with the eNB authorization at 1004. The mobile relay WTRU 1012 may have received the resource pools to be used by the mobile relay WTRU 1012 earlier. For example, the mobile relay WTRU 1012 may have received the resource pools to be used by the mobile relay WTRU 1012 when the mobile relay WTRU 1012 was set up to operate as a mobile relay. The mobile relay WTRU 1012 may send the connection establishment complete message at 1006. The connection establishment complete message may include new resource pools to be used (e.g., the reconfigured resource). Following reception of the connection establishment complete message, the remote WTRU 1010 may monitor RX pools and use TX pools as specified in the resource reconfiguration at 1008.

Resource pool reconfiguration may be accomplished through mobile relay discovery. For example, the mobile relay WTRU may embed the resource reconfiguration within the mobile relay discovery message. When a remote WTRU attempts to establish a connection with a mobile relay, the remote WTRU may transmit the connection request using the reconfigured pools received in the discovery announcement/response from the mobile relay.

Resource pool reconfiguration may occur during one-to-one communication between the mobile relay WTRU and remote WTRU. The mobile relay WTRU may send resource reconfiguration message during a one-to-one communication between the mobile relay WTRU and remote WTRU. The mobile relay WTRU may use the preconfigured resources and/or resources which are previously reconfigured by the mobile relay WTRU to send resource reconfiguration. At the reception of the resource reconfiguration message, the remote WTRU may start to transmit and monitor using the reconfigured pools.

Resource pool reconfiguration may occur when a remote WTRU is in-coverage of an eNB and/or may potentially connect to a mobile relay. For example, the remote WTRU may be moving out of the coverage of an eNB. Some of the remote WTRU's traffic (e.g., public safety traffic) may be moved to a mobile relay. The resource pool reconfiguration may be received through dedicated RRC signaling to the remote WTRU and/or through broadcast signaling (e.g., system information block (SIB)).

The resource reconfiguration message may contain one or more of the following: description of the TX/RX discovery/communication pool, time validity for using the pool, and/or eNB identifier.

A remote WTRU may store a resource reconfiguration that the remote WTRU received from an eNB and/or a mobile relay. The resource reconfiguration may correspond to the last resource reconfiguration received from an eNB and/or a mobile relay by the remote WTRU. The remote WTRU may store the resource reconfiguration in the remote WTRU's memory. If a previous resource pool configuration exists in the remote WTRU's memory, the remote WTRU may attempt to communicate with the mobile relay the previous pool configuration. For example, the remote WTRU may search for discovery signals using the previously pre-configured pools. The remote WTRU may try to perform mobile relay connection establishment using the previously pre-configured pools from memory. If a connection establishment fails, another connection establishment may be retried using the previously pre-configured pools. If connection establishment using the previously pre-configured pools from memory fails, the remote WTRU may delete the previously pre-configured pools from the remote WTRU's memory.

Scheduling resources for D2D communications may be achieved through resource pool configuration with segregation of resource pools (e.g., mode 2 with segregation of resource pools). The mobile relay WTRU may receive Mode 2 resource pools from the eNB. The mobile relay WTRU may segregate the resource pools to different remote WTRUs or groups of remote WTRUs. The mobile relay WTRU may autonomously select several sub-pools from the pool(s) configured by the eNB. The mobile relay WTRU may configure different remote WTRUs separately with the sub-pools that the mobile relay WTRU selected from the pool(s) configured by the eNB. The mobile relay WTRU may configure different subgroups of remote WTRUs separately with the sub-pools that the mobile relay WTRU selected from the pool(s) configured by the eNB. The mobile relay WTRU may determine the amount of resources to allocate to a different remote WTRU. The determination of the amount of resources to allocate to a different remote WTRU may be based on expected traffic from the remote WTRU.

The eNB and/or the network may select how the resource pools are segregated among the mobile relay WTRU and some or all remote WTRUs. The eNB may configure transmit resource pools for the remote WTRUs and for the mobile relay WTRU to avoid resource collision between and/or among transmissions. For example, the transmit resource pools for a remote WTRU and transmit resource pools for a mobile relay WTRU may be configured to be orthogonal to avoid resource collision.

A number of remote WTRUs may be assigned to the same transmit resource pool if they are known to have no risk of interference. For example, they may not transmit simultaneously. Their relative location may be such that there is no risk of interference.

The eNB may assign resource pools according to potentially static priorities associated with a WTRU. For example, the mobile relay WTRU may have higher potentially static priorities than the remote WTRUs. The eNB may signal to the mobile relay WTRU the resource pool(s) to be used by the mobile relay WTRU. The eNB may then signal the resource pool(s) to be used by a remote WTRU. The eNB may signal the resource pool(s) to be used by a group of remote WTRUs.

The eNB may send a number of resource pools which may be used for mobile relay to remote WTRU communication. The mobile relay WTRU may determine how to subdivide the resource pools among the remote WTRUs. The mobile relay WTRU may send a pool configuration for a remote WTRU to determine which transmission pool that remote WTRU may use. The mobile relay WTRU may send a pool configuration for a remote WTRU to determine which reception pools that remote WTRU may listen to.

A remote WTRU may be configured with a selected transmission/receive pool, and the selected resource pool may allow it to receive transmissions from the mobile relay WTRU (e.g., based on the mobile relay WTRUs transmission pool). For example, the eNB may configure four transmit pools (e.g., for SA and data) to the mobile relay WTRU to be used for mobile relay communication. The mobile relay WTRU may decide to use one of the transmit pools for transmission of its own communication towards the remote WTRUs. The remaining transmit pools may then be used for the transmission of the remote WTRUs. Some or a group of remote WTRUs may be selected for a remaining pool. In another example, the mobile relay WTRU may use all four pools for its transmission and configure each remote WTRU with a single receive pool. The mobile relay WTRU may then select the transmission pool to use for a remote WTRU that is intended recipient of the transmission.

If the number of remote WTRUs is larger than number of pools, the selection may be performed based on certain assignments. The assignments may be random assignment of a number of WTRUs to each remaining pool to ensure that approximately the same number of remote WTRUs are assigned to each remaining pool. The priorities may be based on the expected loading of the transmissions for a remote and/or mobile relay WTRU. The expected loading of the transmissions for a remote and/or mobile relay WTRU may be obtained from the eNB and/or from the layer in the mobile relay WTRU. A relatively equal amount of traffic transmission load may be assigned to a transmit pool. For example, a WTRU that has a large traffic expectation may be in a pool alone. A set of multiple WTRUs having lesser traffic expectation may be assigned to another pool.

The eNB may send one or more pools to the mobile relay WTRU. A single pool may be subdivided among several remote WTRUs. This subdivision may be done by the mobile relay WTRU. This subdivision may be done by the eNB. A pool may be subdivided based on certain assignment. The assignment may be to allocate a set of allowed T-RPTs to a remote WTRU. For example, a remote WTRU may be restricted to use a certain value of k, or a certain set of T-RPT indices. The assignment may be based on a set of allowed scheduling periods. For example, a remote WTRU may be assigned a certain scheduling period or set of scheduling periods that is distinct from another remote WTRU. The assignment may be based on a set of allowed frequency resources. For example, the allowable frequency resources within a D2D subframe that may be used by a WTRU may be distinct from the allowable frequency resources that may be used by another WTRU. The assignment may be based on a hopping pattern. For example, the chosen hopping pattern to be used by a remote WTRU may be such that the actual selected resources for different remote WTRUs may be distinct.

The mobile relay WTRU and/or the eNB may select the segregation of the resource pools based on certain criterion. The criterion may include the relative load of a remote WTRUs transmission. For example, the mobile relay WTRU and/or the eNB may ensure a relative equal load for each subdivision by assigning a number of remote WTRUs having various loads to a subdivision such that the load on each subdivision is relatively equal to each other. The criterion may include priority of the remote WTRU or remote WTRUs traffic. For example, high priority WTRUs may be given their own subdivision or a subdivision with few other WTRUs to avoid interference with other WTRUs. The criterion may include certain fixed/static rules. For example, a subdivision may be assigned to a fixed number of WTRUs.

Scheduling resources for D2D communications may be achieved through mode 1 resource pool configuration for mobile relay transmission and mode 2 resource pool configuration for remote WTRU transmission. The eNB may continue to use mode 1 for mobile relay transmission (e.g., transmission of resources from the mobile relay WTRU to the remote WTRU). The eNB may allow the remote WTRU to transmit to the mobile relay WTRU using Mode 2. For example, a mobile relay WTRU may be mostly used to serve broadcast traffic and some uplink traffic from the remote WTRU to the eNB. The uplink traffic from the remote WTRU to the eNB may include a one-to-one communication link to the network or application server. The eNB may configure the resource pool(s) to be used for reception by the remote WTRU and for transmission by the remote WTRU. The resource pool(s) may be forwarded to the remote WTRU. The eNB may then schedule transmission by the mobile relay through DCI format 5.

Service continuity may be maintained by various approaches. The mobile relay WTRU and/or remote WTRU may implement certain procedures to maintain service continuity for the remote WTRU. Service continuity may be maintained in various situations. The mobile relay may lose connectivity to the eNB. For example, the remote/mobile relay WTRU may go out of coverage of the eNB. A mobile relay may be disabled by the eNB. A remote WTRU may transfer from the use of a mobile relay to another mobile relay. A remote WTRU may transition between in-coverage connection with an eNB and connection via a mobile relay. For example, the transition may be related to a transition between a Uu and PC5. A mobile relay WTRU may be handed over from one eNB to another eNB. The eNB may assist or control the procedures.

Service continuity may be maintained when a mobile relay loses connectivity with the eNB. The mobile relay WTRU may send a notification over PC5 when the mobile relay WTRU detects loss of eNB connection. The mobile relay WTRU may send a notification or information to the remote WTRU when the mobile relay WTRU has determined that it may be leaving the coverage of the eNB. The Uu-loss notification may be sent over PC5 and/or through discovery transport or communication transport. The Uu-loss notification may comprise a MAC CE. The Uu-loss notification may be sent using PHY-layer signaling. For example, the Uu-loss notification may be sent using PHY-layer signaling as part of the D2DSS, or other channel. The Uu-loss notification may be sent using RRC layer control signaling. The mobile relay WTRU may send the message independently to a remote WTRU. The mobile relay WTRU may use a mobile relay-specific broadcast mechanism to send the message.

The Uu-loss notification may sent in response to certain triggers. The triggers may include the signal quality of the Uu interface as seen by the mobile relay. For example, the signal quality of the Uu interface may be seen by the mobile relay through existing LTE measurements of downlink signal quality. The triggers may include triggering of a RRC re-establishment procedure. The triggers may be fixed and/or configured by the network through signaling. For example, the signaling may include RRC signaling over Uu. The mobile relay WTRU may trigger a Uu-loss notification to be sent to a remote WTRU when an explicit message is received from an eNB indicating that the mobile relay operation of the mobile relay may be stopped.

The behavior of the mobile relay WTRU and/or the threshold of the measured signal quality that triggers the Uu-loss notification may be set by the network. The network may set a threshold and potential hysteresis value to avoid that a Uu-loss notification is triggered for a temporary drop in the signal quality. The network may configure multiple thresholds. The multiple thresholds may be used to trigger different behaviors in the remote WTRU. The behaviors may be communicated along with the Uu-loss notification to the remote WTRU. For example, if the Uu signal quality measured by the mobile relay is determined to be poor, or below a threshold for a time exceeding the hysteresis, the mobile relay WTRU may send the Uu-loss notification over the PC5 interface to the remote WTRU(s) along with the indication to perform a behavior. If the threshold is not exceeded, but another threshold is exceeded, the Uu-loss notification may still be sent, but with the indication to perform another behavior.

Upon reception of the Uu-loss notification, the remote WTRU may perform certain actions. The behavior parameter indicated with the Uu-loss notification may be used to dictate which behavior or combination of behaviors the remote WTRU may take. The remote WTRU may start discovery for another mobile relay. For example, it may start to transmit model B discovery solicitations and listen to Model B discovery responses from different mobile relays. The remote WTRU may initiate a mobile relay re-selection procedure. The remote WTRU may listen to Model A discovery announcements from mobile relay WTRUs. The remote WTRU may start to measure link quality (e.g., on PC5) of the different mobile relays which are available and send the measurements to the higher layers, based on discovery messages sent from the mobile relays. The higher layers of the remote WTRU, along with the measurements provided by lower layers, may perform mobile relay selection. The remote WTRU may try to establish one-to-one communication with the mobile relay WTRU that is selected.

The following may be an example of using multiple thresholds to trigger different behaviors in the remote WTRU. If a threshold is exceeded, for example, the remote WTRU may start discovery for another mobile relay, listen to Model A discovery announcements, measure link quality, and await mobile relay selection. If another threshold is exceeded, the remote WTRU may start discovery for another mobile relay, listen to Model A discovery announcements, measure link quality, await mobile relay selection, and try to establish one-to-one communication with the selected mobile relay WTRU. If another threshold is exceeded, and a number of activities had been performed based on the reception of a previous Uu-loss notification, the remote WTRU may attempt to establish one-to-one communication with the selected mobile relay, based on the already selected mobile relay.

The mobile relay WTRU may send the remote WTRU information that is provided by the eNB along with the Uu-loss notification. The eNB may provide information to the remote WTRU during normal operation of the mobile relay and/or poor connection with the eNB.

During normal operation of the mobile relay, the eNB may send the mobile relay WTRU a list of candidate WTRU IDs which may replace the mobile relay to which the remote WTRU is connecting if the mobile relay WTRU goes out of coverage. The list may be periodically updated by the eNB and sent to the mobile relay WTRU. The list may be sent via RRC signaling on the Uu interface. The list may be updated by the Function and sent via the PC3 interface.

Upon detection of poor radio conditions and/or connection problems with the eNB, the mobile relay WTRU may be configured to transmit a D2D control message (e.g., over PC5) to signal the loss of coverage of the mobile relay. The D2D control message used to indicate loss of coverage may be referred to a D2D Uu backhaul loss control message. Poor radio conditions and/or connection problems may be detected when RLF conditions are triggered, when one or more of T310, T311, or T301 are running or when T300 has expired, and/or when the mobile relay WTRU uses exception resources. The D2D Uu backhaul loss control message may be broadcasted to remote WTRUs. For example, the broadcasting may use a predefined destination address. The control message may be individually sent to a remote WTRU using a one-to-one communication path. For example, the one-to-one communication path may include dedicated WTRU IDs. The D2D Uu backhaul loss control message may contain certain information. The D2D Uu backhaul loss control message may contain loss of coverage indication. The D2D Uu backhaul loss control message may contain suggested WTRU ID(s) for which the remote WTRU may try to establish a connection for continuing the service. The WTRU ID(s) may be provided by the eNB to the mobile relay WTRU periodically when the mobile relay WTRU is connected to the eNB. The WTRU ID(s) may be provided when the mobile relay WTRU in question is losing connection with the eNB. The D2D Uu backhaul loss control message may contain a list of resources or resource pools that may be used to communicate with a mobile relay WTRU. For example, a remote WTRU may be asked to directly establish a one-to-one communication with a mobile relay WTRU without performing a full discovery procedure. The eNB may prefer one-to-one communication. The pools for one-to-one communication may be different from the pre-configured pools.

The remote WTRU may receive the D2D Uu backhaul loss control message signaling the loss of coverage of the eNB by the mobile relay. The remote WTRU may initiate discovery and/or one-to-one communication with a suggested WTRU that may act as a replacement mobile relay. The eNB may inform the replacement mobile relay the role to support the remote WTRU. The eNB may configure the replacement mobile relay with appropriate resources. For example, the replacement mobile relay may be asked to start monitoring the same temporary mobile group identity (TMGI) before connecting to the remote WTRUs. The replacement mobile relay may start transmitting the TMGI and/or E-UTRAN cell global identifier (ECGI) announcements. For example, the pre-configuration by initiating discovery and/or one-to-one communication with the replacement WTRU may allow the replacement mobile relay WTRU to buffer broadcast data in advance of the connection procedure initiated by the remote WTRU.

Service continuity may be maintained when a mobile relay is disabled by the eNB. The eNB may enable mobile relay context transfer. The eNB may trigger a Uu-loss notification to force a set of remote WTRUs to disconnect from a mobile relay. The eNB may decide to disable or de-activate a mobile relay WTRU based on the quality of the connection between the mobile relay WTRU and the eNB. For example, an eNB may evaluate the link quality of the Uu link between the mobile relay WTRU and the eNB. The evaluation may be performed periodically evaluate. The evaluation of quality may be based on periodic measurements of the Uu link quality that are sent by the mobile relay WTRU to the eNB. The evaluation of link quality may be based on a detection of loss of communication with the mobile relay. For example, a loss of communication with the mobile relay may be detected if the mobile relay no longer acknowledges transmissions made by the eNB. If the link quality goes below an acceptable threshold, the eNB may disable the mobile relay WTRU. The eNB may select a replacement mobile relay WTRU for the mobile relay WTRU that the eNB is about to disable or deactivate. The eNB may transfer information to the replacement mobile relay WTRU and/or configure the replacement mobile relay WTRU.

The eNB may send certain information to the replacement mobile relay WTRU. The eNB may send a mobile relay activation message. For example, the eNB may send a mobile relay activation message if the replacement mobile relay was not initially acting as a mobile relay. The mobile relay activation message may trigger the WTRU to start behaving as a mobile relay, start transmitting Model A announcement messages, and/or listening to Model B solicitation messages. The eNB may send a mobile relay transfer indication. For example, the eNB may send a mobile relay transfer indication if the replacement mobile relay WTRU is behaving as a mobile relay and may start to serve different and/or additional remote WTRUs. The eNB may send a list of remote WTRUs that are served by the mobile relay. The list may include identifiers (e.g., L2 ID, PHY layer ID, and/or the like) of the remote WTRUs. The list may include remote WTRUs that are being transferred to the replacement mobile relay WTRU. The eNB may send the resources or resource pools that the mobile relay WTRU may use to transmit for D2D communications or D2D discovery. The eNB may send the resources or resource pools on which the mobile relay WTRU may listen for D2D communications or D2D discovery. For example, the replacement mobile relay WTRU may start to use the resource pools that were used by the deactivated mobile relay. The replacement mobile relay WTRU may use the resource pools for transmission/reception with the remote WTRUs. The eNB may send the services to be provided to the remote WTRU(s) and context information associated with the services. For example, the deactivated mobile relay may have been monitoring a TMGI for providing broadcast information. The replacement mobile relay may or may not monitor the same TMGI. The eNB may indicate one or more of the following information to the replacement mobile relay WTRU. The eNB may indicate to replacement mobile relay WTRU TMGIs that mobile relay WTRU may be configured to monitor. For example, the TMGIs that the replacement mobile relay WTRU may be configured to monitor may differ from the TMGIs that the deactivated mobile relay may have been monitoring. The eNB may indicate to replacement mobile relay the group ID for PC5 transmissions. The group ID for PC5 transmissions may have been used by the disabled mobile relay to communicate to send the eMBMS data to the remote WTRUs. The remote WTRUs may or may not issue a different TMGI monitoring request to the replacement mobile relay. The eNB may indicate to the replacement mobile relay the specific ID (e.g., L2 IDs, PHY ID, and/or the like) for a remote WTRU that is receiving broadcast for a TMGI. The eNB may indicate to replacement mobile relay the address used for the mobile relay broadcast mechanism.

The replacement mobile relay WTRU may receive the mobile relay activation message and/or mobile relay transfer message. The replacement mobile relay WTRU may perform certain actions. The replacement mobile relay WTRU may start transmitting Model A announcement or listening and responding to Model B solicitation messages if a mobile relay activation message is received. The replacement mobile relay WTRU may start to monitor the TMGI that the eNB indicated to the replacement mobile relay WTRU. The replacement mobile relay WTRU may start to transmit the broadcast information read from the Uu interface for a TMGI over PC5 using an associated group ID. The replacement mobile relay WTRU may use the group ID for PC5 communication (e.g., as indicated by the eNB). The replacement mobile relay WTRU may transmit future broadcast control messages (e.g., Uu-loss notification message described herein). The replacement mobile relay WTRU may use the broadcast address that it previously used, and the replacement mobile relay WTRU may use the broadcast address that was being used by the disabled mobile relay. The replacement mobile relay WTRU may send a broadcast message to the remote WTRUs which were served by the disabled mobile relay. The broadcast message may indicate that the remote WTRUs may change their monitored broadcast control address to the broadcast control address of the replacement mobile relay WTRU.

Once the replacement mobile relay WTRU has been set up, the eNB may send a mobile relay deactivation message to the mobile relay that the eNB is disabling. The mobile relay that the eNB is disabling may receive the mobile relay deactivation message. The mobile relay that the eNB is disabling may stop sending Model A discovery messages. The mobile relay that the eNB is disabling may stop responding to Model B solicitation messages. Ongoing mobile relay operations may be stopped. For example, one-to-one communications with the mobile relay that the eNB is disabling may be stopped. The mobile relay that the eNB is disabling may stop monitoring broadcast for TMGIs that are related to its mobile relay operation. The mobile relay that the eNB is disabling may stop transmitting broadcast data over the PC5 link.

If a mobile relay WTRU is being disabled, and the eNB transfers the information of the remote WTRUs to a different and/or additional mobile relay, a Uu-loss notification message may be sent by the mobile relay that the eNB is disabling. Behaviors related to the transmission (e.g., by the mobile relay WTRU) and reception (e.g., by the remote WTRU) may be applicable.

Service continuity may be maintained when a remote WTRU transfers from a mobile relay to another mobile relay. Mobile relay-link replacement and termination may be performed. Session continuity and/or address maintenance may be performed at the application layer. For example, session continuity and/or address maintenance may be performed when a remote WTRU may perform reselection to a different mobile relay (e.g., reselected mobile relay) based on link quality of the link between the remote WTRU and a previous mobile relay. The reselected mobile relay may be notified of the previous or current mobile relay selection and/or termination of the link with the previous mobile relay.

A remote WTRU may decide to perform reselection to a different mobile relay (e.g., reselected mobile relay). The remote WTRU may send information about mobile relay link that is about to be torn down. The remote WTRU may send a mobile relay link transfer indication to the reselected mobile relay. The mobile relay link transfer indication and the information may be forwarded to mobility management entity or serving gateway (MME/S-GW) to preserve the address. Different and/or additional bearers may be established over the reselected mobile relay. The mobile relay link transfer indication and the information may be forwarded to MME/S-GW to maintain the existing PDN connection. The mobile relay link transfer indication and the information may be sent during the establishment of the connection for one-to-one communication. The mobile relay link transfer indication and the information may be sent during additional message exchanges between the remote WTRU and the mobile relay WTRU which occur at sometime between discovery and one-to-one communication establishment.

A procedure may be used for service continuity. The procedure may incorporate sending a mobile relay link transfer indication along with information about mobile relay link that is about to be torn down, terminating the mobile relay link that is about to be torn down when the link with the reselected mobile relay is established. The procedure may include multiple steps. The following may be an example.

A remote WTRU may have established a connection with a mobile relay to which a PDN connection is associated with the EPC. The remote WTRU, based on triggers described herein, may initiate a reselection to another mobile relay (e.g., reselected mobile relay). The remote WTRU may initiate a one-to-one connection with the reselected mobile relay. The remote WTRU may indicate, during the one-to-one connection establishment, that the connection is being established to replace a link with the mobile relay. The remote WTRU may indicate information about the mobile relay and/or indicate the mobile relay link transfer. The indication may include one or more of: the IP address of the remote WTRU, identification of the remote WTRU (e.g., L2 ID, PHY layer ID, and/or the like), and identifier of the mobile relay 1 (e.g., L2 ID, PHY layer ID, or destination group ID). The indication may be transferred via PC5 signaling protocol or over the higher layer message. Information from lower layers may be obtained by the higher layers of the remote WTRU once the decision is made to connect to a different mobile relay. The reselected mobile relay, through NAS signaling, may trigger a reconfiguration of the routing in the EPC to re-route packets for the remote WTRU through the reselected mobile relay. The actual routing reconfiguration may be performed at different time. The actual routing reconfiguration may be performed immediately, or it may be delayed until the mobile relay connection is fully set up with the reselected mobile relay. Following routing reconfiguration in the EPC, the reselected mobile relay may confirm the proper configuration of the mobile relay to the remote WTRU. The remote WTRU may teardown the connection with the mobile relay, indicating a mobile relay termination for tearing down the link. Upon receiving the termination indication, the mobile relay may send a NAS message to enable the previously configured route-reconfiguration.

The remote WTRU may continue to be served by the mobile relay until the remote/mobile relay WTRU sends the mobile relay termination indication. For example, the remote WTRU may transmit uplink data via the mobile relay and/or receive downlink data from the mobile relay until the remote WTRU sends the mobile relay termination indication. When the mobile relay termination message is sent to the mobile relay, the remote WTRU may assume some or all communication related to certain logical channels and mapped to mobile relay communication are sent through reselected mobile relay.

Mobile relay link transfer and termination may be used to ensure service continuity between Uu and PC5 connections.

Service continuity between Uu and PC5 connections may be maintained. Criteria may be established for initiating mobile relay selection and connection establishment. When a WTRU is connected to an eNB, rapid establishment of a mobile relay connection may allow the WTRU to minimize service interruption. For example, rapid establishment of a mobile relay connection may allow the WTRU to minimize service interruption upon deterioration of a Uu link if the WTRU is connected to an eNB through Uu connection. Mobile relay connection may involve mobile relay selection and connection establishment. A WTRU connected to the eNB may perform some steps in preparation of potential service outage.

A WTRU connected to the eNB may continuously or periodically perform mobile relay selection. The mobile relay selection may be autonomous or through the assistance and/or control of the eNB. The period for mobile relay selection may be statically configured in the WTRU. For example, the period for mobile relay selection may be statically configured and/or provided to the WTRU upon connection establishment. The period for mobile relay selection may be statically configured in the function. The period for mobile relay selection may be configured by the eNB using RRC signaling. The RRC signaling may be dedicated or broadcast. The period for mobile relay selection may depend on the value of the link quality or measurements of the eNB by the WTRU. For example, different frequencies of mobile relay selection may apply to different ranges of measured Uu link quality. The WTRU may maintain the information of the latest selected mobile relay and utilize the information to initiate a mobile relay connection based on the occurrence of certain triggers. For example, a trigger may be to move to a mobile relay. In response to the trigger, the WTRU may attempt a mobile relay connection with the last selected mobile relay. Once mobile relay selection succeeds, the WTRU may move concerned Uu traffic to the selected mobile relay WTRU.

A WTRU connected to the eNB may start the selection process at the occurrence of a trigger and then perform connection establishment and movement to the selected mobile relay upon the occurrence of another trigger.

A WTRU connected to the eNB may periodically, or based on some trigger, perform connection establishment with a mobile relay. The WTRU may continue to send some or all traffic over the Uu connection until another trigger occurs. The connection may be maintained indefinitely or torn down and re-established periodically based on a potential selection of a mobile relay or a potential mobile relay reselection. Data may or may not be sent over an active mobile relay connection until the data transfer trigger occurs. Periodical keep-alive messages may be transmitted over the connection to maintain the quality of a mobile relay connection. Periodical keep-alive messages may be transmitted to prompt re-connection to a different mobile relay. For instance, keep-alive messages may comprise discovery or communication messages sent by the mobile relay WTRU or the remote WTRU in order to have the receiver measure the quality of the relay connection and decide if reselection to another mobile relay may be performed. The keep-alive messages may be application control messages or AS messages which may or may not contain effective data. Such messages may be expected by the intended received, and the absence of such messages may trigger a reselection. Such messages may also comprise PHY signals or reference signals, allowing the receiver to measure the signal quality of the mobile relay connection.

The triggers may include one or more of the following. The triggers may include direct instructions by the eNB. For example, the direct instructions by the eNB may be through a message. The message may include an RRCReconfiguration message. The triggers may include an indication that the Uu quality as measured by the WTRU may fall below a threshold. The triggers may include lower layers declaring out-of-synchronization and/or radio link failure. The triggers may include RRC connection re-establishment failure and/or expiry of a timer associated with RRC connection re-establishment. The triggers may include RLC unrecoverable error. The triggers may include handover failure.

Certain procedures that are related to connection establishment notification and release may be implemented. A remote WTRU may move between in-network coverage and a mobile relay connection. The remote WTRU may initiate the transition between in-network coverage and a mobile relay connection. The remote WTRU may be prompted to transition between in-network coverage and a mobile relay connection by the eNB. For example, the remote WTRU may move from in-network coverage to a mobile relay connection. A remote WTRU may notify network/application server/upper layers in the remote WTRU that the remote WTRU has left the coverage. The upper layers may be notified when data may be sent over a different connection/bearer/IP address. The AS may initiate the different connection.

When moving from in-network-coverage to mobile relay connection, the remote WTRU, once it has established a connection to the mobile relay WTRU, may notify the eNB that the mobile relay connection was successful. The RRC connection on the Uu interface and/or the EPC connection via the UTRAN may be released. Transfer of data from the EPC may be started via the mobile relay connection. The WTRU, when connecting to a mobile relay, may follow certain procedure/process.

For example, a remote WTRU may initiate a mobile relay selection. Mobile relay selection may be assisted by the network. The remote WTRU may send information about its RRC connection with the eNB to the mobile relay WTRU (e.g., via PC5 connection) during one-to-one establishment connection. The information about its RRC connection with the eNB may be sent as part of the higher layer signaling to allow the mobile relay WTRU to initiate the transfer of the traffic/session from the EUTRAN connection. The information about its RRC connection with the eNB may include identifier of the remote WTRU that is trying to connect to the mobile relay WTRU (e.g., L2 ID, PHY ID, 3GPP ID, and/or the like). The information about its RRC connection with the eNB may include address of the remote WTRU that was previously assigned by the E-UTRAN connection. The information about its RRC connection with the eNB may include identification of the radio bearers over E-UTRAN whose traffic is being transferred over PC5. The information about its RRC connection with the eNB may include identification of the eNB to which the remote WTRU was connected.

The remote WTRU may receive the connection establishment success. The remote WTRU may indicate that the mobile relay WTRU has been properly configured for network access. The remote WTRU may send a message to the eNB to notify the eNB of the successful establishment of the mobile relay connection. The mobile relay WTRU, on behalf of the remote WTRU, may send the message via the Uu link with the eNB. The message may contain various information. The message may contain identification of the mobile relay WTRU. The message may contain identification of the eNB serving the mobile relay WTRU. The message may contain resource information (e.g., resource pools) being used to communicate with the mobile relay WTRU. The message may contain timing information of the mobile relay WTRU (e.g., synchronization source information). The message may contain difference in timing with the eNB that serves the remote WTRU. The message may contain protocol status or configuration information (e.g., PDCP status, sequence number, and/or configuration information).

The remote WTRU may perform certain actions. The actions may include autonomously releasing the RRC connection after sending the message. The actions may include deleting some or all information associated with the radio bearers that were being used for the service that is being transferred to the mobile relay WTRU. The actions may include waiting for an explicit signal from the eNB to release the RRC connection or tearing down the bearers. For example, the eNB may send a message that signals the remote WTRU to release the RRC connection and indicates the release is for connecting wo the mobile relay WTRU. The actions may include continuing to use the Uu connection for some or all services until a criteria is met. The criteria may be for releasing the RRC connection and/or tearing down the Uu radio bearers and communicating through the mobile relay WTRU. Some examples of the criteria are RSRP thresholds, detection of out-of-coverage, RLF, and/or the like. The actions may include notifying the upper layers of the presence of a different PC5 link and/or associated bearers. The actions may be performed by the remote WTRU upon receiving the connection establishment success. The remote WTRU may use the different PC5 link and/or associated bearers to send application data. The remote WTRU may or may not use the Uu link bearers. The actions may include notifying the AS to transfer un-transmitted data in the Uu radio bearer buffers (e.g., RLC) to the different PC5 bearer.

The remote WTRU may start to assume that some or all communications performed with the EPC may be accomplished through the mobile relay WTRU (e.g., over the PC5 interface). The remote WTRU may start to assume that some or all communications performed with the EPC may not be over the Uu interface. The remote WTRU may start to assume that the specific radio bearers have been torn down.

When moving from mobile relay connection to network coverage, the WTRU may provide the identification of the mobile relay and mobile relay information to the eNB. Providing the identification of the mobile relay and mobile relay information to the eNB may be similar to a mobile relay WTRU to mobile relay WTRU transfer. The WTRU may establish an RRC connection with the eNB. The WTRU may send the mobile relay information to the network via the eNB to transfer the EPC connection from the mobile relay to the eNB. The WTRU may send the mobile relay information to the network via the eNB to create a different EPC connection. A remote WTRU, once determining it is within network coverage, may follow certain procedure/process.

The remote WTRU, once it has determined it is within network coverage, may initiate an RRC connection procedure with the eNB.

The remote WTRU may send information about the mobile relay to which it was connected. The information may be sent as part of the NAS message in the RRC Connection Setup Complete message. The eNB may forward the information to the MME to initiate a reconfiguration of the routing of packets associated with the address. The information may include identifier of the mobile relay WTRU (e.g., L2 ID, PHY layer ID, or destination group ID). The information may include a list of services that are provided by the mobile relay (e.g., the list of TMGIs being monitored). The information may include the current address that was assigned to the remote WTRU by the mobile relay WTRU. The information may include identification of the remote WTRU (e.g., L2 ID, PHY layer ID, and/or the like). The information may include bearer information about the D2D link and/or the mobile relay to eNB link. The information may include protocol status and/or configuration information (e.g., PDCP status, sequence number, and/or configuration information).

The remote WTRU may send a termination indication to the mobile relay WTRU to issue a disconnection/release from the mobile relay WTRU. For example, the termination indication may be sent following completion of the RRC connection and/or successful initiation of services via the eNB. The termination indication may be used by the mobile relay WTRU for various purposes. The termination indication may be used by the mobile relay WTRU to force a release of D2D resources being maintained in the mobile relay WTRU for communication with the remote WTRU which is now in-coverage. The termination indication may be used by the mobile relay WTRU to notify the eNB. For example, the mobile relay WTRU may be served by a different eNB from the eNB whose coverage the remote WTRU is in. The termination indication may be used by the mobile relay WTRU to confirm to the network that the transfer from the mobile relay connection to the Uu connection has been completed.

Upon receiving the termination indication, the mobile relay WTRU may perform certain actions. The mobile relay WTRU may release some or all resources/pools that may have been used to communicate with the remote WTRU, or the mobile relay WTRU may reconfigure its pools. For example, the reconfiguration may be based on the fact that the remote WTRU may no longer use D2D resources. The mobile relay WTRU may send a message to the eNB that serves the mobile relay, if the eNB is different from the eNB whose coverage the remote WTRU is in. Some resources may be released in the eNB that serves the mobile relay. The resource pools may be reconfigured by the mobile relay WTRU. The mobile relay WTRU may send a NAS message to the network to initiate the transfer of data for the remote WTRU's over the E-UTRAN connection.

User plane data transfer may be implemented. Data may need to be transferred between bearers/logical channels in a manner to avoid loss of data during a transition. A Uu radio bearer serving a specific application and/or service over Uu may be replaced with the combination of a PC5 bearer between the remote WTRU and mobile relay WTRU, and a Uu radio bearer between the mobile relay and eNB.

Certain processes and/or procedures may be implemented to avoid loss of data during the transition. Different processes and/or procedures may be implemented for the transfer of date from Uu to PC5 and/or the transfer of date from PC 5 to Uu. Downlink data may be treated differently from uplink data.

A fully lossless approach may be used for treating a downlink data transfer from Uu to PC5. For example, the eNB may forward RLC PDUs that have yet to be transmitted or RLC PDUs that were transmitted but not acknowledged over the Uu link via the mobile relay. The eNB may forward the RLC PDUs while/after it tears down the radio bearer and/or indicate the destination remote WTRU for which the RLC PDUs are intended. Forwarding the RLC PDUs may involve multiple steps. The steps may include the following.

The remote WTRU may notify the eNB that a radio bearer may be torn down as the service for that bearer may be supported through a mobile relay (e.g., as described herein). The radio bearer may be torn down by the eNB. For example, the radio bearer may be torn down by the eNB by sending an RRC connection reconfiguration. The eNB may allow the WTRU move naturally to RLF. The eNB may leave the radio bearers active and/or stop transmitting data over the radio bearers. The remote WTRU may delete some or all data associated with the Uu radio bearers upon reception of the RRC connection reconfiguration tearing down the bearers. The remote WTRU may delete some or all data associated with the Uu radio bearers upon receiving the data packet over the PC5 link destined to the same application layer entity. The remote WTRU may delete some or all data associated with the Uu radio bearers immediately after sending the notification to the eNB that a radio bearer may be torn down. The eNB may transfer some or all PDUs which have yet to be transmitted over Uu to the mobile relay WTRU (e.g., following the notification). A different bearer may be created for transferring some or all PDUs which have yet to be transmitted over Uu to the mobile relay WTRU. The bearer that was serving the mobile relay may be used to transfer some or all PDUs which have yet to be transmitted over Uu to the mobile relay WTRU. The eNB may continue to create different and/or additional RLC from packets received with the old WTRU address (e.g., over Uu), until the application server stops generating the packets.

The mobile relay WTRU may be informed that a number of packets may be sent to the remote WTRU over PC5. The packets may contain the old address of the WTRU. The packets may be individually identified with the identifier of the remote WTRU (e.g., L2 ID, PHY ID, or other). The packets may be identified through the use of a control message from the eNB to the mobile relay WTRU. The control message may include RRC, PDCP status report, /or the like. The message may indicate the packets to be expected by PDCP SN, count value, /or the like. The mobile relay WTRU may or may not rely on the correct address to route the data.

The mobile relay WTRU may transfer the packets to the logical channel/PC5 bearer associated with the remote WTRU. The packets may be transferred for transmission to the remote WTRU. The packets may be transferred before additional and/or different packets are created from data that is transmitted to the mobile relay serving the remote WTRU. The additional and/or different packets may be created from data using additional and/or different WTRU IP address that is intended for PC5.

The remote WTRU may receive the eNB-transferred packets from the mobile relay WTRU. The remote WTRU may continue sequencing/numbering and forwarding to upper layers. The sequencingsequencing/numbering and forwarding to upper layers was occurring over the Uu radio bearer.

A time-based lossless approach may be used for treating a downlink data transfer from Uu to PC5. For example, the eNB may send some or all PDUs that have yet to be transmitted or PDUs that were transmitted but not acknowledged over the Uu radio bearer for a specific time (e.g., signaled to the WTRU) before it tears down the radio bearer. Sending the PDUs may involve multiple steps. The steps may include the following. The remote WTRU may notify the eNB that a radio bearer may be torn down. The service for that bearer may be supported through a mobile relay (e.g., as described herein). The eNB may continue to transmit some or all PDUs via the Uu link until the eNB empties its buffers. The eNB may continue to attempt transmission/retransmission for a certain time period. The PDUs may be discarded or transmitted via the mobile relay WTRU upon expiry of the time period. The eNB may continue to transmit some or all additional/different packets via the Uu link until the eNB empties its buffers. The eNB may continue to attempt transmission/retransmission of additional/different packets for a certain time period. The additional/different packets may be discarded or transmitted via the mobile relay WTRU upon expiry of the time period.

The remote WTRU may continue to receive data over the bearer until it is torn down by the eNB or for a specific time period configured in the WTRU. Upon expiry of the time or reception of the RRC reconfiguration by the eNB tearing down the bearer, the remote WTRU may delete some or all data associated with the corresponding radio bearer. For example, the timer may be pre-configured in the WTRU or configured by the eNB via RRC signaling.

A lossless—redundant approach may be used for treating a downlink data transfer from Uu to PC5. For example, the eNB may send some or all PDUs it received that are associated with the old (e.g., over Uu) WTRUs address to the WTRU over the Uu link and to the mobile relay WTRU over the PC5 link. The applicable procedures in the mobile relay WTRU may be used. The remote WTRU may discard duplicate packets received from both links.

A lossy approach may be used for treating a downlink data transfer from Uu to PC5. For example, the eNB may discard some or all packets that it has buffered and additional and/or different packets destined to the old (e.g., via Uu) address of the WTRU. A lossy approach may be simple. The lossy approach may result in data loss as a result of the transition from Uu bearer to PC5 bearer. The lossy approach may involve one or more of the following steps.

The remote WTRU may notify the eNB that a radio bearer may be torn down. The service for that bearer may be supported through a mobile relay (e.g., as described herein). The eNB may discard some or all PDCP PDUs for the radio bearers that are to be torn down. The eNB may discard additional packets that are received and addressed to the WTRU and destined to the radio bearers. The remote WTRU may delete some or all data associated with the Uu radio bearers. The remote WTRU may delete some or all data associated with the Uu radio bearers upon reception of the RRC connection reconfiguration tearing down the bearers. The remote WTRU may delete some or all data associated with the Uu radio bearers upon receiving the data packet over the PC5 link destined to the same application layer entity. The remote WTRU may delete some or all data associated with the Uu radio bearers after sending the notification to the eNB that a radio bearer may be torn down.

A number of approaches may be used to treat uplink data that the WTRU is transmitting to the eNB during the transition from Uu to PC5.

A fully loseless approach may be used for treating an uplink data transfer from Uu to PC5. For example, the WTRU may transfer some or all RLC PDUs that have not been transmitted or RLC PDUs that were transmitted but not acknowledged, from the Uu bearer to a different PC5 bearer. The transfer of the RLC PDUs may occur (e.g., following the establishment of a PC5 connection). In one example, the remote WTRU may create a different PC5 logical channel for traffic to be sent to the service that was used and was offered through a mobile relay. Prior to sending different packets over the different PC5 logical channel, the remote WTRU may transfer some or all PDCP PDUs that have not been transmitted or PDCP PDUs that were transmitted but not acknowledged to the different logical channel. The remote WTRU may also re-perform some or all PDCP operations (e.g., compression, ciphering, and/or the like) on the different packets to take into account security parameters applicable to the link.

A time-based lossless approach may be used for treating an uplink data transfer from Uu to PC5. For example, the WTRU may send some or all PDUs that have yet to be transmitted or RLC PDUs that were transmitted but not acknowledged over the Uu radio bearer for a certain time (e.g., signaled to the WTRU). The remote WTRU, upon receiving an RRC connection reconfiguration tearing down the bearer or upon the expiry of a timer, may continue to transmit the PDUs over the Uu radio bearer. Following a trigger (e.g., timer or radio bearer torn down), the remote WTRU may discard an unsent or unacknowledged PDUs or move them to a different PC5 bearer for transmission.

A lossy approach may be used for treating an uplink data transfer from Uu to PC5. For example, the WTRU may discard some or all PDUs that have not been transmitted or PDUs that were transmitted but not acknowledged (e.g., following the establishment of the PC5 connection). The WTRU may discard some or all PDUs that have not been transmitted or PDUs that were transmitted but not acknowledged following the transmission of the indication to the eNB that traffic related to a bearer may be forwarded through a mobile relay. The WTRU may discard some or all PDUs that have not been transmitted or PDUs that were transmitted but not acknowledged following the reception of an RRC connection reconfiguration by the eNB tearing down the Uu bearers.

An on-going service may have certain packets. The packets may be uplink or downlink packets. The packets may be at the mobile relay and may be delivered to the eNB or WTRU to avoid service interruption or degradation during the transition (e.g., from mobile relay connection (PC5) to Uu connection).

For treating uplink data, the mobile relay WTRU may send packets residing at the mobile relay WTRU and PDUs (e.g., on the Uu link) that were transmitted but not acknowledged to the eNB.

In an example of an Uplink transmission—PC5 to Uu, the mobile relay WTRU may continue to empty the PDCP transmission buffer until some or all data at the mobile relay WTRU that was received from the remote WTRU has been transmitted without change and acknowledged. The mobile relay WTRU may continue to empty the PDCP transmission buffer until some or all data at the mobile relay WTRU that was received from the remote WTRU has been transmitted without change and acknowledged until the expiry of associated timers or retry counters. The application in the network may temporarily receive packets with the mobile relay-assigned source address for the remote WTRU. For in-sequence delivery, the eNB may buffer packets received from the WTRU (e.g., previously remote WTRU) over the Uu connection. The eNB may wait for indication from the PDCP entity communicating to the mobile relay WTRU before forwarding PDCP data over the newly established Uu link radio bearer to upper layers, for in-sequence delivery.

In an example of an Uplink transmission—PC5 to Uu, the mobile relay WTRU may flush some/all pending data to be transmitted to the eNB. The WTRU (e.g., previously remote) may receive from the eNB, following the establishment of the Uu radio bearer, a status report (e.g., PDCP or upper layer) reflecting the missing packets or PDUs at the eNB. The WTRU may start transmission to the eNB over the Uu radio bearer beginning with the missing packets/PDUs reflected in the status report. The WTRU may re-transmit a certain number or PDUs which were already transmitted over the PC5 link. The number of PDUs to retransmit may be configured by the network or statically set in the WTRU.

In an example of an Uplink transmission—PC5 to Uu, the mobile relay WTRU may flush some or all pending data to be transmitted to the eNB. The WTRU (e.g., previously remote) may transmit PDCP PDUs which are due to be transmitted following the tear-down of the mobile relay connection.

In an example of a Uplink transmission— PC5 to Uu, which may be used in conjunction with one or more of other approaches discussed herein, the remote WTRU may suspend transmission to the mobile relay WTRU at a point in the initiation of a connection the eNB (e.g., RACH, RRC Connection establishment, and/or the like) to avoid transmission of data to the mobile relay which may be flushed by the mobile relay WTRU.

For treating downlink data, the mobile relay WTRU may send data (e.g., IP packets, pending PDCP PDUs) to the WTRU (e.g., previously remote). The approaches described herein for uplink may be used for treating downlink data. The roles of the eNB and the remote WTRU may be reversed. The approaches discussed herein may be used for the transfer of the link between a mobile relay and another mobile relay (e.g., for mobile relay reselection).

Service continuity may be maintained for mobile relay WTRU handover from one eNB to another eNB. Mobility for a mobile relay WTRU may be considered. The mobile relay WTRU may move from the control of an eNB to another eNB. An eNB may contain information related to the status of the WTRU as a mobile relay. The eNB may contain mobile relay context information (e.g., D2D resource pools used by the mobile relay). The information may be transferred from an eNB to another eNB. In a handover procedure, the mobile relay context of an eNB may be transferred to another eNB over the X2 interface. The information which may be transferred over the X2 interface during the handover of a mobile relay WTRU may include one or more of: indication that the WTRU performing the handover is acting as a mobile relay, resource pools used by the mobile relay WTRU for D2D communication (e.g., including those specific to mobile relay functionality), the number or list of remote WTRUs being served by the mobile relay, and identification of the services being used by the collection of remote WTRUs served by the mobile relay.

Service continuity may be maintained through mobile relay-specific broadcast mechanism. A mobile relay may be allowed to broadcast specific messages to some or all remote WTRUs that are served by the mobile relay. The broadcast specific messages may be communicated to a certain mobile relay link. A broadcast specific message may be sent to some or all the remote WTRUs that are connected to a mobile relay WTRU via identifiers and/or transmitted in the SL-BCH.

A mobile relay may send broadcast control information to some or all of the remote WTRUs that are connected to the mobile relay WTRU by addressing them by certain identifiers. The identifiers may include a L2 ID, application ID, ProSe ID, MAC Address, or similar identifier. The AS and/or an application layer may use the identifiers to identify information associated with mobile relay operation (e.g., control messaging). The identifiers may allow the mobile relay WTRU to broadcast information specific to a remote WTRU that is served by the mobileWTRU, or to a subset or all remote WTRUs which are being served by the relay WTRU. The mobile relay WTRU may or may not send unicast messages across the one-to-one communication links to all remote WTRUs. For example, the identifiers may allow the mobile relay WTRU to send a same control message to remote WTRUs which may be receiving eMBMS broadcast from the mobile relay WTRU. The remote WTRUs may or may not have a one-to-one communication link actively established with the mobile relay WTRU.

A broadcast mechanism may be established. The mobile relay WTRU may send the broadcast address in the discovery message or during mobile establishment. The mobile relay WTRU may send the broadcast address as part of the payload of the discovery message. The broadcast address may be sent in the discovery message such that the remote WTRUs may listen to the broadcast address for control information. The discovery message may be a Model A or Model B discovery message. The broadcast address may be sent during one-to-one mobile relay establishment. For example, the broadcast address may be sent during authentication and security establishment of the L2 secure link following the direct communication request made by a remote WTRU. The broadcast address may also be pre-configured or derived from preconfiguration. For instance, a WTRU may derive the broadcast address it should listen to based on its location and some specific rules in the WTRUs pre-configuration. The broadcast address may also be derived from the mobile relay WTRU L2 ID. The remote WTRU may determine the broadcast address to listen to based on some specific translation function applied to the L2 address of the mobile relay WTRU address it is listening to or being served by.

The remote WTRU may obtain the broadcast address. The remote WTRU may listen to control messages from the mobile relay WTRU that are destined to the broadcast address (e.g., for as long as it uses the services of the mobile relay WTRU). Such control messages may come in D2D communication messages or in D2D discovery messages. For example, even after a one-to-one link has been torn down and the remote WTRU is listening to eMBMS broadcast through the D2D communication transport, the mobile relay WTRU may continue to listen to the broadcast address for messages which may be pertaining to control sent by the mobile relay.

The broadcast messages may be transmitted in one or more dedicated pools reserved for that effect. The specific pools where broadcast messages may be transmitted by be given by dedicated signaling or in the SIBs.

The broadcast message may be transmitted in the SL-BCH. An IE may be added to the information transmitted on the SL-BCH for WTRUs which are acting as mobile relays. Reserved bits in the MasterinformationBlock-SL may be used to transmit the broadcast message.

The broadcast message may contain one or more of the following information: mobile relay WTRU identifier (e.g., L2 ID, PHY ID, or other), identification of other mobile relays (e.g., for mobile relay re-direction), TMGI, resource pool configuration for a remote WTRU, and/or actions that may be performed by the remote WTRUs. The actions may be identified a code or a few bits in the message, where a set of bits references a specific type of action to be performed. Actions may include one or more of the following: start mobile/stop relay reselection, start/stop discovery or measurements, switch to/from Uu connection, direct traffic to/from Uu, suspend/start transmission on PC5, reselect to a mobiledifferent relay, and/or reconfiguration of Mode 2 TX/RX pools (e.g., command to change the utilized RX/TX resource pools).

Service continuity may be maintained by using a Uu connection and a mobile relay connection. The remote WTRU may be able to maintain a Uu connection and a mobile relay connection. For example, the WTRU may receive public safety traffic through a mobile relay WTRU and may receive non-public safety traffic directly from the eNB on the Uu interface. The mobile relay WTRU may be connected to the same or a different eNB.

If a WTRU is being served by an eNB for public safety and non-public safety services and the WTRU may start to move out of coverage of the eNB, the WTRU may be moved to a mobile relay to continue some or all public safety communication. The network may tear down some or all bearers related to public safety communication on the Uu link once the mobile relay link has been established with the mobile relay WTRU. The WTRU may maintain the connection to the eNB over the Uu interface to continue to be served by the bearers related to non-public safety. The eNB may send an indication to the WTRU to trigger the WTRU to select a mobile relay. The selection may be made by the eNB or the WTRU. The WTRU may perform connection to the mobile relay, and a connection to the network may be established through the mobile relay. Once the mobile relay connection is established, the network may tear down public-safety related bearers on the Uu link and start to send the public-safety related traffic using the mobile relay (e.g., using a different address or after having reconfigured the WTRU to use the same address over the mobile relay). The WTRU may continue to communicate over the Uu interface for non-public safety services, and over the PC5 interface for some or all public safety services until the WTRU is out of coverage. Procedures for loss of coverage of the Uu link may be performed.

When having a simultaneous Uu and PC5 connection, the WTRU may be connected to an eNB via Uu connection for non-public safety traffic, and simultaneously connected to mobile relay WTRU for public safety traffic which may be connected to a different eNB. The eNB may or may not be aware of the resources used by the mobile relay. The eNB may or may not coordinate with the Uu resources used to communicate with the WTRU. The mobile relay WTRU transmissions and synchronization sources may or may not be synchronized with the timing of the eNB.

The WTRU may send, to the eNB, an identification of the different eNB to which the mobile relay WTRU is connected. The identification of the different eNB may be obtained by the WTRU via eCGI announcement. Identification of the different eNB may be sent in the mobile relay discovery message by the mobile relay WTRU, or may be obtained during connection establishment with the mobile relay WTRU. Using the identification of the different eNB, the eNB may obtain the timing reference of the mobile relay WTRU (e.g., the timing difference between the eNBs) and the mobile relay resource information via X2.

For example, the WTRU may monitor mobile relay discovery messages to measure potential mobile relays. Based on mobile relay selection criteria, the WTRU or the serving eNB may select the mobile relay WTRU which is served by another eNB. The WTRU may perform an eCGI procedure to determine the eCGI of the eNB serving the mobile relay WTRU. Prior to performing a connection establishment with the mobile relay WTRU, the WTRU may send an indication of the connection establishment to its serving eNB with the identification of another eNB (e.g., the eNB serving the mobile relay WTRU). The eNB serving the WTRU may obtain the timing and resource information being utilized by the mobile relay via X2 communication with the eNB serving the mobile relay WTRU, and may schedule ongoing resources on the Uu interface for non-public safety data communication with the remote WTRU. The eNB may allow the WTRU to proceed with connection establishment with the mobile relay WTRU.

Using the identification of the different eNB, the eNB may trigger a handover to the different eNB (e.g., if this is possible). For example, the cell identification of the mobile relay WTRU to which the WTRU wishes to perform a connection may be sent to the WTRUs serving eNB. The eNB may initiate/configure intra/inter frequency measurements in the WTRU and/or may start a handover of the WTRU to the different eNB, while rejecting the request to start a mobile relay connection or delaying it until after the handover.

The WTRU may send the synchronization information and the resource pool information of the mobile relay WTRU to its serving eNB. For example, the remote WTRU may monitor mobile relay discovery messages to measure potential mobile relays. Based on mobile relay selection criteria, the remote WTRU or the serving eNB may select the mobile relay WTRU which is served by another eNB. The WTRU may send the synchronization reference information (e.g., timing difference of the synchronization source of the mobile relay WTRU with its own serving eNB timing) to the eNB prior to attempting to establish a connection with the mobile relay WTRU. The eNB serving the mobile relay WTRU may adjust some or all Uu resource assignments made to the WTRU (e.g., for non-public safety traffic) using this information. If the mobile relay WTRU sends a resource reconfiguration to the WTRU at a point during communication, the WTRU may send the information to the eNB.

The WTRU, after sending information about the eNB associated with the mobile relay, may be rejected from connecting to the mobile relay. For example, the eNB may send a redirection to the WTRU or may instruct the WTRU to connect to a different mobile relay using the Uu link.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, WTRU, terminal, base station, RNC, and/or any host computer. WTRU-Network relay, WTRU-Network mobile relay, and/or mobile relay may be used interchangeably. ProSe mobile relay and mobile relay may be used interchangeably in some senarios.

The invention claimed is:

1. A method, comprising:
performing, by a remote wireless transmit/receive unit (WTRU), measurements of a PC5 link associated with one or more relay WTRUs;
determining at least one of the one or more relay WTRUs to be a candidate relay WTRU that fulfills a higher layer criteria;
determining a quality of the candidate relay WTRU based on the measurements;
sending, to a radio access network (RAN) node currently serving the remote WTRU, the quality, information indicating an identity of the candidate relay WTRU and information indicating an identity of a RAN node associated with the candidate relay WTRU, wherein the identity of the candidate relay WTRU comprises a relay layer 2 (L2) identifier; and
wherein the sending is triggered on condition that one or more configured criteria are fulfilled, and wherein the one or more configured criteria comprises the quality of the candidate relay WTRU being above a threshold for a given time period.

2. The method of claim 1, wherein the performing of the measurements comprises measuring signal quality of the one or more relay WTRUs.

3. The method of claim 2, wherein the sending comprises reporting the measured signal quality of the candidate relay WTRU.

4. The method of claim 1, wherein the sending comprises sending the quality to the RAN node currently serving the remote WTRU directly over a Uu link.

5. The method of claim 1, wherein the sending comprises sending the quality to the RAN node currently serving the remote WTRU via the relay WTRU.

6. The method of claim 1, comprising:
receiving, by the remote WTRU, the one or more configured criteria to determine when the sending to the RAN node currently serving the remote WTRU should be triggered.

7. The method of claim 1, wherein the quality of the candidate relay WTRU that meets the higher layer criteria is higher than the quality of a current relay WTRU by an amount that is greater than a threshold.

8. A wireless transmit/receive unit (WTRU) comprising:
a processor configured to:
perform measurements of a PC5 link associated with one or more relay WTRUs;
determine at least one of the one or more relay WTRUs to be a candidate relay WTRU that fulfills a higher layer criteria; and
determine a quality of the candidate relay WTRU based on the measurements;
a transceiver configured to:
send, to a radio access network (RAN) node currently serving the WTRU, the quality, information indicating an identity of the candidate relay WTRU and information indicating an identity of a RAN node associated with the candidate relay WTRU, wherein the identity of the candidate relay WTRU comprises a relay layer 2 (L2) identifier;

wherein the sending is triggered on condition that one or more configured criteria are fulfilled, and wherein the one or more configured criteria comprises the quality of the candidate relay WTRU being above a threshold for a given time period.

9. The WTRU of claim 8, wherein the measurements comprise measurements of signal quality of the one or more relay WTRUs.

10. The WTRU of claim 9, wherein the transceiver is configured to report the measured signal quality of the candidate relay WTRU.

11. The WTRU of claim 8, wherein the transceiver is configured to send the quality to the RAN node currently serving the remote WTRU directly over a Uu link or to send the measurements to the RAN node currently serving the remote WTRU via the relay WTRU.

12. The WTRU of claim 8, wherein the transceiver is configured to receive the one or more configured criteria to determine when the sending to the RAN node currently serving the remote WTRU should be triggered.

13. The WTRU of claim 8, wherein the quality of the candidate relay WTRU that meets the higher layer criteria is higher than the quality of a current relay WTRU by an amount that is greater than a threshold.

* * * * *